US008023045B2

(12) United States Patent
Kondo

(10) Patent No.: US 8,023,045 B2
(45) Date of Patent: *Sep. 20, 2011

(54) STORAGE DEVICE, DATA PROCESSING APPARATUS, DATA PROCESSING METHOD, PROGRAM, STORAGE MEDIUM AND DATA PROCESSING SYSTEM

(75) Inventor: Tetsujiro Kondo, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/818,226

(22) Filed: Jun. 18, 2010

(65) Prior Publication Data

US 2010/0253843 A1 Oct. 7, 2010

Related U.S. Application Data

(62) Division of application No. 10/330,937, filed on Dec. 27, 2002, now Pat. No. 7,760,270.

(30) Foreign Application Priority Data

Dec. 28, 2001 (JP) .................................. 2001-399869

(51) Int. Cl.
H04N 5/74 (2006.01)
(52) U.S. Cl. ...................................................... 348/553
(58) Field of Classification Search .......... 348/580–582, 348/588, 553, 725, 458, 448, 721; 360/65; 375/229, 265
See application file for complete search history.

(56) References Cited

U.S. PATENT DOCUMENTS

| 5,604,799 A * | 2/1997 | Komoda et al. .......... 379/406.06 |
| 6,124,997 A * | 9/2000 | Hirasaka .................... 360/65 |
| 6,530,083 B1 * | 3/2003 | Liebenow .................. 725/46 |
| 7,071,990 B2 * | 7/2006 | Kondo ........................ 348/383 |
| 7,760,270 B2 * | 7/2010 | Kondo ........................ 348/580 |
| 2002/0027611 A1 | 3/2002 | Kondo et al. |
| 2004/0237103 A1 * | 11/2004 | Kondo et al. ................ 725/37 |
| 2005/0226537 A1 * | 10/2005 | Kondo et al. ................ 382/298 |

FOREIGN PATENT DOCUMENTS

EP 1 073 279 1/2001
(Continued)

OTHER PUBLICATIONS

Patent Abstracts of Japan, vol. 2002, No. 04, Aug. 4, 2002 & JP 2001 339695 A (Sony Corp), Dec. 7, 2001.

(Continued)

*Primary Examiner* — Paulos M Natnael
(74) *Attorney, Agent, or Firm* — Frommer Lawrence & Haug LLP; William S. Frommer; Thomas F. Presson

(57) ABSTRACT

A video processor card stores tap generation information for determining a predetermined tap coefficient when the tap generation information is used together with tap generation information stored in another video processor card, and supplies a video processing interface with the tap generation information. The video processing interface generates the tap coefficient from the tap generation information of the one video processor card and the other video processor card loaded therein. The video processing interface extracts video data having a predictive tap used to predict a target pixel and video data having a class tap used to classify the target data, and class classifies the target data based on the class tap. The video processing interface determine the target pixel based on the tap coefficient and the predictive tap of the class of the target pixel.

19 Claims, 45 Drawing Sheets

FOREIGN PATENT DOCUMENTS

WO      WO 01 73570      10/2001

OTHER PUBLICATIONS

Patent Abstracts of Japan, vol. 2000, No. 15, Apr. 6, 2001 & JP 2000 341705 A (Sony Corp), Dec. 8, 2000.

Patent Abstracts of Japan, vol. 2002, No. 02, Apr. 2, 2002 & JP 2001 285881 A (Sony Corp), Oct. 12, 2001.

Patent Abstracts of Japan, vol. 2002, No. 02, Apr. 2, 2002 & JP 2001 285882 A (Sony Corp), Oct. 12, 2001.

* cited by examiner

FIG. 36

| | | |
|---|---|---|
| 000000000 | 000000000 「0」 | 000000000 「0」「0」 |
| | | 000000000 「0」「1」 |
| | 000000000 「1」 | 000000000 「1」「0」 |
| | | 000000000 「1」「1」 |
| 000000001 | 000000001 「0」 | 000000001 「0」「0」 |
| | | 000000001 「0」「1」 |
| | 000000001 「1」 | 000000001 「1」「0」 |
| | | 000000001 「1」「1」 |
| 000000010 | 000000010 「0」 | 000000010 「0」「0」 |
| | | 000000010 「0」「1」 |
| | 000000010 「1」 | 000000010 「1」「0」 |
| | | 000000010 「1」「1」 |
| ⋮ | ⋮ | ⋮ |
| 111111110 | 111111110 「0」 | 111111110 「0」「0」 |
| | | 111111110 「0」「1」 |
| | 111111110 「1」 | 111111110 「1」「0」 |
| | | 111111110 「1」「1」 |
| 111111111 | 111111111 「0」 | 111111111 「0」「0」 |
| | | 111111111 「0」「1」 |
| | 111111111 「1」 | 111111111 「1」「0」 |
| | | 111111111 「1」「1」 |

CLASS CODES OUTPUT FROM CLASS CLASSIFIER BY VIDEO PROCESSOR CARD $13_1$ (512 CLASSES)

CLASS CODES OUTPUT FROM CLASS CLASSIFIER BY VIDEO PROCESSOR CARD $13_2$ (1024 CLASSES)

CLASS CODES OUTPUT FROM CLASS CLASSIFIER BY VIDEO PROCESSOR CARD $13_3$ (2048 CLASSES)

STORAGE DEVICE, DATA PROCESSING APPARATUS, DATA PROCESSING METHOD, PROGRAM, STORAGE MEDIUM AND DATA PROCESSING SYSTEM

This is a division of application Ser. No. 10/330,937, filed Dec. 27, 2002, now U.S. Pat. No. 7,760,270 which is entitled to the priority filing date of Japanese application 2001-399869 filed on Dec. 28, 2001, the entirety of which is incorporated herein by reference.

BACKGROUND OF THE INVENTION

1. Field of the Invention

The present invention relates to a storage device, data processing apparatus, data processing method, program, storage medium, and data processing system and, more particularly to a storage device, data processing apparatus, data processing method, program, storage medium, and data processing system for allowing television receivers to perform sophisticated functions in an add-on fashion.

2. Description of the Related Art

In response to television broadcast signals, television receivers the image corresponding to a television broadcast signal and provide a sound output correspondingly associated with the image.

A Y/C separation process and other signal processing rapidly advances, and sophisticated television receivers performing excellent signal processing are developed one after another and are commercially available.

Even if a television receiver, more sophisticated than a model currently owned by a user, is commercially available, the user is unable to enjoy a sophisticated function unless the user retrofits the present model with a new one.

In the field of computers, a board having a predetermined function, such as a video processor board or a audio processor board, may be mounted. A video processor board that receives a television signal and performs an MPEG encoding operation may be installed in a computer. That computer records a television broadcast program on a real time basis while MPEG encoding the program.

As in the computer, it is contemplated that a board provided with a new function may be fitted into the television receiver. The user purchases a board capable of performing a signal processing and mounts it in his or her television receiver. The user thus enjoys the new function without the need for purchasing a new model.

If a new board having more sophisticated function is on sale subsequent the sale of a preceding board having a certain signal processing function, the preceding board becomes obsolete.

The signal processing technique rapidly advances. One highly sophisticated board quickly supersedes another. The motivation of the users to purchase the boards is thus reduced.

If a previously purchased board is usable with the function thereof taken advantage of, or if the function of the television receiver becomes sophisticated in function by adding a newly purchased board in addition to a previously purchased board, the motivation of the user to purchase the board is promoted.

SUMMARY OF THE INVENTION

Accordingly, it is an object of the present invention to make a television receiver sophisticated in function in an add-on fashion.

In a first aspect of the present invention, a storage device includes a tap generation information storage unit which stores tap generation information for generating a tap coefficient for each predetermined class for a data conversion process of converting first data into second data higher in quality level than the first data, a tap coefficient generator which generates the tap coefficient from the tap generation information under the control of the data processing apparatus, a tap extractor which extracts, from the first data supplied from the data processing apparatus, a predictive tap which is used to predict target data which is of interest in the second data, a class tap extractor which extracts, from the first data supplied from the data processing apparatus, a class tap which is used to classify the target data into one of a plurality of classes, a class classifier which classifies the target data according to the class tap, and a predictor which predicts the target data from the tap coefficient and the predictive tap of the class of the target data, and supplies the data processing apparatus with the target data.

In a second aspect of the present invention, a data processing method includes a tap coefficient generation step of generating the tap coefficient from the tap generation information under the control of the data processing apparatus, a predictive tap extraction step of extracting, from the first data supplied from the data processing apparatus, a predictive tap for use in the prediction of target data which is of interest in the second data, a class tap extraction step of extracting, from the first data supplied from the data processing apparatus, a class tap for use in the class classification that classifies the target data into one of a plurality of classes, a class classification step of classifying the target data into classes based on the class tap, and a prediction step of predicting the target data from the tap coefficient and the predictive tap of the class of the target data, and supplying the target data to the data processing apparatus.

In a third aspect of the present invention, a computer program includes a tap coefficient generation step of generating the tap coefficient from the tap generation information under the control of the data processing apparatus, a predictive tap extraction step of extracting, from the first data supplied from the data processing apparatus, a predictive tap for use in the prediction of target data which is of interest in the second data, a class tap extraction step of extracting, from the first data supplied from the data processing apparatus, a class tap for use in the class classification that classifies the target data into one of a plurality of classes, a class classification step of classifying the target data into classes based on the class tap, and a prediction step of predicting the target data from the tap coefficient and the predictive tap of the class of the target data, and supplying the target data to the data processing apparatus.

In a fourth aspect of the present invention, a storage medium stores a computer program of a data processing method, and includes a tap coefficient generation step of generating the tap coefficient from the tap generation information under the control of the data processing apparatus, a predictive tap extraction step of extracting, from the first data supplied from the data processing apparatus, a predictive tap for use in the prediction of target data which is of interest in the second data, a class tap extraction step of extracting, from the first data supplied from the data processing apparatus, a class tap for use in the class classification that classifies the target data into one of a plurality of classes, a class classification step of classifying the target data into classes based on the class tap, and a prediction step of predicting the target data from the tap coefficient and the predictive tap of the class of the target data, and supplying the target data to the data processing apparatus.

In a fifth aspect of the present invention, a data processing apparatus includes a loading and unloading unit on which each of the first through N-th storage devices is mounted, a tap coefficient generation control unit which controls the generation of the tap coefficient from the tap generation information in the first through N'-th storage devices (N'≦N) mounted on the loading and unloading unit, an input and output route setting unit which sets an input and output route of data for each of the first through N'-th storage devices, and a data supply control unit which controls the supply of data from one storage device to another among the first through N'-th storage devices in accordance with the input and output route set by the input and output route setting unit.

In a sixth aspect of the present invention, a data processing method includes a tap coefficient generation control step of controlling the generation of the tap coefficient from the tap generation information in the first through N'-th storage devices (N'≦N) mounted on the loading and unloading unit, an input and output route setting step of setting an input and output route of data for each of the first through N'-th storage devices, and a data supply control step of controlling the supply of data from one storage device to another among the first through N'-th storage devices in accordance with the input and output route set in the input and output route setting step.

In a seventh aspect of the present invention, a computer program for a data processing method includes a tap coefficient generation control step of controlling the generation of the tap coefficient from the tap generation information in the first through N'-th storage devices (N'≦N) mounted on the loading and unloading unit, an input and output route setting step of setting an input and output route of data for each of the first through N'-th storage devices, and a data supply control step of controlling the supply of data from one storage device to another among the first through N'-th storage devices in accordance with the input and output route set in the input and output route setting step.

In an eight aspect of the present invention, a storage medium stores a computer program for data processing method and includes a tap coefficient generation control step of controlling the generation of the tap coefficient from the tap generation information in the first through N'-th storage devices (N'≦N) mounted on the loading and unloading unit, an input and output route setting step of setting an input and output route of data for each of the first through N'-th storage devices, and a data supply control step of controlling the supply of data from one storage device to another among the first through N'-th storage devices in accordance with the input and output route set in the input and output route setting step.

In a ninth aspect of the present invention, a data processing system includes first through N-th storage devices which store tap generation information for generating a tap coefficient for each predetermined class for a data conversion process of converting first data into second data higher in quality level than the first data, and a data processing apparatus that allows the first through N-th storage devices to be detachably loaded therein. Each of the first through N-th storage device includes tap generation information storage unit which stores the tap generation information for generating the tap coefficient, a tap coefficient generator which generates the tap coefficient from the tap generation information under the control of the data processing apparatus, a tap extractor which extracts, from the first data supplied from the data processing apparatus, a predictive tap which is used to predict target data which is of interest in the second data, a class tap extractor which extracts, from the first data supplied from the data processing apparatus, a class tap which is used to classify the target data into one of a plurality of classes, a class classifier which classifies the target data according to the class tap, and a predictor which predicts the target data from the tap coefficient and the predictive tap of the class of the target data, and supplies the data processing apparatus with the target data. The data processing apparatus includes a loading and unloading unit on which each of the first through N-th storage devices is mounted, a tap coefficient generation control unit which controls the generation of the tap coefficient from the tap generation information in the first through N'-th storage devices (N'≦N) mounted on the loading and unloading unit, an input and output route setting unit which sets an input and output route of data for each of the first through N'-th storage devices, and a data supply control unit which controls the supply of data from one storage device to another among the first through N'-th storage devices in accordance with the input and output route set by the input and output route setting unit.

In a tenth aspect of the present invention, a storage device includes a tap generation information storage unit which stores tap generation information for generating a tap coefficient for each predetermined class for a data conversion process of converting first data into second data higher in quality level than the first data, the tap coefficient being generated from the tap generation information stored in the storage device and the tap generation information stored in another storage device, and a tap generation information supply unit which supplies the data processing apparatus with the tap generation information.

In an eleventh aspect of the present invention, a data processing apparatus includes a loading and unloading unit on which each of the first through N-th storage devices is mounted, a tap coefficient generator unit which generates the tap coefficient from the tap generation information in the first through N'-th storage devices (N'≦N) mounted on the loading and unloading unit, a predictive tap extractor which extracts the first data having a predictive tap which is used to predict target data which is of interest in the second data, a class tap extractor which extracts the first data having a class tap which is used to classify the target data into one of a plurality of classes, a class classifier which classifies the target data based on the class tap, and a predictor which predicts the target data based on the tap coefficient and the predictive tap of the class of the target data.

In a twelfth aspect of the present invention, a data processing method includes a tap coefficient generation step of generating the tap coefficient from the tap generation information in the first through N'-th storage devices (N'≦N) loaded in the data processing apparatus, a predictive tap extracting step of extracting the first data having a predictive tap which is used to predict target data which is of interest in the second data, a class tap extracting step of extracting the first data having a class tap which is used to classify the target data into one of a plurality of classes, a class classifying step of classifying the target data based on the class tap, and a predicting step of predicting the target data based on the tap coefficient and the predictive tap of the class of the target data.

In a thirteenth aspect of the present invention, a computer program of a data processing method includes a tap coefficient generation step of generating the tap coefficient from the tap generation information in the first through N'-th storage devices (N'≦N) loaded in the data processing apparatus, a predictive tap extracting step of extracting the first data having a predictive tap which is used to predict target data which is of interest in the second data, a class tap extracting step of extracting the first data having a class tap which is used to classify the target data into one of a plurality of classes, a class classifying step of classifying the target data based on the class tap, and a predicting step of predicting the target data based on the tap coefficient of and the predictive tap of the class of the target data.

In a fourteenth aspect of the present invention, a storage medium stores a computer program for a data processing method and includes a tap coefficient generation step of generating the tap coefficient from the tap generation information in the first through N'-th storage devices (N'≦N) loaded in the data processing apparatus, a predictive tap extracting step of extracting the first data having a predictive tap which is used to predict target data which is of interest in the second data, a class tap extracting step of extracting the first data having a class tap which is used to classify the target data into one of a plurality of classes, a class classifying step of classifying the target data based on the class tap, and a predicting step of predicting the target data based on the tap coefficient and the predictive tap of the class of the target data.

In a fifteenth aspect of the present invention, a data processing system includes first through N-th storage devices storing tap generation information for generating a tap coefficient for each predetermined class for a data conversion process of converting first data into second data higher in quality level than the first data, and a data processing apparatus on which the first through N-th storage devices are detachably loaded. Each of the first through N-th storage devices includes a tap generation information storage unit which stores tap generation information for generating the tap coefficient, the tap coefficient being generated from the tap generation information and tap generation information stored in another storage device, and a tap generation information supply unit which supplies the data processing apparatus with the tap generation information. The data processing apparatus includes a loading and unloading unit on which each of the first through N-th storage devices is mounted, a tap coefficient generator which generates the tap coefficient from the tap generation information in the first through N'-th storage devices (N'≦N) mounted on the loading and unloading unit, a predictive tap extractor which extracts the first data having a predictive tap which is used to predict target data which is of interest in the second data, a class tap extractor which extracts the first data having a class tap which is used to classify the target data into one of a plurality of classes, a class classifier which classifies the target data based on the class tap, and a predictor which predicts the target data based on the tap coefficient and the predictive tap of the class of the target data.

In accordance with the first through fourth aspects of the present invention, the tap coefficient is produced from the tap generation information under the control of the data processing apparatus. The predictive tap used to predict the target data which is of interest in the second data and the class tap used to classify the target data into one of the plurality of classes are extracted from the first data supplied from the data processing apparatus. Based on the class tap, the target data is classified, and based on the tap coefficient and the predictive tap of the class of the target data, the target data is predicted and then fed to the data processing apparatus.

In accordance with the first, sixth, seventh, and eighth aspects of the present invention, the generation of the tap coefficient from the tap generation information in the first through N'-th storage devices (N'≦N) mounted on the loading and unloading unit is controlled, and the input and output route of data for each of the first through N'-th storage devices is set. The supply of data from one storage device to another among the first through N'-th storage devices is controlled in accordance with the input and output route set by the input and output route setting unit.

In accordance with the data processing system of the ninth aspect of the present invention, the tap coefficient is generated from the tap generation information in each of the first through N-th storage devices under the control of the data processing apparatus. The predictive tap used to predict the target data, which is of interest in the second data, and the class tap used to classify the target data into one of the plurality of classes are extracted from the first data supplied from the data processing apparatus. Based on the class tap, the target data is classified. The target data is predicted from the tap coefficient and the predictive tap of the class of the target data, and is then fed to the data processing apparatus. In the data processing apparatus, the generation of the tap coefficient from the tap generation information is controlled in the first through N'-th storage devices (N'≦N) mounted thereon. The input and output route of data is respectively set for each of the first through N'-th storage devices. Using the set input and output routes, the supply of data from the one storage device to another storage device is controlled among the first through N'-th storage devices.

In accordance with the storage device of the tenth aspect, the tap generation information storage unit stores the tap generation information for generating the tap coefficient for each predetermined class for the data conversion process of converting the first data into the second data higher in quality level than the first data. The tap coefficient is generated from the tap generation information in the storage device and tap generation information in another storage device. The tap generation information is then fed to the data processing apparatus.

In accordance with the eleventh through fourteenth aspects of the present invention, the tap coefficient is generated from the tap generation information in the first through N'-th storage devices (N'≦N) mounted on the loading and unloading unit. The first data having the predictive tap which is used to predict the target data which is of interest in the second data is extracted. The first data having a class tap which is used to classify the target data into one of a plurality of classes is extracted. The target data is classified based on the class tap. The target data is predicted based on the tap coefficient and the predictive tap of the class of the target data.

In accordance with the data processing system of the fifteenth aspect of the present invention, each of the first through N-th storage devices stores the tap generation information for generating the tap coefficient. The tap coefficient is generated from the tap generation information in the storage device and tap generation information stored in another storage device. The data processing apparatus is supplied with the tap generation information. The tap coefficient is generated from the tap generation information in the first through N'-th storage devices (N'≦N) mounted on the loading and unloading unit. The first data having the predictive tap which is used to predict the target data which is of interest in the second data is extracted. The first data having a class tap which is used to classify the target data into one of a plurality of classes is extracted. The target data is classified based on the class tap. The target data is predicted based on the tap coefficient and the predictive tap of the class of the target data.

BRIEF DESCRIPTION OF THE DRAWINGS

FIG. 36 is a chart explaining that the number of classes increases with the number of mounted video processor cards 13;

DESCRIPTION OF THE PREFERRED EMBODIMENTS

Figure 1:
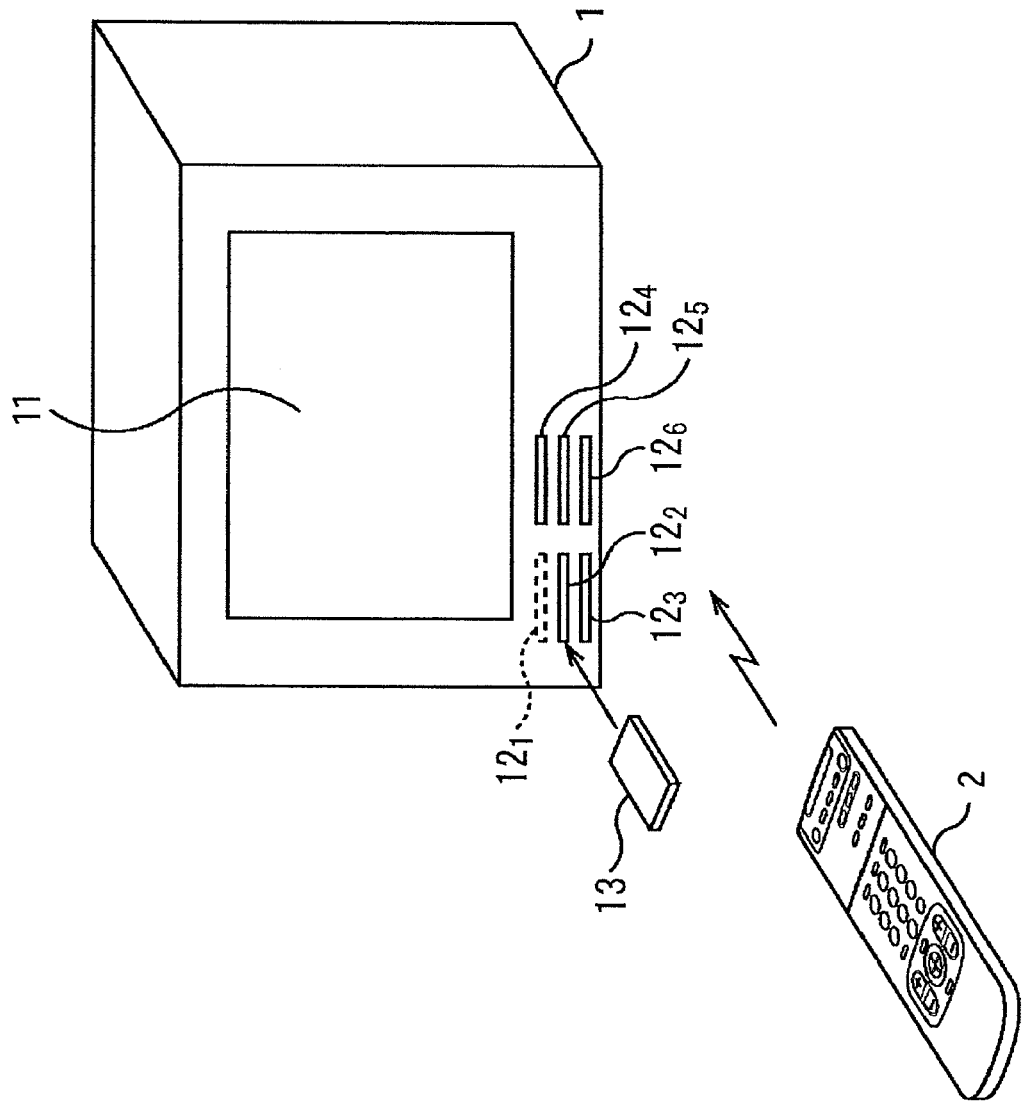
FIG. 1 is a perspective view illustrating the construction of a television receiver in accordance with one embodiment of the present invention.

FIG. 1 is the external view of a television receiver of one embodiment of the present invention.

As shown, the television receiver includes a main unit 1 and a remote controller 2.

A CRT (Cathode Ray Tube) 11 is mounted on the front of the main unit 1, and a video such as a television program is presented on the CRT 11.

Six slots $12_1$ through $12_6$ are arranged on the bottom of the main unit 1. A video processor card $13_i$ is loaded into and unloaded from the slot $12_i$.

In the embodiment shown in FIG. 1, a video processor card $13_1$ is already mounted in the slot $12_1$ of the six slots $12_1$ through $12_6$ in a default setting. The slot $12_1$ is closed with a cover so that the video processing card $13_1$ is not easily pulled out.

Although the six slots $12_1$ through $12_6$ are arranged in the embodiment shown in FIG. 1, the number of slots is not limited to six. Five slots or less or seven slots or more may be used.

The video processing card 13 is an IC (Integrated Circuit) card or a memory card, which adds functions to the main unit 1 of the television receiver. With the video processing card 13 inserted into the slot $12_i$, the user enjoys a diversity of functions as will be discussed later.

The video processing card 13 complies with existing standards such as PCMCIA (Personal Computer Memory Card International Association) standards. Alternatively, the video processing card 13 may be the one complying with any other standards such as in-house standards.

The remote controller 2 is operated to change a receiving channel or volume control setting, or to input other commands to the main unit 1. In response to an operational input, the remote controller 2 emits infrared light. The main unit 1 receives the infrared light, and carries out a process responsive to the operation of the remote controller 2.

The remote controller 2 may use radiowave in compliance with Bluetooth (Trade Name), instead of infrared light.

Figure 2:
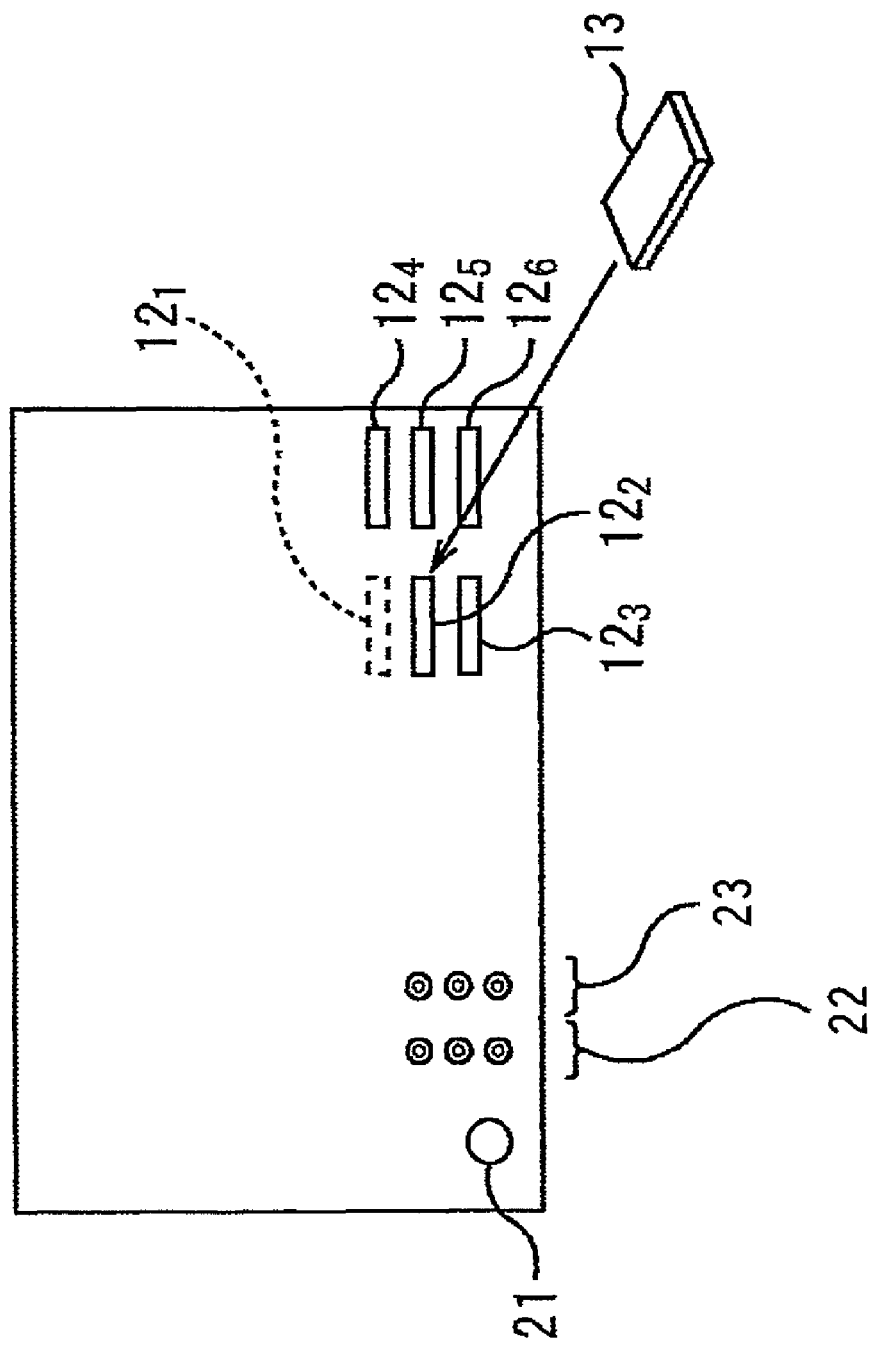
FIG. 2 is a rear view of a main unit of the television receiver.

FIG. 2 is a rear view of the main unit 1 of FIG. 1.

Arranged on the rear side of the main unit 1 are an antenna terminal 21 to which an antenna (not shown) is connected through a cable, input terminals 22 for receiving video and audio signals in the main unit 1, and output terminals 23 for outputting video and audio signals from the main unit 1.

The slots $12_1$ through $12_6$, which are arranged on the front panel of the main unit 1 as shown in the embodiment shown in FIG. 1, may be arranged on the rear panel of the main unit 1 as shown in FIG. 2.

Rather than installing all slots $12_1$ through $12_6$ on either the front panel or the rear panel, some of the slots may be arranged on the front panel, and the remaining slots may be arranged on the rear panel.

The video processor card $13_i$ may be constructed to be like a PCI (Peripheral Component Interconnect) card, which is typically used as an expanded memory for computers. In this case, the slot $12_i$ must be constructed to receive a PCI card.

Figure 3:
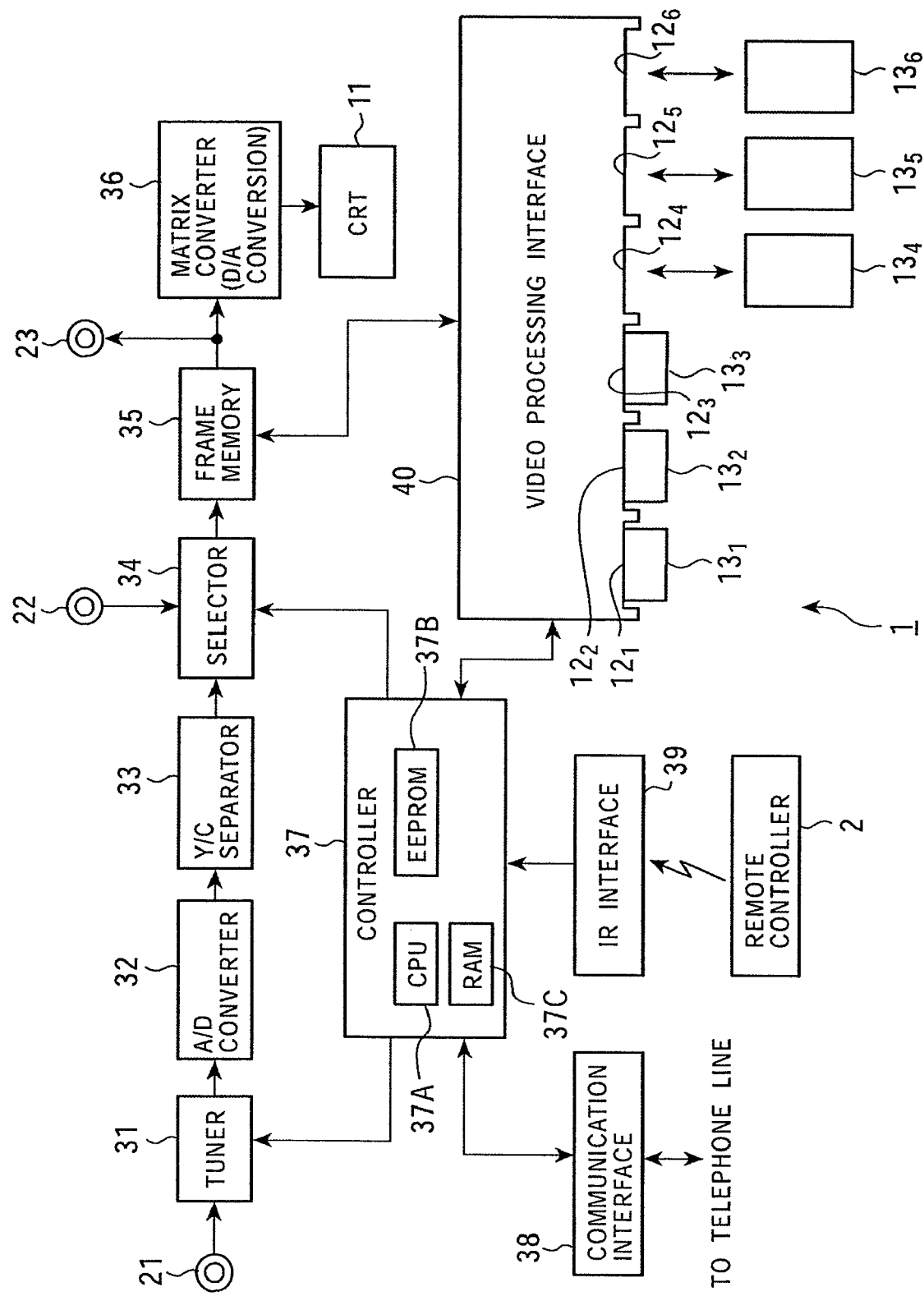
FIG. 3 is an electrical block diagram of the main unit.

FIG. 3 is an electrical block diagram of the main unit 1 of FIG. 1.

A tuner 31 receives a signal from the antenna (not shown) through the antenna terminal 21. Under the control of a controller 37, the tuner 31 detects and decodes a television broadcast signal at a predetermined channel, and supplies an A/D (analog-to-digital) converter 32 with a decoded signal.

The A/D converter 32 analog-to-digital converts the television broadcast signal from the tuner 31, and supplies a Y/C separator 33 with video data of the resulting digital signal.

The A/D converter 32 also outputs audio data of the television broadcast signal to a loudspeaker (not shown).

The Y/C separator 33 Y/C performs Y/C separation process on the video data from the A/D converter 32 and feeds the Y/C separated signals to a selector 34. Under the control of the controller 37, the selector 34 selects between the video data supplied from the Y/C separator 33 and the video data supplied through the input terminals 22, and then feeds the selected video data to a frame memory 35.

The frame memory 35 stores the video data fed from the selector 34, and feeds the video data to the output terminals 23 and matrix converter 36. The frame memory 35 stores the video data supplied from the selector 34, and then feeds the stored video data to a video processing interface 40. Further, the frame memory 35 stores video data from the video processing interface 40 after being subjected to predetermined video processing, and then feeds that video data to the output terminals 23 and the matrix converter 36.

The frame memory 35 contains at least first through fourth banks for storing one frame (field) of video data. The frame memory 35 stores the video data from the selector 34 alternately on the first bank and the second bank. The video data is read from one of the first and second banks which has no video data written from the selector 34, and is fed to the video processing interface 40. The frame memory 35 stores the video data output from the video processing interface 40 alternately on the third and fourth banks. The video data is read from one of the third and fourth banks which has no video data written from the video processing interface 40, and is fed to the matrix converter 36.

The frame memory 35 performs bank switching in this way, thereby writing thereto the video data supplied from the selector 34, reading the video data therefrom to the video processing interface 40, writing the video data thereto from the video processing interface 40, and reading the video data therefrom to the matrix converter 36 on a real time basis.

The matrix converter 36 converts the video data supplied from the frame memory 35 into RGB video data, and then converts the RGB video data into analog data. The video data output from the matrix converter 36 is fed to the CRT 11.

The controller 37 includes a CPU (Central Processing Unit) 37A, EEPROM (Electrically Erasable Programmable Read Only Memory) 37B, and RAM (Random Access Memory) 37C, and controls the tuner 31, selector 34, communication interface 38, and video processing interface 40.

Various processes are performed under the control of programs stored in the CPU 37A and EEPROM 37B. The tuner 31, selector 34, communication interface 38, and video processing interface 40 are thus controlled. The CPU 37A performs a process responsive to a command fed from an IR (Infrared Ray) interface 39. The CPU 37A controls the communication interface 38, thereby accessing a server (not shown) through a telephone line, for example, and acquiring an upgraded program and required data from the server.

The EEPROM 37B stores programs and data which must be stored even after power off. Program upgrading may be performed by simply overwriting existing ones by new programs and data.

The RAM 37C temporarily stores the data and program required by the CPU 37A in operation.

For example, the communication interface 38 includes an analog modem, ADSL (Asymmetrical Digital Subscriber Line) modem, DSU (Digital Service Unit), TA (Terminal Adapter), LAN (Local Area Network), etc. Under the control of the controller 37, the communication interface 38 controls communication through a telephone line or other communication line.

In response to infrared light from the remote controller 2, the IR interface 39 photoelectrically converts the infrared light to an electrical signal and feeds the electrical signal to the controller 37.

The video processing interface 40 has slots $12_1$ through $12_6$ in which video processor cards $13_1$ through $13_6$ are respectively inserted. Together with a video processor card $13_i$ inserted into a slot $12_i$, the video processing interface 40 performs video processing (data conversion process) on the video data stored in the frame memory 35 as will be discussed later.

The video processor card $13_i$ is inserted into the slot $12_i$ in the embodiment shown in FIG. 3. The video processor card $13_i$ may be inserted into any of the six slots $12_1$ through $12_6$. In this embodiment, the video processor card $13_i$ is inserted into the slot $12_i$ for simplicity of explanation.

In this embodiment, the video processing interface 40 had the six slots $12_1$ through $12_6$ into which the six types of video processor cards $13_1$ through $13_6$ may be respectively inserted. In the embodiment shown in FIG. 3, three types of video processor cards $13_1$ through $13_3$ are respectively inserted into the slot $12_1$ through $12_3$.

The slot $12_i$ has predetermined terminals therewithin in this embodiment. With the video processor card $13_i$ put into physical contact with these terminals, the video processor card $13_i$ is electrically connected to the video processing interface 40 to exchange a variety of pieces of data therebetween. Alternatively, the exchange of data between the video processor card $13_i$ and the video processing interface 40 may be performed using radio communication.

Figure 4:
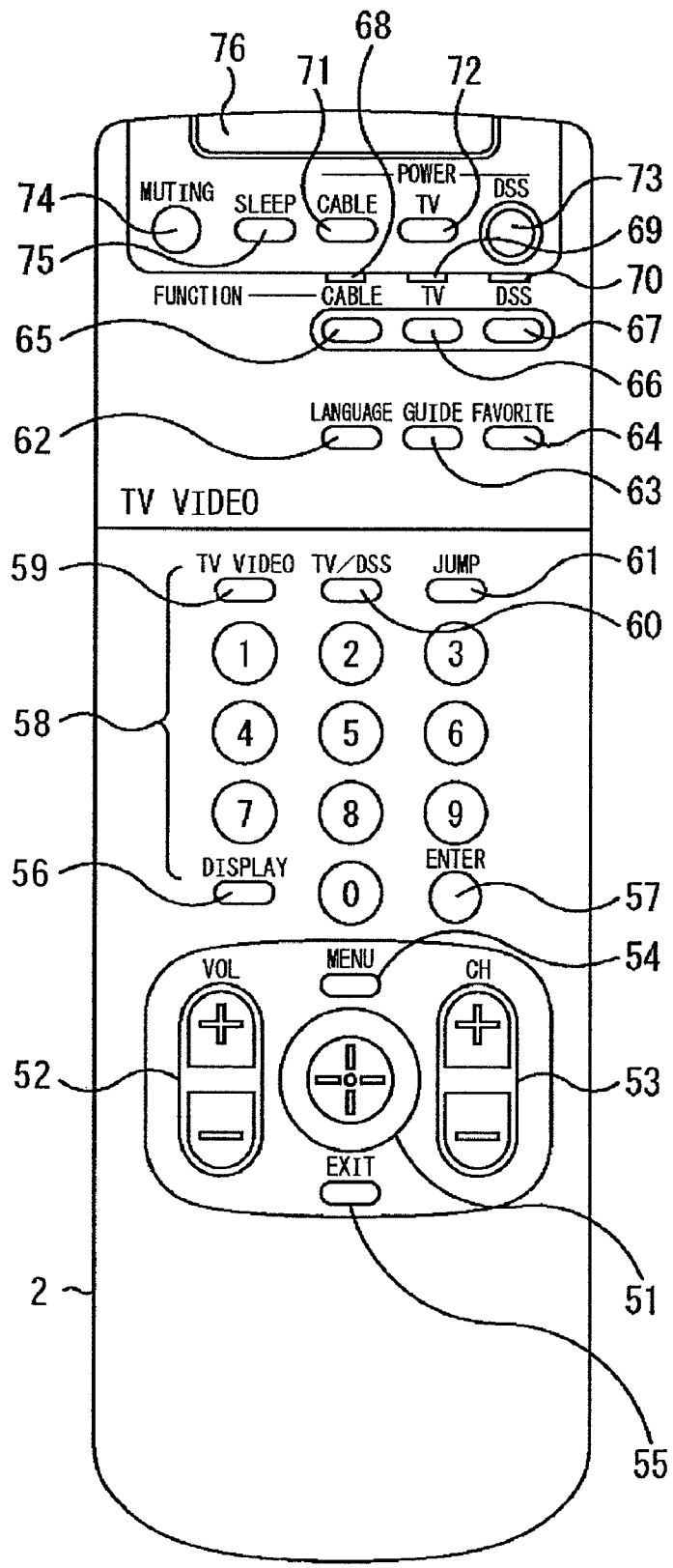
FIG. 4 is a plan view of a remote controller.

FIG. 4 is a plan view of the remote controller 2.

A selection button switch 51 operates in eight directions, namely, vertically up and down, horizontally leftward and rightward, and four diagonal directions (directional operations). The selection button switch 51 can be vertically pressed with respect to the top surface of the remote controller 2 (selection operation). A menu button switch 54 is operated to present, on the CRT 11 of the main unit 1, a menu screen on which a variety of settings and commands for performing a predetermined process are input.

When the menu screen is presented, a cursor appears on the CRT 11 to point to an item of a menu. When the selection button switch 51 is operated for the directional operation, the cursor moves in a direction corresponding to the directional operation. If the selection button switch 51 is operated in the selection operation with the cursor placed on a predetermined item, the selection of the corresponding item is input. Icons may be presented on the menu. When the selection button switch 51 clicks an icon, the selection operation is carried out.

An exit button switch 55 is operated to return to a standard screen from the menu screen.

A volume button switch 52 is operated for high volume setting or for low volume setting. A channel up/down button switch 53 is operated to change the receiving channel for high channel number or low channel number.

Numeric button switches 58 labeled 0 through 9 are operated to input corresponding numbers. The operation of each numeric button switch 58 is followed by the pressing of an ENTER button switch 57 to enter the corresponding number really. When the channel is switched, a new channel number is presented in OSD (On Screen Display) on the screen of the CRT 11 of the main unit 1 for a predetermined duration of time. A display button 56 switches on and off the OSD of the currently selected channel number and volume level.

A TV/video switching button 59 is used to switch the input to the main unit 1 between the signal from the tuner 31 and the signal from the input terminals 22. A TV/DSS switching button switch 60 is operated to switch between a TV mode for receiving ground waves through the tuner 31 and DSS mode (Digital Satellite System (Trade Name of Hughes Communications)) for receiving satellite broadcasting. When channel switching is performed operating the numeric button switched 58, the channel prior to channel switching is stored. A jump button switch 61 is used to return to the prior channel.

A language button 62 is used to select a predetermined language when broadcasting is performed in two or more languages. A guide button switch 63 is operated to display an EPG (Electronic Program Guide) on the CRT 11. A favorite button switch 64 is operated to select a predetermined channel preferred by the user.

A cable button switch 65, TV switch 66, and DSS button switch 67 are used to switch the apparatus category indicated by a command code corresponding to infrared light emitted from the remote controller 2. Specifically, the remote controller 2 is able to remote control an STB or IRD (not shown) besides the main unit 1 of the television receiver. The cable button switch 65 is used to control a STB (Set Top Box) that receives a signal coming in through a CATV network with the remote controller 2. Subsequent to the operation of the cable button switch 65, the remote controller 2 transmits infrared light corresponding to the command code of the apparatus category assigned to the STB. Similarly, the TV switch 66 is used when the main unit 1 is controlled by the remote controller 2. The DSS button switch 67 is used when the remote controller 2 controls the IRD (Integrated Receiver and Recorder) that receives a signal transmitted through a satellite.

LEDs (Light Emitting Diodes) 68, 69, and 70 are respectively lit when the cable button switch 65, TV switch 66, and DSS button switch 67 are turned on. These LEDs thus indicate to the user which apparatus category is currently controlled by the remote controller 2. The LEDS 68, 69, and 70 are extinguished respectively when the cable button switch 65, TV switch 66, and DSS button switch 67 are turned off.

A cable power-supply button switch 71, TV power-supply button switch 72, and DSS power-supply button switch 73 are respectively operated to switch on or off the power supplies of the STB, the main unit 1, and the IRD.

A muting button switch 74 is operated to set or reset the muting state of the main unit 1. A sleep button switch 75 sets or resets a sleep mode which automatically turns off the power when it becomes a predetermined time or a predetermined duration of time has elapsed.

A light emitter 76 emits infrared light corresponding to an input on the remote controller 2 when the user operates the remote controller 2.

Figure 5:
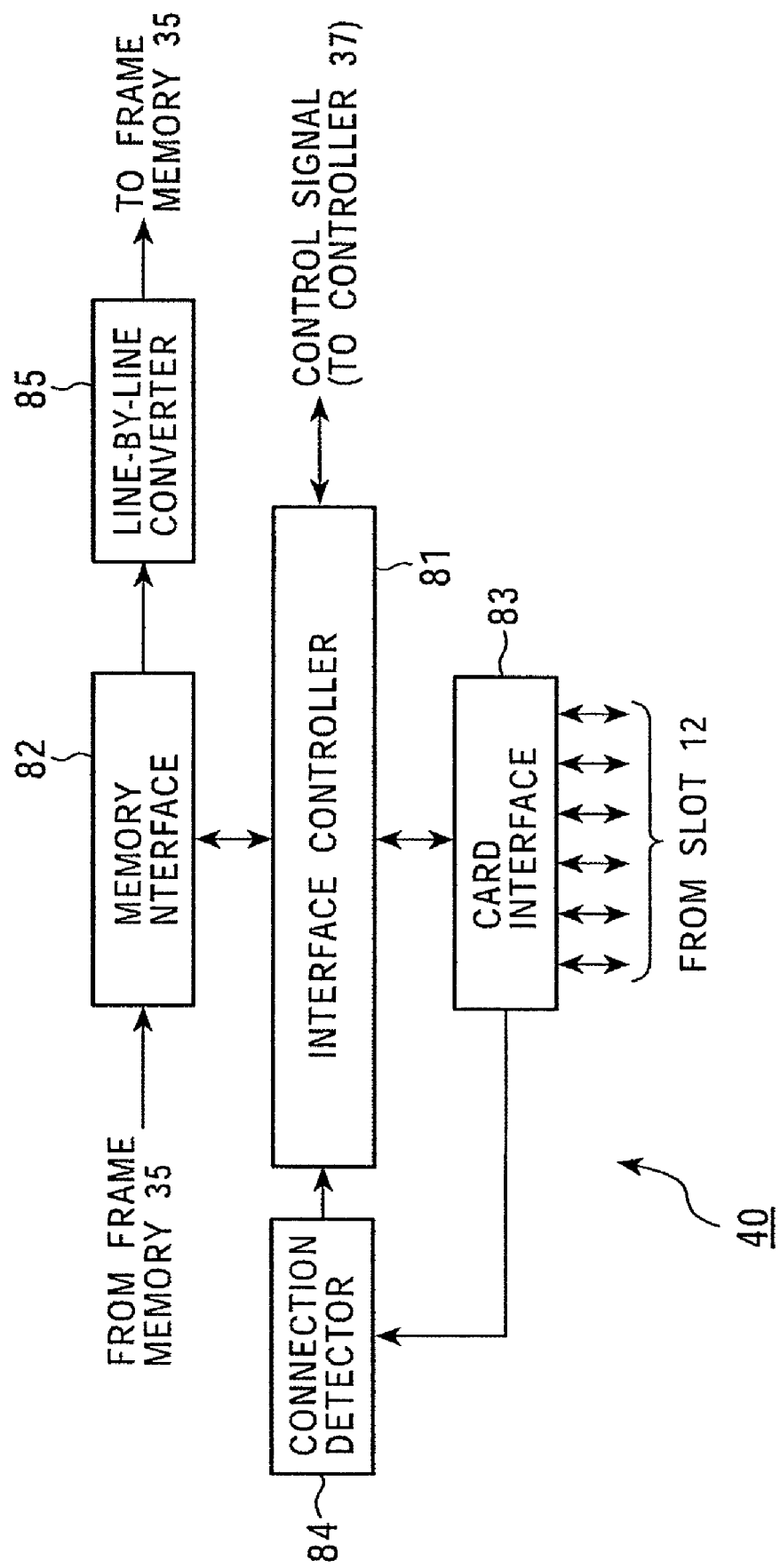
FIG. 5 is a block diagram illustrating a first construction of a video processing interface 40.

FIG. 5 illustrates the construction of a first embodiment of the video processing interface 40 shown in FIG. 3.

An interface controller 81 controls a memory interface 82. In response to an output from a connection detector 84, the interface controller 81 detects the loading or unloading of the video processor card $13_i$ into or from the slot $12_i$. In response to the detection result, the interface controller 81 controls a card interface 83. The interface controller 81 controls the exchange of data between the memory interface 82 and the card interface 83.

Under the control of the interface controller 81, the memory interface 82 reads video data from the frame memory 35 (see FIG. 3), and feeds the video data to the interface controller 81. The memory interface 82 receives the video data supplied from the interface controller 81, and feeds the video data to a line-by-line converter 85.

The card interface 83, controlled by the interface controller 81, supplies the video processor card $13_i$ inserted in the slot $12_i$, with the video data supplied from the interface controller 81.

The card interface 83, connected to the slots $12_1$ through $12_6$, receives the video data and a control signal supplied from the interface controller 81, and feeds the video data and the control signal to the video processor card $13_i$ inserted in the slot $12_i$.

The card interface 83 receives data such as video data and control signals from the video processor card $13_i$ inserted in the slot $12_i$, and then feeds the video data and control signals to the interface controller 81 and another video processor card $13_j$ inserted in another slot $12_j$.

The card interface 83 supplies the connection detector 84 with a voltage (terminal voltage) at a terminal of the slot $12_i$.

The connection detector 84 monitors the terminal voltage of each of the slots $12_1$ through $12_6$ through the card interface 83, and checks to see if the video processor card $13_i$ is loaded into or unloaded from the slot $12_i$ in response to a change in the terminal voltage. The connection detector 84 feeds the detected result to the card interface 83. Alternatively, the detection of the loading and unloading of the video processor card $13_i$ may be mechanically performed.

The line-by-line converter 85 converts the scanning method of the video data supplied from the memory interface 82, for example, from an interlace scanning method to a line-by-line scanning method (non-interlace scanning method), or from the line-by-line scanning method to the interlace scanning method, as appropriate, and feeds the video data to the frame memory 35 for storage there.

Figure 6:
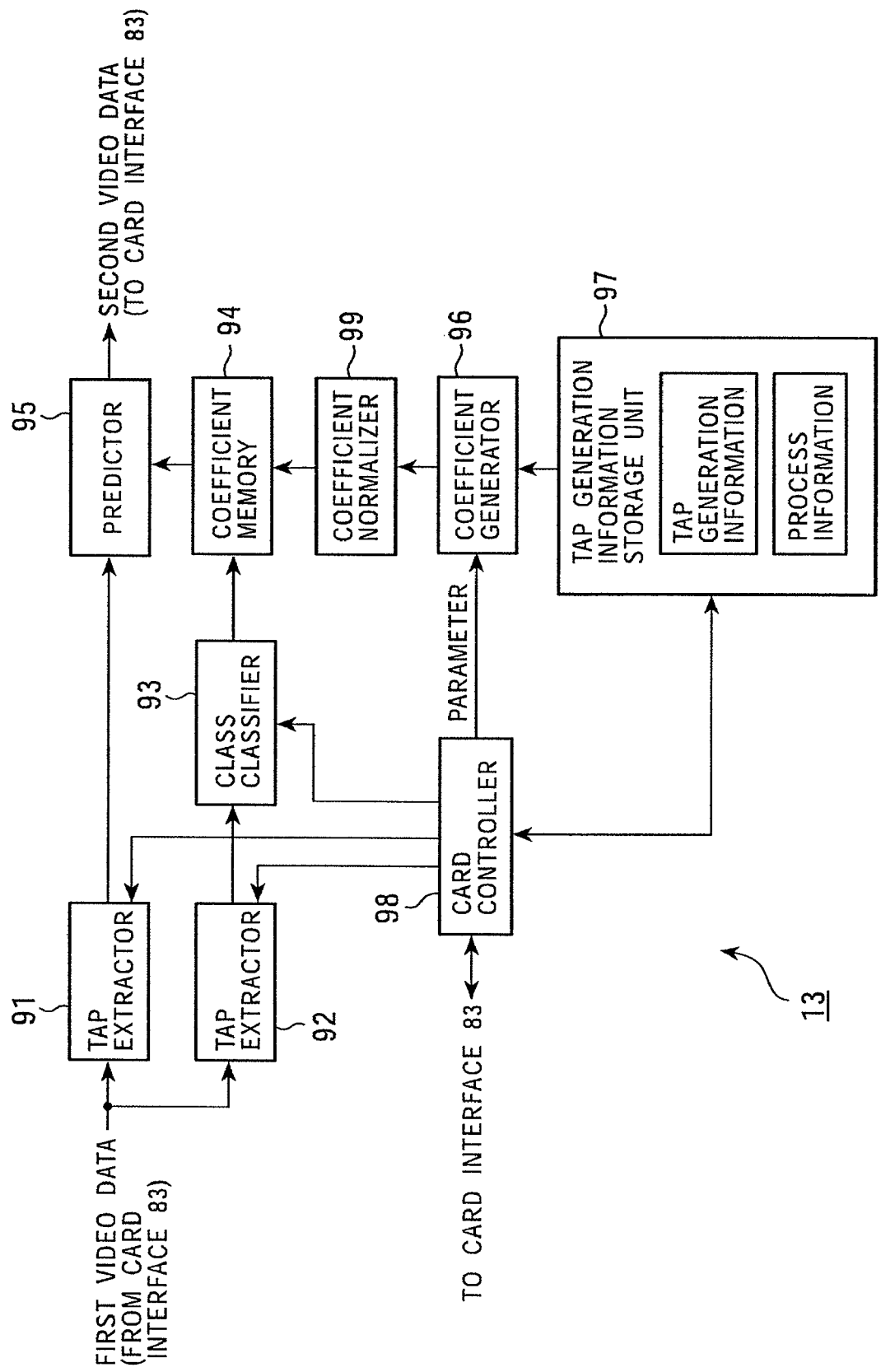
FIG. 6 is a block diagram illustrating a first construction of a video processor card 13.

FIG. 6 illustrates the construction of the video processor card $13_i$ compatible with the video processing interface 40 constructed as shown in FIG. 5.

In the embodiment illustrated in FIG. 6, the video processor card $13_i$ performs a data conversion process on the video data supplied thereto as first video data into second video data higher in quality level than the first video data.

Let the first video data be a low-resolution video data and the second video data be a high-resolution video data, and the data conversion process may become a resolution enhancement process. If the first video data has a low S/N ratio (signal to noise ratio) with the second video data having a high S/N ratio, the data conversion process may become a noise removal process. If the first video data is video data having a predetermined size with the second video data having a size smaller than or larger than the size of the first video data, the data conversion process may become a resizing process of the video (for scale contraction or scale expansion).

The data conversion process serves various functions depending on the definition of the first and second video data.

Tap extractors 91 and 92 receive the first video data, which must be subjected to the data conversion process, from the card interface 83 (see FIG. 5).

The tap extractor 91 successively sets each pixel forming the second video data as the target pixel. The tap extractor 91 extracts, as a predictive tap, several pixels (values) forming the first pixel data which is used to predict the pixel value of the target pixel.

Specifically, the tap extractor 91 extracts, as the predictive tap, a plurality of pixels close in space or in time to a pixel of the first data corresponding to the target pixel (namely, a pixel of the first video data closest to a pixel at the same position as the target pixel). For example, the plurality of pixels includes the pixel corresponding to the target pixel, and pixels adjacent to that pixel.

The tap extractor 92 extracts, as a class tap, a plurality of pixels forming the first data which is used to classify the target pixels into a plurality of classes.

The card controller 98 feeds a control signal to the tap extractors 91 and 92. The tap structure of the predictive tap constructed in the tap extractor 91 and the tap structure of the class tap constructed in the tap extractor 92 are set by the control signal from the card controller 98.

The predictive tap and the class tap may have the same tap structure or different tap structures.

The predictive tap obtained by the tap extractor 91 is fed to a predictor 95, and the class tap obtained by the tap extractor 92 is fed to a class classifier 93.

The class classifier 93 classifies the target pixel based on the class tap from the tap extractor 92, and feeds a resulting class code corresponding to the class to a coefficient memory 94.

The class classification method may be ADRC (Adaptive Dynamic Range Coding), for example.

In the method of using the ADRC, the pixel value of the pixel constituting the class tap is ADRC processed, and the class of the target pixel is determined based on the resulting ADRC code.

In K bit ADRC processing, the maximum value MAX and the minimum value MIN of the pixel values of the pixels forming the class tap are detected. DR=MAX−MIN is a localized dynamic range of a set, and the pixel value forming the class tap is re-quantized to K bits based on the dynamic range DR. Specifically, the minimum value MIN is subtracted from the pixel value of each pixel forming the class tap, and the remainder value is divided (quantized) by $DR/2^K$. The pixel values of the pixels of K bits forming the class tap are arranged in a bit train in a predetermined order, and are output as an ADRC code. For example, if a class tap is processed using 1-bit ADRC processing, the minimum value MIN is subtracted from the pixel value of the pixel forming that class tap and the remainder value is divided by the average of the maximum value MAX and the minimum value MIN (with decimal numbers rounded down). In this way, the pixel value of each pixel becomes 1 bit (binarized). A bit train in which 1-bit pixel values are arranged in the predetermined order is output as the ADRC code.

The class classifier 93 may output, as a class code, a pattern of level distribution of the pixel value of the pixel forming the class tap. If it is assumed that the class tap includes the pixel values of N pixels, and that K bits are allowed for the pixel value of the pixel, the number of class codes output from the class classifier 93 becomes $(2^N)^K$. The number of class codes becomes a large number which exponentially increases with bit number K of the pixel value of the pixel.

The class classifier 93 preferably compresses the amount of information of the class tap using the above-referenced ADRC processing, or vector quantization, for class classification.

As discussed above, the class classification is performed based on the pattern of level distribution of the pixel values of the pixels forming the class tap. Alternatively, the class classification may be performed based on the presence or absence of an edge on the pixel corresponding to the target pixel of the class tap, or based on whether the pixel moves (in terms of distance and direction).

The coefficient memory 94 stores the tap coefficient for each class supplied from a coefficient generator 96 through a coefficient normalizer 99. The coefficient memory 94 supplies the predictor 95 with the tap coefficient stored in an address corresponding to the class code supplied from the class classifier 93 (namely, the tap coefficient of the class expressed by the class code supplied from the class classifier 93), out of the tap coefficients stored therein. The tap coefficient corresponds to a coefficient which is multiplied by input data in a tap in a digital filter.

The predictor 95 acquires the predictive tap output from the tap extractor 91 and the tap coefficient output from the coefficient memory 94, and performs predetermined prediction calculation to determine a predictive value of the true value of the target pixel using the predictive tap and the tap coefficient. In this way, the predictor 95 determines and outputs (the predictive value of) the pixel value of the target pixel, namely, the pixel value of the pixel constituting the second video data.

The coefficient generator 96 generates the tap coefficient for each class based on the tap generation information stored in a tap generation storage unit 97 and a parameter supplied from the card controller 98, and then feeds the tap coefficient to the coefficient memory 94 through the coefficient normalizer 99 to be written thereon in an overwrite fashion.

The tap generation storage unit 97 stores the tap generation information to generate the tap coefficient for each class.

The tap generation information may be coefficient seed data which is a seed of the tap coefficient and determined through a learning process as will be discussed later, or may be information that will generate that coefficient seed data.

The slots $12_1$ through $12_6$ in the video processing interface 40 and the video processor cards $13_1$ through $13_6$ are constructed as already discussed with reference to FIG. 6. The tap generation information stored in the tap generation storage unit 97 generates tap coefficients different from video processor card 13 to video processor card 13.

The tap generation storage unit 97 stores the process information which represents the content of the data conversion process which is carried out by the video processor card $13_i$ in video processing.

The process information contains the predictive tap generated (constructed) by the tap extractor 91, information representing the tap structure of the class tap generated by the tap extractor 92, information representing the class classification method carried out by the class classifier 93 (for example, information that class classification is carried out based on the pattern of the level distribution of pixel values, the presence or absence of edges, or whether or not the pixel moves), the number of classes of the tap coefficients generated from the tap generation information, etc.

The process information contains the card ID (Identification) of the video processor card $13_i$. The video processor cards $13_i$ are sequentially numbered with the card IDs. For example, the video processor cards $13_1$ through $13_6$ respectively in the six slots $12_1$ through $12_6$ are assigned card IDs of 1 from 6, respectively, in this embodiment.

Except the video processor card $13_1$ numbered with #1, which is the highest in the order of the card IDs, the video processor card $13_i$ numbered #i ($i \geqq 2$) as the card ID is disabled in operation if the video processor card numbered with $13_{i-1}$ ($i \geqq 2$) having the card ID higher than the video processor card $13_i$ by one is not loaded.

For example, to allow the video processor card $13_6$ numbered with the #6 card ID to operate, the video processor card $13_5$ numbered the card ID #5 must be inserted in the slot thereof. To allow the video processor card $13_5$ numbered the card ID #5 to operate, the video processor card $13_4$ numbered with the card ID #4 must be inserted in the slot thereof. Similarly, to allow the video processor card $13_6$ numbered with the card ID #6, all video processor cards $13_1$ through $13_5$ higher in order than the coefficient generator $13_6$ must remain inserted in their respective slots.

In this embodiment, the process information of the video processor card $13_i$ having the card ID #i contains the process information representing the content of the data conversion process carried out by the video processor card $13_i$, and the content of the data conversion process carried out by the video processor cards $13_{i-1}, 13_{i-2}, \ldots, 13_1$ if all video processor card $13_{i-1}, 13_{i-2}, \ldots, 13_1$ higher in order than the video processor card $13_i$ are loaded.

For example, in this embodiment, the video processor card $13_1$ having the card ID #1 becomes different in the function thereof (the content of the data conversion process) from when the video processor card $13_1$ only is loaded to when both the video processor cards $13_1$ and $13_2$ are loaded. When the video processor card $13_1$ only is loaded, the content of the data conversion process thereof is defined in the process information of the video processor card $13_1$. When both the video processor cards $13_1$ and $13_2$ are loaded, the content of the data conversion process of the video processor card $13_1$ is defined in the process information of the video processor card $13_2$. Furthermore, when both the video processor cards $13_1$ and $13_2$ are loaded, the content of the data conversion process of the video processor card $13_2$ is defined in the process information of the video processor card $13_2$.

Similarly, when the video processor cards $13_1$ through $13_i$ are loaded, the content of the data conversion process of the video processor cards $13_1$ through $13_i$ is defined in the process information of the video processor card $13_i$ having the largest ID number (lowest in order).

In this embodiment, the content of the data conversion process of the video processor cards $13_1$ through $13_i$ when the video processor cards $13_1$ through $13_i$ are loaded are recognized by referencing the process information of the video processor card $13_i$ having the largest card ID.

The card controller 98 controls the exchange of the video data and other data with the card interface 83 (see FIG. 5). The card controller 98 controls the tap extractors 91 and 92, and class classifier 93. Furthermore, the card controller 98 reads the process information from the tap generation storage unit 97 in response to a request from the video processing interface 40, and then feeds the process information to the video processing interface 40. The card controller 98 supplies the coefficient generator 96 with parameters to be discussed later.

The coefficient normalizer 99 normalizes the tap coefficient supplied from the coefficient generator 96 and then feeds the normalized tap coefficient to the coefficient memory 94.

Referring to a flow diagram shown in FIG. 7, the process of the video processing interface 40 shown in FIG. 5 will be discussed now.

In step S1, the interface controller 81 in the video processing interface 40 determines whether the video processor card $13_i$ is newly mounted (loaded) in any slot $12_i$ of the slots $12_1$ through $12_6$ based on the output of the connection detector 84.

If it is determined in step S1 that the video processor card $13_i$ is loaded in the slot $12_i$, in other words, if the connection detector 84 detects a change in the terminal voltage of the slot $12_i$ in response of the loading of the video processor card $13_i$ in the slot $12_i$, the algorithm proceeds to step S3 skipping step S2.

If it is determined that the video processor card $13_i$ is not loaded in the slot $12_i$, the algorithm proceeds to step S2. The interface controller 81 determines whether the video processor card $13_i$ inserted in the slot $12_i$ of the slots $12_1$ and $12_6$ is unloaded based on the output of the connection detector 84.

If it is determined in step S2 that no video processor card $13_i$ is unloaded from the slot $12_i$, the algorithm loops to step S1 to repeat the above process.

If it is determined in step S2 that the video processor card $13_i$ is unloaded from the slot $12_i$, in other words, if it is determined that the connection detector 84 detects a change in the terminal voltage of the slot $12_i$ in response to the unloading of the video processor card $13_i$ from the slot $12_i$, the algorithm proceeds to step S3. The interface controller 81 controls the card interface 83, thereby reading the process information from all video processor cards 13 loaded in slots $12_1$ through $12_6$ (hereinafter referred to as loaded cards).

A control signal for requesting the video processor card $13_i$ to transmit the process information is fed to the card controller 98 in the video processor card $13_i$ (see FIG. 6) through the slot $12_i$. Upon receiving the control signal requesting the process information, the card controller 98 reads the process information from the tap generation storage unit 97, and feeds the process information to the card interface 83. The card interface 83 receives the process information supplied from the video processor card $13_i$, and feeds the process information to the interface controller 81.

The algorithm proceeds to step S4. The interface controller 81 checks the card ID contained in the process information read from the video processor card 13 as a loaded card, and determines the loaded card to be operative (hereinafter also referred to as an effective card).

The interface controller 81 arranges all card IDs of the video processor cards 13 as the loaded cards in ascending order. If the card IDs are consecutive from 1 to n, the (loaded) video processor cards $13_1$ through $13_n$ respectively having the card IDs of from 1 through n become effective cards.

If the video processor card $13_1$ is not loaded in the card ID #1 even with video processor cards 13 loaded in a plurality of slots of the slots $12_1$ through $12_6$, no video processor cards 13 are effective. Even if the video processor card $13_1$ having the card ID #1 and the video processor card $13_3$ having the card ID #3 are loaded in their respective slots with the video processor card $13_2$ having the card ID #2 unloaded, only the video processor card $13_1$ having the card ID #1 becomes effective. The video processor card $13_3$ having the card ID #3 is not an effective card.

If video processor cards 13 having the same card ID are loaded in a plurality of slots of the slots $12_1$ through $12_6$, the interface controller 81 selects one of the video processor cards 13 having the same card ID, thereby rendering the selected one effective.

If a plurality of video processor cards 13 having the same card ID are loaded or if video processor cards 13 having non-consecutive cards IDs are loaded, the interface controller 81 supplies the controller 37 with a control signal to that effect. In this case, the controller 37 presents a predetermined message on the CRT 11 through the selector 34, frame memory 35, and matrix converter 36. The user is thus notified that a plurality of video processor cards 13 having the same card ID are loaded or that video processor cards 13 having non-consecutive card IDs are loaded.

The algorithm proceeds to step S5 after the interface controller 81 determines the effective cards in step S4 as discussed above. The interface controller 81 controls the card interface 83, thereby transmitting the process information read from the video processor card $13_{i(max)}$ having the largest card ID among the effective video processor cards $13_i$ (hereinafter referred to as the maximum ID process information) to the card controllers 98 (see FIG. 6) of each of the effective video processor cards $13_i$. In this way, the interface controller 81 controls the tap structures of the predictive tap and the class tap, the class classification method, and the generation of the tap coefficient in each of the effective video processor cards $13_i$.

Each of the effective video processor cards $13_i$ references the maximum ID process information supplied from (the interface controller 81 in) the video processing interface 40, and recognizes the content of the data conversion process which own video processor card $13_i$ must perform. The effective video processor card $13_i$ generates the predictive tap and the class tap having the tap structure based on the maximum ID process information, performs class classification according to a predetermined class classification method, and generates a predetermined tap coefficient.

In step S6, the interface controller 81 determines an input and output route of video data for the effective video processor card 13, and sets the card interface 83 to transfer the video data in accordance with the input and output route. The algorithm loops to step S1.

The interface controller 81 determines the input and output route so that the video data read from the frame memory 35 is transferred to the effective video processor cards 13 in the order of the card IDs. For example, if the video processor cards $13_1$ through $13_6$ having the card IDs #1 through #6 are respectively loaded in all slots $12_1$ through $12_6$ connected to the card interface 83, the input and output routes are determined so that the video data is transferred in the order of video processor cards $13_1$, $13_2$, $13_3$, $13_4$, $13_5$, and $13_6$.

The video data is transferred in the input and output routes determined by the card interface 83. If the input and output routes are determined so that the video data is transferred to the video processor cards 13 in the order of the video processor cards $13_1$, $13_2$, $13_3$, $13_4$, $13_5$, and $13_6$, the card interface 83 transfers, to the video processor card $13_1$, the video data which is read from the frame memory 35 by the memory interface 82 and is then supplied through the interface controller 81. Upon receiving the video data, which is data converted by the video processor card $13_1$, the card interface 83 transfers the video data to the video processor card $13_2$. Likewise, the card interface 83 transfers the video data in the order of the video processor cards $13_3$, $13_4$, $13_5$, and then $13_6$. When the card interface 83 receives the video data from the video processor card $13_6$, the card interface 83 feeds the video data to the interface controller 81. The video data supplied to the interface controller 81 is stored in the frame memory 35 through the memory interface 82 and line-by-line converter 85, and is then presented on the CRT 11.

As discussed above, the video data is transferred to the effective video processor cards 13 only. The video processor cards 13 which are not set to be effective do not process the video data (because the video data is not transferred thereto).

The data conversion process of the video processor card $13_i$ shown in FIG. 6 is discussed with reference to a flow diagram shown in FIG. 8.

Figure 7:
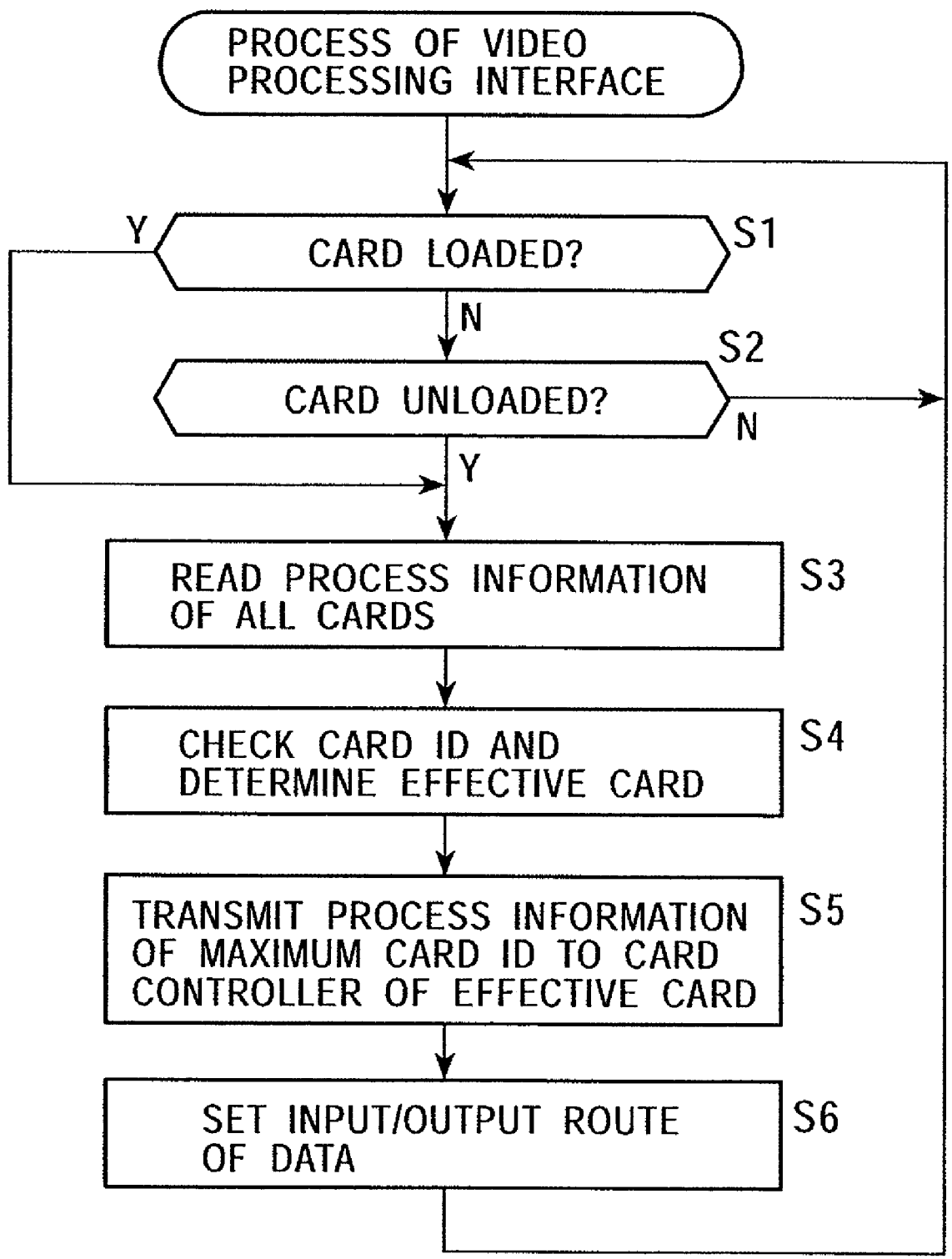
FIG. 7 is a flow diagram illustrating the process of a video interface 40.

In step S11, the card controller 98 determines whether the process information transmitted from the interface controller 81 (see FIG. 5) in step S5 in FIG. 7 is received.

The process information transmitted from the interface controller 81 in step S5 in FIG. 7 is the maximum ID process information, and contains the content of the data conversion process to be carried out by the video processor card $13_i$ which is an effective card.

If it is determined in step S11 that the process information has been received, in other words if it is determined in step S11 that any of the slots $12_1$ through $12_6$ is newly loaded, or that any of the slots $12_1$ through $12_6$ is unloaded, the algorithm proceeds to step S12. When the process information has been received, the video processor card 13 having the maximum card ID changes, and the process information (the maximum ID process information) stored in the video processor card 13 having the maximum ID is transmitted to the card controller 98 from (the card interface 83 in) the video processing interface 40, and the card controller 98 receives the process information. In step S12, the card controller 98 references the maximum ID process information, thereby recognizing the content of the data conversion process which must be carried by own video processor card 13. Depending on the result of the recognition, the card controller 98 controls the tap extractors 91 and 92, and class classifier 93.

The card controller 98 sets an operation mode in the tap extractor 91 or 92 to construct the predictive tap or the class tap having a tap structure described in the maximum ID process information. The card controller 98 sets an operation mode of the class classifier 93 to perform class classification in accordance with a class classification method described in the maximum ID process information.

In step S13, the card controller 98 controls the coefficient generator 96 based on the maximum ID process information, thereby generating a tap coefficient from the tap generation information.

The process information contains information concerning the tap coefficient to be generated from the tap generation information (hereinafter referred to as tap coefficient information). Based on the tap coefficient information, the card controller 98 controls the coefficient generator 96 to generate the tap coefficient from the tap generation information. Under the control of the card controller 98, the coefficient generator 96 generates the tap coefficient for each class from the tap generation information stored in the tap generation storage unit 97, and then feeds the tap coefficient to the coefficient normalizer 99. The card controller 98 then supplies the coefficient generator 96 with a parameter to be discussed later the coefficient generator 96 requires to generate the tap coefficient from the tap generation information.

When the coefficient generator 96 generates the tap coefficient for each class and feeds the tap coefficient to the coefficient normalizer 99, the coefficient normalizer 99 performs a normalization process, for level adjustment to be discussed later, on the tap coefficients for each class in step S14. The tap coefficient for each class subsequent to the normalization process is fed to the coefficient memory 94 for storage. The algorithm then proceeds to step S15.

In step S15, the tap extractor 91 sets, as first video data to be subjected to the data conversion process, the video data supplied from the card interface 83 (see FIG. 5) through the input and output route set in step S6 as shown in FIG. 7, and successively sets, as a target pixel, each of pixels constituting second video data (the video data obtained subsequent to the data conversion process) corresponding to the first video data. The tap extractor 91 extracts a pixel of the first video data with a predictive tap having the tap structure set in step S12. In step S15, the tap extractor 92 extracts a pixel of the first video data with a class tap having the tap structure set in step S12 for the target pixel. The predictive tap is fed to the predictor 95 from the tap extractor 91 and the class tap is fed from the tap extractor 92 to the class classifier 93.

The class classifier 93 receives the class tap of the target pixel from the tap extractor 92. In step S16, the class classifier 93 classifies the target pixel based on the class tap using the class classification method set in step S12. Furthermore, the class classifier 93 outputs, to the coefficient memory 94, a class code representing the class of the target pixel obtained as a result of the class classification. The algorithm then proceeds to step S17.

In step S17, the coefficient memory 94 reads the tap coefficient stored at an address corresponding to the class code supplied from the class classifier 93, namely, the tap coefficient of the class corresponding to the class code, and outputs the tap coefficient. Also in step S17, the predictor 95 acquires the tap coefficient output from the coefficient memory 94. The algorithm then proceeds to step S18.

In step S18, the predictor 95 performs a predetermined prediction calculation (prediction calculation represented by equation (1) to be discussed later) using the predictive tap output from the tap extractor 91 and the tap coefficient retrieved from the coefficient memory 94. The predictor 95 thus determines a pixel value of the target pixel, and feeds the pixel value to the card interface 83 (see FIG. 5). The algorithm loops to step S11 to repeat the same process.

If it is determined in step S11 that the process information has not been received, the algorithm then proceeds to step S15, skipping steps S12 through S14. The same process as described above will then be repeated. The process described in steps S15 through S18 is carried out in accordance with the process information (the maximum ID process information) previously received by the card controller 98.

Discussed next are the prediction calculation of the predictor 95, the generation of the tap coefficient by the coefficient generator 96, and the learning process of coefficient seed data, as one piece of the tap generation information stored in the tap generation storage unit 97 illustrated in FIG. 6.

Now, let the second video data be high-quality video data, and let the first video data be low-quality video data which is obtained by degrading the image quality (resolution) of the high-quality video data, for example, by filtering the high-quality video data through an LPF (Low-Pass Filter). The predictive tap is extracted from the low-quality data, and the pixel value of the high-quality pixel is determined (predicted) using a predetermined prediction calculation based on the predictive tap and predetermined tap coefficient.

If the predetermined prediction calculation is a first order linear prediction calculation, the pixel value y of the high-quality pixel is determined using the following first order equation.

$$y = \sum_{n=1}^{N} w_n x_n \tag{1}$$

where $x_n$ represents a pixel value of a pixel of n-th low-quality video data forming a predictive tap for a high-quality pixel y, and $w_n$ is an n-th tap coefficient which is to be multiplied by (the pixel value of) the n-th low-quality pixel.

In equation (1), the predictive tap includes N low-quality pixels $x_1, x_2, \ldots, x_N$. In accordance with equation (1), the high-quality pixel y is determined by weighting N low-quality pixels $x_1, x_2, \ldots, x_N$ respectively with N tap coefficients $w_1, w_2, \ldots, w_N$, and by summing the weighted low-quality pixels. To prevent a level variation in the high-quality pixel y determined by equation (1), the sum of the tap coefficients, namely, weights, $w_1, w_2, \ldots, w_N$ must be 1. The coefficient normalizer 99 in the video processor card 13 (see FIG. 6) sums the tap coefficients for each class supplied from the coefficient generator 96. Each tap coefficient is normalized by dividing each tap coefficient of the class by the sum of the tap coefficients.

The pixel value y of the high-quality pixel may be determined by second order or higher order equation rather than the first order linear equations in equation (1).

Let $y_k$ represent the true pixel value of a high-quality pixel of a k-th sample, and $y_k'$ represent the predictive value of the true value $y_k$ determined from equation (1), and a predictive error $e_k$ is expressed by equation (2).

$$e_k = y_k - y_k' \tag{2}$$

The predictive value $y_k'$ in equation (2) is determined from equation (1). If the predictive value $y_k'$ determined by equation (1) is substituted in equation (2), equation (3) results.

$$e_k = y_k - \left( \sum_{n=1}^{N} w_n x_{n,k} \right) \tag{3}$$

In equation (3), $x_{n,k}$ represents n-th low-quality pixel forming the predictive tap of the high-quality image at the k-th sample.

A tap coefficient $w_n$ to cause the predictive error $e_k$ to be zero in equation (3) is optimum for predicting the high-quality image. Generally, it is difficult to determine such a tap coefficient $w_n$ for all high-quality pixels.

A measure of an optimum tap coefficient $w_n$ may be based on least square method, for example. The optimum tap coefficient $w_n$ is obtained by minimizing a sum E of the squared errors.

$$E = \sum_{k=1}^{K} e_k^2 \tag{4}$$

where K represents the number of samples (the number of learning samples) of sets, each set including the high image quality pixel $y_i$ and the predictive tap of the low image quality pixel formed of $x_{1,k}, x_{2,k}, \ldots, x_{N,k}$, with respect to the high image quality pixel $y_i$.

The tap coefficient $w_n$ for minimizing the sum E of the squared errors causes the partial differentiation of the sum E with the tap coefficient $w_n$ to be zero. Equation (5) thus holds.

$$\frac{\partial E}{\partial w_n} = e_1 \frac{\partial e_1}{\partial w_n} + e_2 \frac{\partial e_2}{\partial w_n} + \ldots + e_k \frac{\partial e_n}{\partial w_n} = 0 \tag{5}$$

$(n = 1, 2, \ldots, N)$

If the above-referenced equation (3) is partially differentiated with respect to the tap coefficient $w_n$, equation (6) results.

$$\frac{\partial e_k}{\partial w_1} = -x_{1,k}, \frac{\partial e_k}{\partial w_2} = -x_{2,k}, \ldots, \frac{\partial e_k}{\partial w_N} = -x_{N,k}, \quad (6)$$
$$(k = 1, 2, \ldots, K)$$

From equations (5) and (6), equation (7) results.

$$\sum_{k=1}^{K} e_k x_{1,k} = 0, \sum_{k=1}^{K} e_k x_{2,k} = 0, \ldots \sum_{k=1}^{K} e_k x_{N,k} = 0 \quad (7)$$

By substituting equation (3) for $e_k$ in equation (7), equation (7) becomes normal equation (8).

$$\begin{bmatrix} \left(\sum_{k=1}^{K} x_{1,k}x_{1,k}\right) & \left(\sum_{k=1}^{K} x_{1,k}x_{2,k}\right) & \cdots & \left(\sum_{k=1}^{K} x_{1,k}x_{N,k}\right) \\ \left(\sum_{k=1}^{K} x_{2,k}x_{1,k}\right) & \left(\sum_{k=1}^{K} x_{2,k}x_{2,k}\right) & \cdots & \left(\sum_{k=1}^{K} x_{2,k}x_{N,k}\right) \\ \vdots & \vdots & \ddots & \vdots \\ \left(\sum_{k=1}^{K} x_{N,k}x_{1,k}\right) & \left(\sum_{k=1}^{K} x_{N,k}x_{2,k}\right) & \cdots & \left(\sum_{k=1}^{K} x_{N,k}x_{N,k}\right) \end{bmatrix} \begin{bmatrix} w_1 \\ w_2 \\ \vdots \\ w_N \end{bmatrix} = \begin{bmatrix} \left(\sum_{k=1}^{K} x_{1,k}y_k\right) \\ \left(\sum_{k=1}^{K} x_{2,k}y_k\right) \\ \vdots \\ \left(\sum_{k=1}^{K} x_{N,k}y_k\right) \end{bmatrix} \quad (8)$$

Equation (8) may be solved for the tap coefficient $w_n$ using the sweep method (Gauss-Jordan elimination).

By writing and solving the normal equation (8) for each class, the optimum tap $w_n$ (the tap coefficient that minimizes the sum E of the squared errors) is determined for each class.

Figure 9:
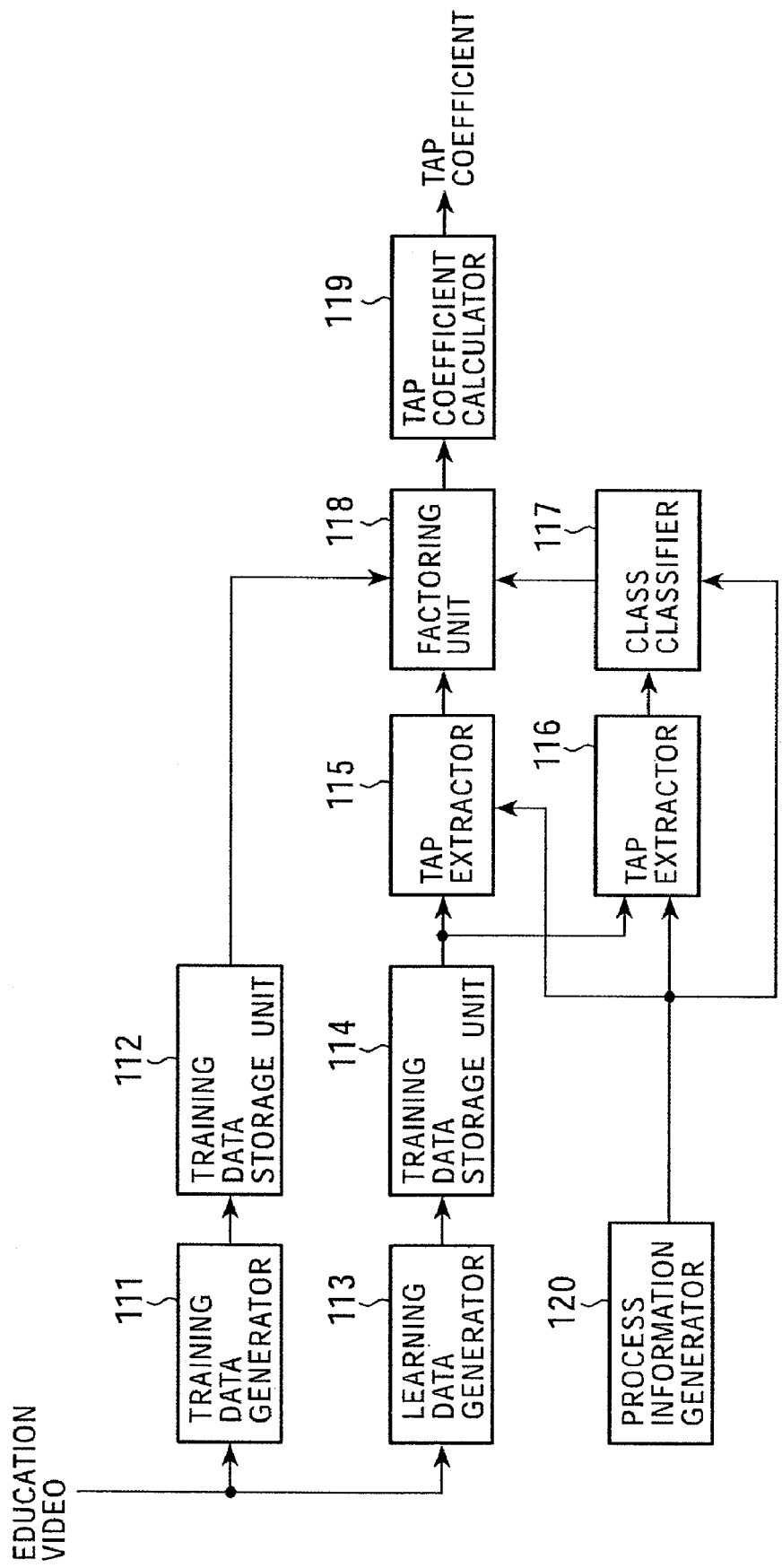
FIG. 9 is a block diagram illustrating a learning device for determining a tap coefficient.

FIG. 9 illustrates the construction of a learning device which performs a learning process for determining the tap coefficient $w_n$ for each class by writing and then solving the normal equation (8).

The learning device receives education video data for use in the learning process. The education video data, here corresponding to the second video data, is high-resolution video data, for example.

In the learning device, the education video data is fed to a training data generator 111 and a learning data generator 113.

The training data generator 111 generates training data from the supplied education video data, and feeds the training data to a training data storage unit 112. Specifically, the training data generator 111 supplies the training data storage unit 112 with the high-quality video data as the training data.

The training data storage unit 112 stores the high-quality data as the training data supplied from the training data generator 111.

In response to the education video data, the learning data generator 113 generates learning data as the first video data, and feeds the learning data to a learning data storage unit 114. Specifically, the learning data generator 113 filters the high-quality video data as the education video data, thereby reducing the resolution of the high-quality video data. Low-quality video data is thus generated, and is fed to the learning data storage unit 114 as the learning data.

The learning data storage unit 114 stores the learning data supplied from the learning data generator 113.

A tap extractor 115 successively sets each of pixels constituting the high-quality video data as the training data stored in the training data storage unit 112 as a target training pixel, and extracts predetermined pixels of low-quality pixels constituting the low-quality video data as the learning data stored in the learning data storage unit 114 with respect to the target training pixel. The tap extractor 115 thus constructs a predictive tap having the same tap structure as the one constructed by the tap extractor 91 shown in FIG. 6, and feeds the predictive tap to a factoring unit 118.

A tap extractor 116 extracts predetermined pixels of low-quality pixels constituting the low-quality video data as the learning data stored in the learning data storage unit 114 with respect to the target training pixel. The tap extractor 116 thus constructs a class tap having the same tap structure as the one constructed by the tap extractor 92 shown in FIG. 6, and feeds the class tap to a class classifier 117.

The tap extractors 115 and 116 receive the process information generated by a process information generator 120. The tap extractors 115 and 116 respectively construct the predictive tap and the class tap having the tap structures represented by the process information supplied from the process information generator 120.

The class classifier 117 performs class classification identical to that performed by the class classifier 93 shown in FIG. 6, based on the class tap output from the tap extractor 116. A class code obtained as a result of the class classification is output to the factoring unit 118.

The class classifier 117 receives the process information generated from the process information generator 120. The class classifier 117 performs class classification using a class classification method represented by the process information supplied from the process information generator 120.

The factoring unit 118 reads the target training pixel from the training data storage unit 112, and performs, for each class, a factoring operation to the read target training pixel and the learning data forming the predictive tap which is constructed with respect to the target training pixel supplied from the tap extractor 115.

Specifically, the factoring unit 118 uses the predictive tap (learning data) $x_{i,k}$ ($x_{j,k}$) for each class corresponding to the class code supplied from the class classifier 117. The factoring unit 118 thus multiplies learning data by learning data ($x_{i,k}$ $x_{j,k}$) and then performs a summing operation to the resulting product of learning data to determine each element in the matrix on the left side of equation (8).

Furthermore, the factoring unit 118 uses the predictive tap (learning data) $x_{i,k}$ and the training data $y_k$ for each class corresponding to the class code supplied from the class classifier 117. The factoring unit 118 thus multiplies the learning data $x_{i,k}$ by the training data $y_k$ and then performs a summing operation to the resulting product ($x_{i,k} y_k$) of the learning data and the training data to determine each element in the vector on the right side of equation (8).

Specifically, the factoring unit 118 stores, in a built-in memory (not shown), the previous elements of the matrix on the left side of equation (8) determined for the training data as the target training pixel and the previous elements in the vector on the right side. As for the training data as a new training pixel, the factoring unit 118 factors in the elements $x_{j,k}x_{j,k}$ or $x_{i,k}y_k$, which are calculated using the training data $y_k$ and the learning data $x_{i,k}(x_{j,k})$, as elements of the matrix and elements in the vector.

The factoring unit 118 performs the factoring operation by treating all training data stored in the training data storage unit 112 as the target pixel, and writes the normal equation (8) for each class, and then feeds the normal equation (8) to a tap coefficient calculator 119.

The tap coefficient calculator 119 solves the normal equation (8) supplied from the factoring unit 118 for each class, thereby determining and outputting the tap coefficient $w_n$ for each class.

The process information generator 120 generates the process information such as the tap structure of the predictive tap and the class tap constructed by each of the video processor cards $13_1$ through $13_6$, and the class classification method of the class classification performed by each of the video processor cards $13_1$ through $13_6$, and feeds the process information to the tap extractors 115 and 116 and class classifier 117. The class structure and the class classification method contained in the process information in the process information generator 120 are stored (registered) beforehand in the process information generator 120.

The learning process of the learning device illustrated in FIG. 9 is discussed with reference to a flow diagram illustrated in FIG. 10.

In step S21, the training data generator 111 and the learning data generator 113 generate and output the training data and learning data, respectively, in response to the education video data. Specifically, the training data generator 111 directly outputs the education video data as the training data. The learning data generator 113 generates the learning data, corresponding to the training data (the education video data) of each frame (or each field), from the education video data by filtering the education video data through an LPF.

The training data output from the training data generator 111 is fed to the training data storage unit 112 for storage, and the learning data output from the learning data generator 113 is fed to the learning data storage unit 114 for storage.

In step S22, the process information generator 120 generates the predetermined process information, and feeds the process information to the tap extractors 115 and 116, and class classifier 117. The tap structure of the predictive tap constructed by the tap extractor 115, the tap structure of the class tap constructed by the tap extractor 116, and the class classification method of the class classifier 117 are set in this way.

In step S23, the tap extractor 115 sets, as a target training pixel, training data stored in the training data storage unit 112 and not yet set as a target. Also in step S23, the tap extractor 115 constructs the predictive tap from the learning data stored in the learning data storage unit 114 in connection with the target training pixel, and feeds the predictive tap to the factoring unit 118. The tap extractor 116 constructs the class tap from the learning data stored in the learning data storage unit 114 in connection with the target training pixel, and feeds the class tap to the class classifier 117.

The tap extractor 115 constructs the predictive tap of having the tap structure set in step S22. The tap extractor 116 constructs the class tap having the tap structure set in step S22.

In step S24, the class classifier 117 classifies the target training pixel based on the class tap of the target training pixel, and outputs the class code corresponding to the resulting class to the factoring unit 118. The algorithm proceeds to step S25.

The class classifier 117 classifies the target training pixel in accordance with the class classification method set in step S22.

In step S25, the factoring unit 118 reads the target training pixel from the training data storage unit 112, and calculates the elements $x_{i,k}x_{j,k}$ in the matrix on the left side of equation (8) and the elements $x_{i,k}y_k$ in the vector on the right side of the equation (8) using the read target training pixel and the predictive tap supplied from the tap extractor 115. Furthermore, the factoring unit 118 factors in the elements $x_{j,k}x_{j,k}$ in the matrix and the elements $x_{i,k}y_k$ in the vector determined from the target pixel and the predictive tap to elements corresponding to the class code from the class classifier 117, out of already obtained elements in the matrix and in the vector. The algorithm proceeds to step S26.

In step S26, the tap extractor 115 determines whether the training data storage unit 112 still stores training data not yet set as a target training pixel. If it is determined in step S26 that the training data storage unit 112 still stores training data not yet set as a target training pixel, the tap extractor 115 sets that training data as a new target training pixel. The algorithm loops to step S23 to perform the same process.

If it is determined in step S26 that the training data storage unit 112 does not store training data not yet set as a target training pixel, the factoring unit 118 supplies the tap coefficient calculator 119 with the matrix on the left side and the vector on the right side of equation (8) obtained for each class from the above process. The algorithm then proceeds to step S27.

In step S27, the tap coefficient calculator 119 solves the normal equation for each class formed of the matrix on the left side and the vector on the right side of equation (8) for each class supplied from the factoring unit 118. The tap coefficient calculator 119 thus determines and outputs the tap coefficient $w_n$ and ends the process.

A class may occur which has an insufficient number of normal equations required to determine the tap coefficient $w_n$ because of an insufficient number of pieces of education video data. For such a class, the tap coefficient calculator 119 outputs a default tap coefficient, for example. The default tap coefficient may be a tap coefficient which is determined without performing class classification (with a total number of classes set to 1). In the above case, the education video data becomes the training data as the second video data, and the low-quality video data that is obtained by degrading the education video data in spatial resolution is set to be the learning data as the first video data. The learning process of the tap coefficient is performed using the first video data and second video data. The tap coefficient is obtained so that the data conversion process is performed as a resolution enhancement process for converting the first video data to the second video data with the resolution thereof enhanced. By storing the tap coefficient in the coefficient memory 94 (see FIG. 6) in the video processor card 13, the video processor card 13 enhances the spatial resolution of the video data.

The tap coefficient performs a variety of data conversion processes depending on the manner of selecting the learning data as the first video data and the training data as the second video data.

For example, the learning process is performed with high-quality video data set to be the training data and video data with noise superimposed thereof set to be the learning data. With the tap coefficient, the data conversion process functions as a noise removal process for converting the first video data to the second video data with noise thereof removed (reduced).

The learning process may performed with video data set to be the training data and the video data with the number of pixels reduced being set to be the learning data. The learning process may be performed with video data having a predetermined size set to be the learning data and with the video data with the pixels thereof reduced at a predetermined decimation ratio set to be the training data. With the tap efficient, the data conversion process functions as a data resizing process for converting the first video data to the second video data which is an expanded version or a contracted version of the first video data.

The video processor card 13 performs the noise removal process or the resizing process (for expansion or contraction) by allowing the tap coefficient for the noise removal process or the tap coefficient for the resizing process to be stored in the coefficient memory 94 (see FIG. 6) in the video processor card 13.

Depending on a set of the training data and the learning data (hereinafter also referred to an education pair) used for learning the tap coefficient, the tap coefficient achieves a variety of image quality improvements such as the enhancement of the resolution, the noise removal, or the resizing process. By allowing the video processor cards $13_1$ through $13_6$ to store the tap coefficient for performing a variety of image quality improvements, the video processor card $13_i$ performs the data conversion process for a variety of image quality improvements.

Furthermore, the learning process may be performed with high-quality video data set to be the training, data and with the high-quality data with the spatial resolution thereof reduced and with noise superimposed thereon set to be the learning data. With the tap coefficient, the data conversion process functions as noise removal process and resolution enhancement process, wherein the first video data is converted into the second video data by removing (reducing) noise and by enhancing the spatial resolution thereof.

The video data may be converted using the tap coefficient for performing both the noise removal process and the resolution enhancement process. The video data may be converted using the tap coefficient for the noise removal process, and then the converted video data may be further converted using the tap coefficient for the resolution enhancement process. Given the same data conversion conditions, these two pieces of resulting video data become different in image quality.

The predictive tap, and the class tap having the same tap structure, and the same class classification method (with the same number of classes) may be used in each of the data conversion process using the tap coefficient for both the noise removal and the resolution enhancement, the data conversion process using the tap coefficient for the noise removal, and the data conversion process using the tap coefficient for the resolution enhancement. Under these conditions, the video data resulting from the data conversion process using the tap coefficient for the noise removal and then the data conversion process using the tap coefficient for the resolution enhancement is better in image quality than the video data resulting from the data conversion process using the tap coefficient for both the noise removal and the resolution enhancement.

The tap generation storage unit 97 in the video processor card 13 can store, as the tap generation information, the tap coefficient for each class determined in the learning device shown in FIG. 9.

Let Z represent the number of classes, and let B represent the size of a set of tap coefficients per class (tap coefficients $w_1, w_2, \ldots, w_N$ defining equation (1)), and the tap generation storage unit 97 forming the video processor card 13 requires at least a memory capacity of Z×B.

Let subscript n be a tap number of a n-th tap coefficient $w_n$ of the set of tap coefficients $w_1, w_2, \ldots, w_N$, and the tap coefficients $w_1$ through $w_N$ for each class are compressed on a per tap number basis. The compressed tap coefficients may be stored in the tap generation storage unit 97 (see FIG. 6) as the tap generation information. The required memory capacity of the tap generation storage unit 97 is thus reduced.

The compression of the tap coefficients $w_1$ through $w_N$ for each class on a per tap number basis may be performed as below.

The tap coefficient $w_n$ is now constructed of coefficient seed data serving as a seed for the tap coefficient and a predetermined parameter in accordance with equation (9).

$$w_n = \sum_{m=1}^{M} \beta_{m,n} z^{m-1} \tag{9}$$

where $\beta_{m,n}$ represents m-th coefficient seed data used to determine an n-th tap coefficient $w_n$, and z represents a parameter. In equation (9), the tap coefficient $w_n$ is determined using M pieces of coefficient seed data $\beta_{1,n}, \beta_{2,n}, \ldots, \beta_{M,n}$.

Equations for determining the tap coefficient $w_n$ from the coefficient seed data $\beta_{m,n}$ and the parameter z are not limited to equation (9).

A value $z^{m-1}$ determined by the parameter z in equation (9) is defined by equation (10) as below by introducing a new variable $t_m$.

$$t_m = z^{m-1} \ (m=1, 2, \ldots, M) \tag{10}$$

Equation (11) may be obtained by combining equations (9) and (10).

$$w_n = \sum_{m=1}^{M} \beta_{m,n} t_m \tag{11}$$

According to equation (11), the tap coefficient $w_n$ is determined (predicted) from a linear first-order equation of the coefficient seed data $\beta_{m,n}$ and the variable $t_m$. Let $w_n'$ represent the tap coefficient determined from equation (11), and let an error $e_n$ represent a difference between an appropriate tap coefficient $w_n$ and the tap coefficient determined $w_n'$ from equation (11), and the coefficient seed data $\beta_{m,n}$ causing the error $e_n$ to be zero becomes appropriate for determining the appropriate $w_n$. It is generally difficult to determine the coefficient seed data $\beta_{m,n}$ for all tap coefficients $w_n$.

$$e_n = w_n - w_n' \tag{12}$$

Equation (12) is rewritten by substituting equation (11) for $w_n'$ on the right side as below.

$$e_n = w_n - \left(\sum_{m=1}^{M} \beta_{m,n} t_m\right) \quad (13)$$

A measure of an optimum coefficient seed data $\beta_{m,n}$ may be based on least square method, for example. The optimum coefficient seed data $\beta_{m,n}$ is obtained by minimizing a sum E of the squared errors expressed by equation (14).

$$E = \sum_{n=1}^{N} e_n^2 \quad (14)$$

The minimum value of the sum E of the squared error expressed by equation (14) results from $\beta_{m,n}$ which causes partial differentiation of the sum E with respect to the coefficient seed data $\beta_{m,n}$ to zero as expressed by equation (15).

$$\frac{\partial E}{\partial \beta_{m,n}} = \sum_{m=1}^{M} 2 \frac{\partial e_n}{\partial \beta_{m,n}} \cdot e_n = 0 \quad (15)$$

Equation (16) is obtained by combining equations (13) and (15).

$$\sum_{m=1}^{M} t_m \left( w_n - \left( \sum_{m=1}^{M} \beta_{m,n} t_m \right) \right) = 0 \quad (16)$$

Now, $X_{i,j}$ and $Y_i$ are respectively defined by equations (17) and (18).

$$X_{i,j} = \sum_{z=1}^{Z} t_i t_j \quad (i=1, 2, \ldots, M: j=1, 2, \ldots, M) \quad (17)$$

$$Y_i = \sum_{z=1}^{Z} t_i w_n \quad (18)$$

Equation (16) is expressed by normal equation (19) using $X_{i,j}$ and $Y_i$.

$$\begin{bmatrix} X_{1,1} & X_{1,2} & \cdots & X_{1,M} \\ X_{2,1} & X_{2,1} & \cdots & X_{2,2} \\ \vdots & \vdots & \ddots & \vdots \\ X_{M,1} & X_{M,2} & \cdots & X_{M,M} \end{bmatrix} \begin{bmatrix} \beta_{1,n} \\ \beta_{2,n} \\ \vdots \\ \beta_{M,n} \end{bmatrix} = \begin{bmatrix} Y_1 \\ Y_2 \\ \vdots \\ Y_M \end{bmatrix} \quad (19)$$

The normal equation (19) may be solved for the coefficient seed data $\beta_{m,n}$ using the sweep method (Gauss-Jordan elimination).

The coefficient seed data $\beta_{m,n}$ determined by solving the normal equation (19) results in the tap coefficient $w_n$ for each parameter z in accordance with equation (9).

When the class of the tap coefficient is used as the parameter z, a set of tap coefficients for class #z is determined based on the parameter (class) z and the coefficient seed data $\beta_{m,n}$ using equation (9).

Let $w^{(z)}_n$ represent an n-th tap coefficient $w_n$ in class #z, and the coefficient seed data $\beta_{m,n}$ for determining the n-th tap coefficient $x^{(z)}_n$ in the class #z using equation (9) is determined by writing and solving the normal equation (19). In this case, the n-th tap coefficients $w^{(1)}_n$, $w^{(2)}_n$, ..., $w^{(Z)}_n$ in respective classes #1, #2, ..., #Z determined by the learning device shown in FIG. 9 are respective training data, and the parameters #1, #2, ..., #Z representing classes are learning data corresponding to the training data for respective classes.

Figure 11:
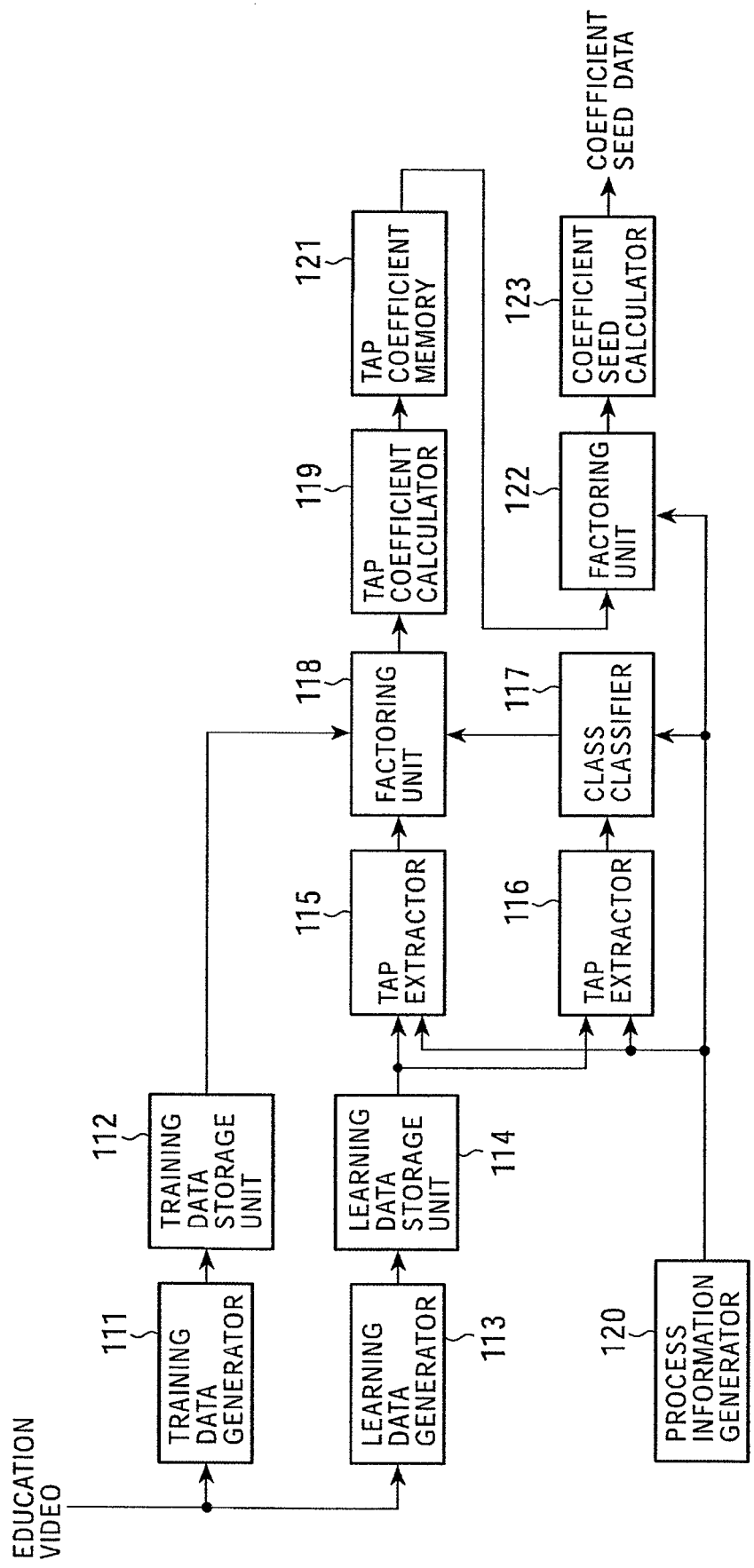
FIG. 11 is a block diagram illustrating the construction of the learning device for determining coefficient seed data.

FIG. 11 shows the construction of a learning device that performs a learning process to determine the coefficient seed data $\beta_{m,n}$ for determining the n-th tap coefficient $w^{(z)}_n$ in the class #z. As shown, components identical to those described with reference to FIG. 9 are designated with the same reference numerals and the discussion thereof is omitted here.

A tap coefficient memory 121 stores a set of tap coefficients for each class output from the tap coefficient calculator 119.

A factoring unit 122 factors in (the variable $t_m$ corresponding to) the parameter #z representing the class, and the tap coefficient $w^{(z)}_n$ of each class #z stored in the tap coefficient memory 121 with respect to each tap number n.

The factoring unit 122 performs a factoring operation using a variable $t_i(t_j)$ determined from the parameter z using equation (10). Specifically, variables $t_i(t_j)$ for the parameter z to determine an element $X_{i,j}$, defined by equation (17), in the matrix on the left side of equation (19) are multiplied by each other, and the resulting products are summed for each tap number n.

Furthermore, the factoring unit 122 performs a factoring operation using the variable $t_i$ determined from equation (10) and the tap coefficient $w^{(z)}_n$. Specifically, the variable $t_i$ respectively corresponding to the parameter z for determining $Y_i$ defined by equation (18) is multiplied by the tap coefficient $w_n$ and the resulting products ($t_i w_n$) are summed for each tap number n. $Y_i$ is an element in the vector on the right side of equation (19).

The factoring unit 122 determines the element $X_{i,j}$ expressed by equation (17) and the element $Y_i$ expressed by equation (18) for each tap number, thereby writing the normal equation (19) for each tap number n. The factoring unit 122 then outputs the normal equation to a coefficient seed calculator 123.

In the embodiment illustrated in FIG. 11, the process information output from the process information generator 120 is fed to the factoring unit 122. In this case, the process information contains M representing the number of terms in equation (9) as a tap calculation equation for determining the tap coefficient $w^{(z)}_n$ from the coefficient seed data $\beta_{m,n}$. The factoring unit 122 references the process information supplied from the process information generator 120, thereby recognizing the number of terms M, and writing the normal equation (19).

The coefficient seed calculator 123 determines and outputs the coefficient seed data $\beta_{m,n}$ for each tap number by solving the normal equation (19) for each tap number n supplied from the factoring unit 122.

The learning process of the learning device illustrated in FIG. 11 is discussed below with reference to a flow diagram illustrated in FIG. 12.

Figure 10:
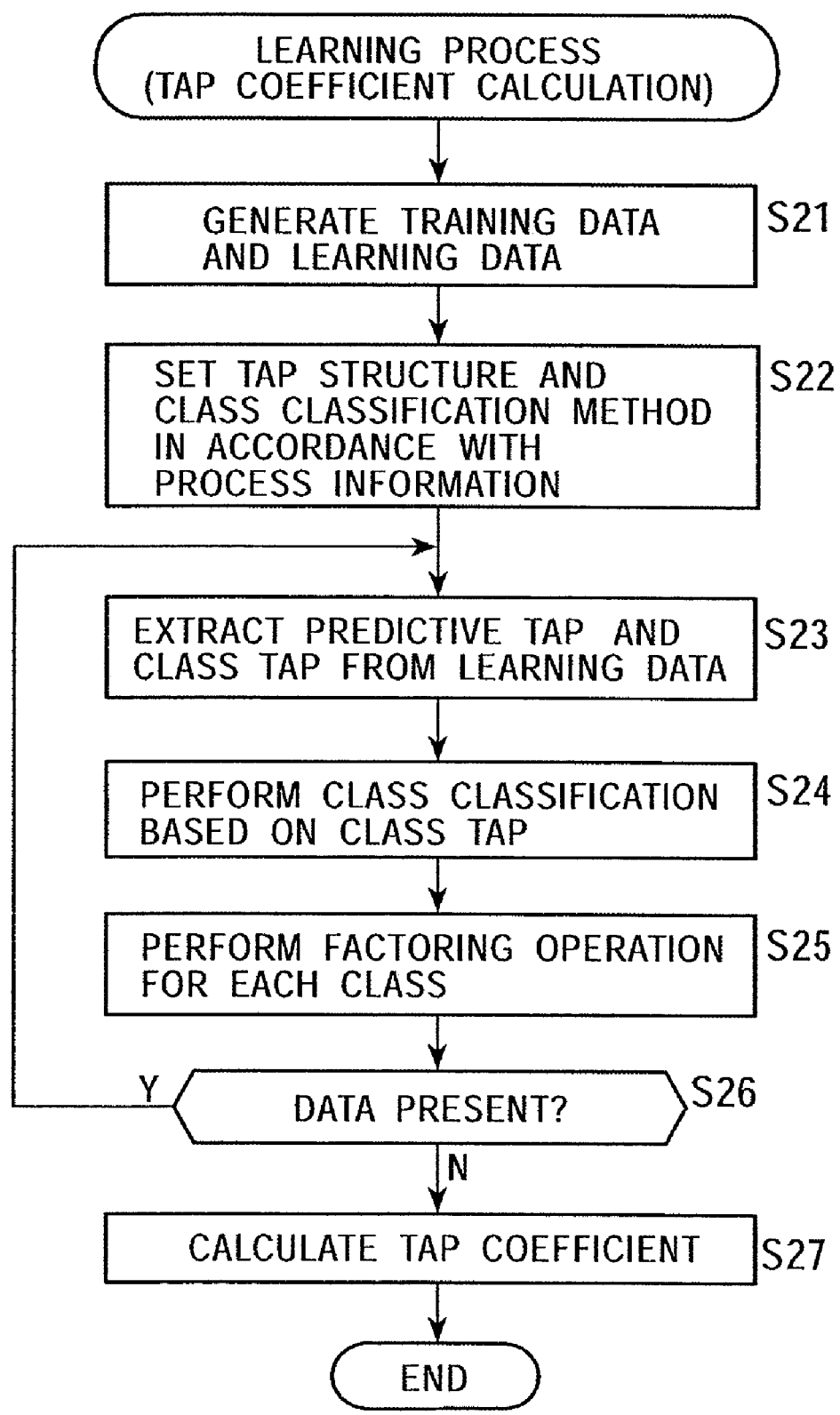
FIG. 10 is a flow diagram illustrating a learning process for determining a tap coefficient.

Steps S31 through S37 perform the same process as steps S21 through S27 shown in FIG. 10. The tap coefficients determined by the tap coefficient calculator 119 for each class are fed to the tap coefficient memory 121 for storage.

Set in step S32 are the tap structure of the predictive tap constructed by the tap extractor 115, the tap structure of the class tap constructed by the tap extractor 116, the class classification method of the class classifier 117, and the number of terms M of the tap calculation equation (9) required for the factoring unit 122 to write the normal equation (19).

The process information generator 120 in the learning device shown in FIG. 11 generates the process information including the tap structures of the predictive tap and the class tap constructed by each of the video processor cards $13_1$ through $13_6$, the class classification method of the class classification performed by each of the video processor cards $13_1$ through $13_6$, and the number of terms M of the tap calculation equation (9) for generating the tap coefficient $w_n$ from the coefficient seed data $\beta_{m,n}$ in each of the video processor cards $13_1$ through $13_6$. The process information generator 120 then feeds the process information to the tap extractors 115 and 116, class classifier 117, and factoring unit 122. In accordance with the number of terms M contained in the process information, the factoring unit 122 sets the operation mode thereof to write the normal equation (19).

In step S38, the factoring unit 122 performs a factoring operation to (the variable $t_m$ corresponding to) the parameter #z representing the class and the tap coefficient $w^{(z)}_n$ of each class #z stored in the tap coefficient memory 121 for each tap number n. The factoring unit 122 thus writes the normal equation (19) and feeds the normal equation (19) to the coefficient seed calculator 123. The algorithm then proceeds to step S39.

In step S38, the factoring unit 122 writes the normal equation (19) in accordance with the number of terms M of the tap calculation equation (9) set in step S32.

In step S39, the coefficient seed calculator 123 solves the normal equation (19) for each tap number n supplied from the factoring unit 122, thereby determining and outputting the coefficient seed data $\beta_{m,n}$ for each tap number n. The process ends.

Figure 12:
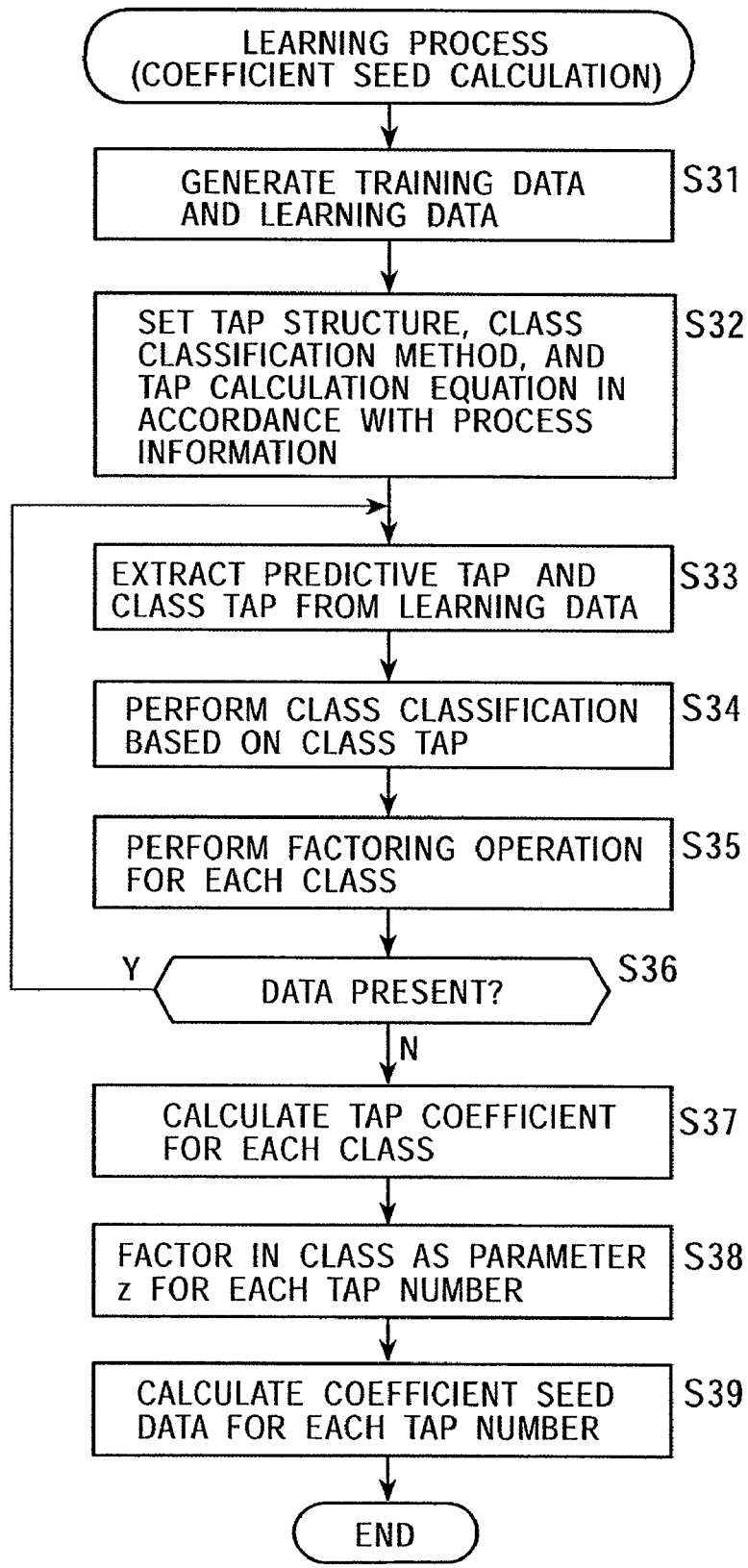
FIG. 12 is a flow diagram illustrating a learning process for determining the coefficient seed data.
Figure 13:
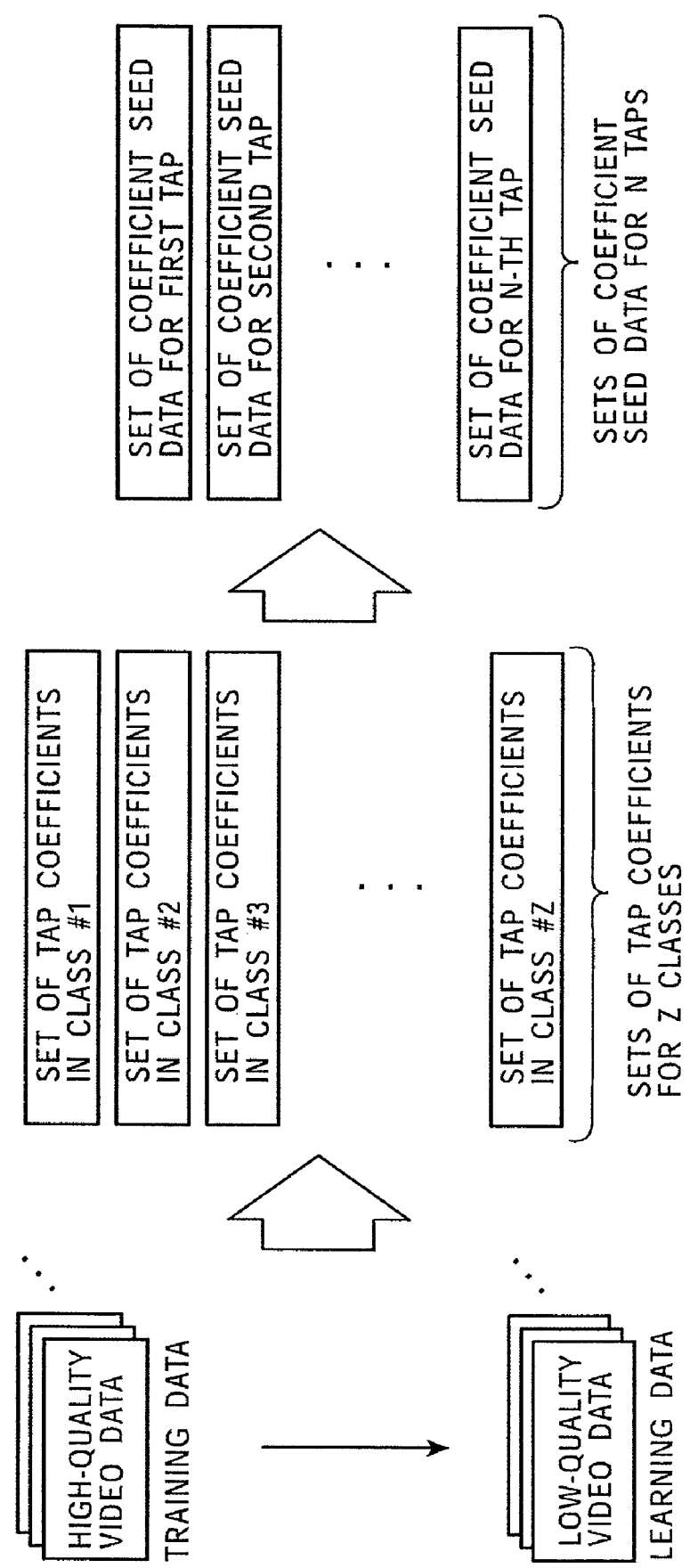
FIG. 13 illustrates tap coefficients generated from learning data and training data, and the coefficient seed data.

The learning device shown in FIG. 11 modifies the education pair and the process information as appropriate, and performs the learning process shown in FIG. 12. In this way, the coefficient seed data $\beta_{m,n}$ for performing a variety of image quality improvements is thus determined. Different coefficient seed data $\beta_{m,n}$ for performing different image improvements are respectively stored in the video processor cards $13_1$ through $13_6$.

Assuming that the number of the tap coefficients $w_n$ for one class is N, and that the number of classes is Z, the total number of tap coefficients $w_n$ is N×Z.

Assuming that the number of the tap coefficients $w_n$ for one class is N, and that the number of terms of the tap calculation equation (9) is M, the total number of coefficient seed data $\beta_{m,n}$ is N×M.

If a single tap coefficient $w_n$ has the same amount of data as the coefficient seed data $\beta_{m,n}$, the amount of data of all coefficient seed data $\beta_{m,n}$ is M/Z times the amount of data of all tap coefficients $w_n$.

Now, M is compared with Z. M is the number of terms in the tap calculation equation (9), and is typically one digit number or two digit number (10-99). On the other hand, Z is the number of classes. The class classification for determining the class is performed by ADRC processing the class tap. For example, if a class tap composed of 25 (5×5) pixels is classified by one-bit ADRC processing, the number of classes is $2^{25}$ classes.

The value of M/Z is sufficiently small, and the tap coefficient $w_n$ is compressed to the coefficient seed data $\beta_{m,n}$ having a sufficiently small amount of data.

The coefficient seed data $\beta_{m,n}$ is stored as the tap generation information in the tap generation storage unit 97 (see FIG. 6). In comparison with the case in which the tap coefficient $w_n$ is stored, the required memory capacity of the tap generation storage unit 97 is substantially reduced.

The process information stored in the video processor card $13_i$ shown in FIG. 6 contains, besides the tap structure and the class classification method, the number of terms M of the tap calculation equation (9), and the number of classes Z in the class classification of the class classifier 93. The coefficient generator 96 references the process information, recognizing the number of terms M of the tap calculation equation (9). The card controller 98 references the process information, thereby recognizing the number of classes Z. The card controller 98 feeds an integer from 1 through Z as the parameter z to the coefficient generator 96. The coefficient generator 96 uses the coefficient seed data $\beta_{m,n}$ as the process information and the parameter z supplied from the card controller 98, thereby summing the M terms on the right side of the tap calculation equation (9). The tap coefficient $w_n$ for each class is thus determined.

As described above, the learning device shown in FIG. 11 sets the high-quality video data to be the training data and sets the low-quality video data with the image quality thereof degraded to be the learning data. Sets of tap coefficients for Z classes are generated. The learning device shown in FIG. 11 compresses the tap coefficients of the Z classes, thereby generating a set of coefficient seed data of N taps. The number of predictive taps is N.

Depending on what learning pair (of the training data and the learning data) is used, the coefficient seed data forms the tap coefficient for different types of image quality improvements (such as noise reduction or resolution enhancement) in the learning process. Furthermore, the coefficient seed data forms the tap coefficient resulting in different image quality improvements, depending on the tap structure of the predictive tap (the position of a pixel serving as the predictive tap, and the number of taps) used in the learning process, the tap structure of the class tap, the class classification method, and the number of terms M of the tap calculation equation (9).

The video processor cards $13_1$ through $13_6$ store, as the tap generation information, the coefficient seed data for generating the tap coefficient $w_n$ for image quality improvements in type and/or level. The coefficient seed data stored in the video processor cards $13_1$ and $13_2$, out of the video processor card $13_1$ through $13_6$, is discussed with reference to FIG. 14 through FIG. 19.

Figure 14:
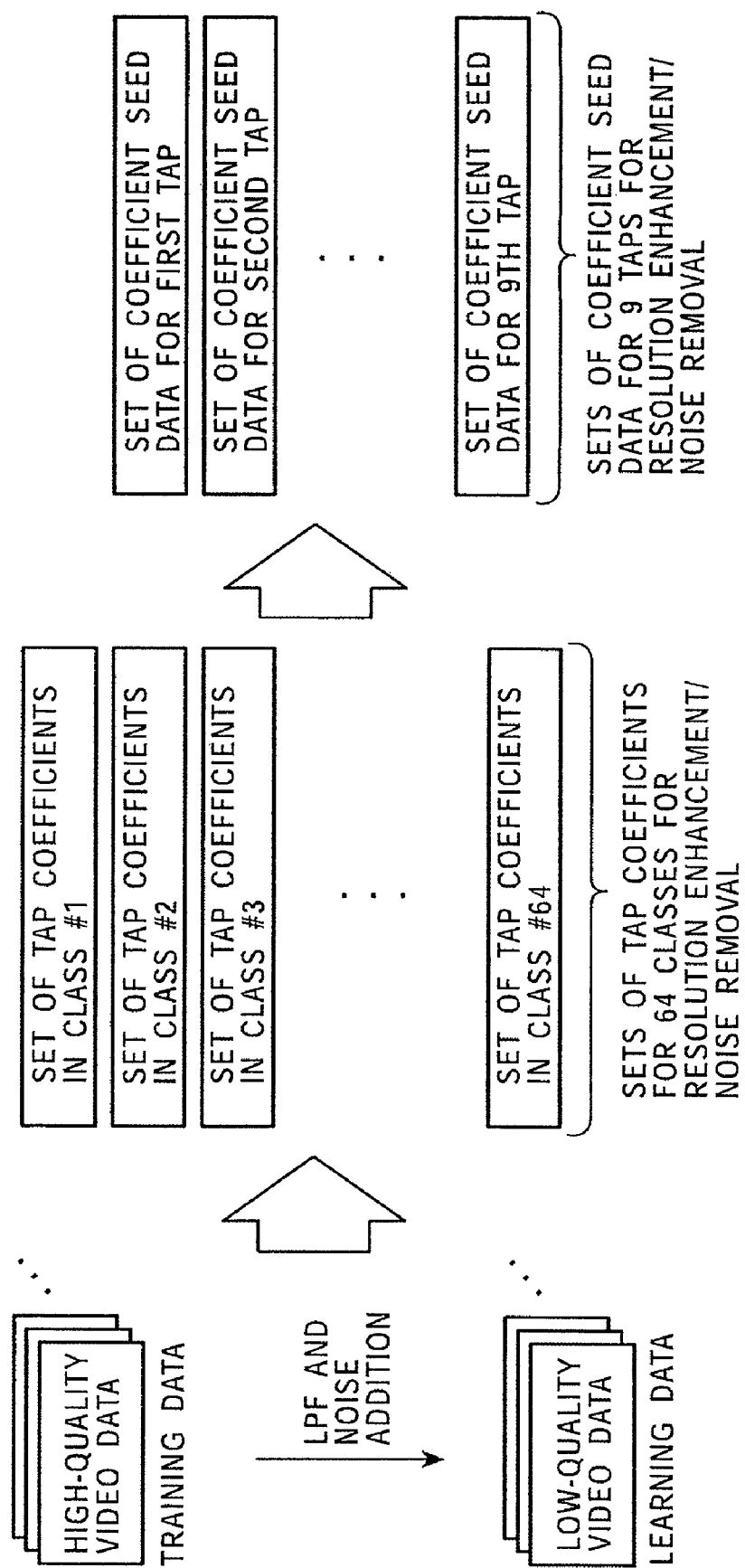
FIG. 14 illustrates a generation method of the coefficient seed data stored in the video processor card 13.

Referring to FIG. 14, the video processor card $13_1$ stores a set of 9 tap coefficient seed data as the tap generation information. The high-quality video data is set to be the training data. The low-quality video data is obtained by degrading the high-quality video data in resolution and then by adding noise to the high-quality video data. The learning process is performed with the high-quality video data as the training data and with the low-quality video data as the learning data. A set of tap coefficients for 64 classes for resolution enhancement/ noise removal for enhancing resolution and removing noise is generated, and then compressed, becoming the set of 9 tap coefficient seed data for resolution enhancement/noise removal.

Figure 15:
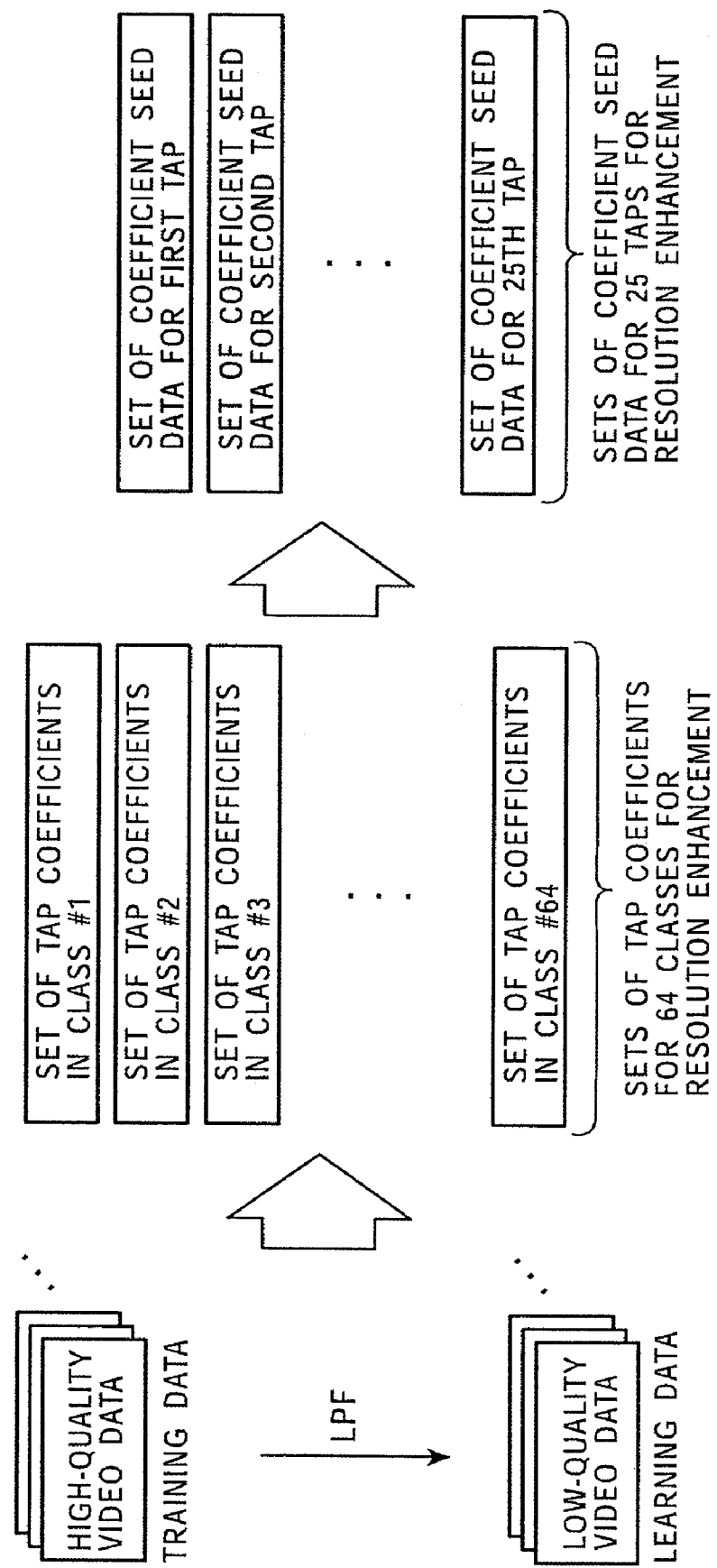
FIG. 15 illustrates the generation method of the coefficient seed data stored in the video processor card 13.

Referring to FIG. 15, the video processor card $13_1$ stores a set of 25 tap coefficient seed data as the tap generation information in addition to the set of 9 tap coefficient seed data for resolution enhancement/noise removal shown in FIG. 14. The high-quality video data is set to be the training data. The low-quality video data is obtained by degrading the high-quality video data in resolution. The learning process is performed with the high-quality video data as the training data and with the low-quality video data as the learning data. A set of tap coefficients for 64 classes for resolution enhancement is generated and then compressed, becoming the set of 25 tap coefficient seed data for resolution enhancement.

Figure 16:
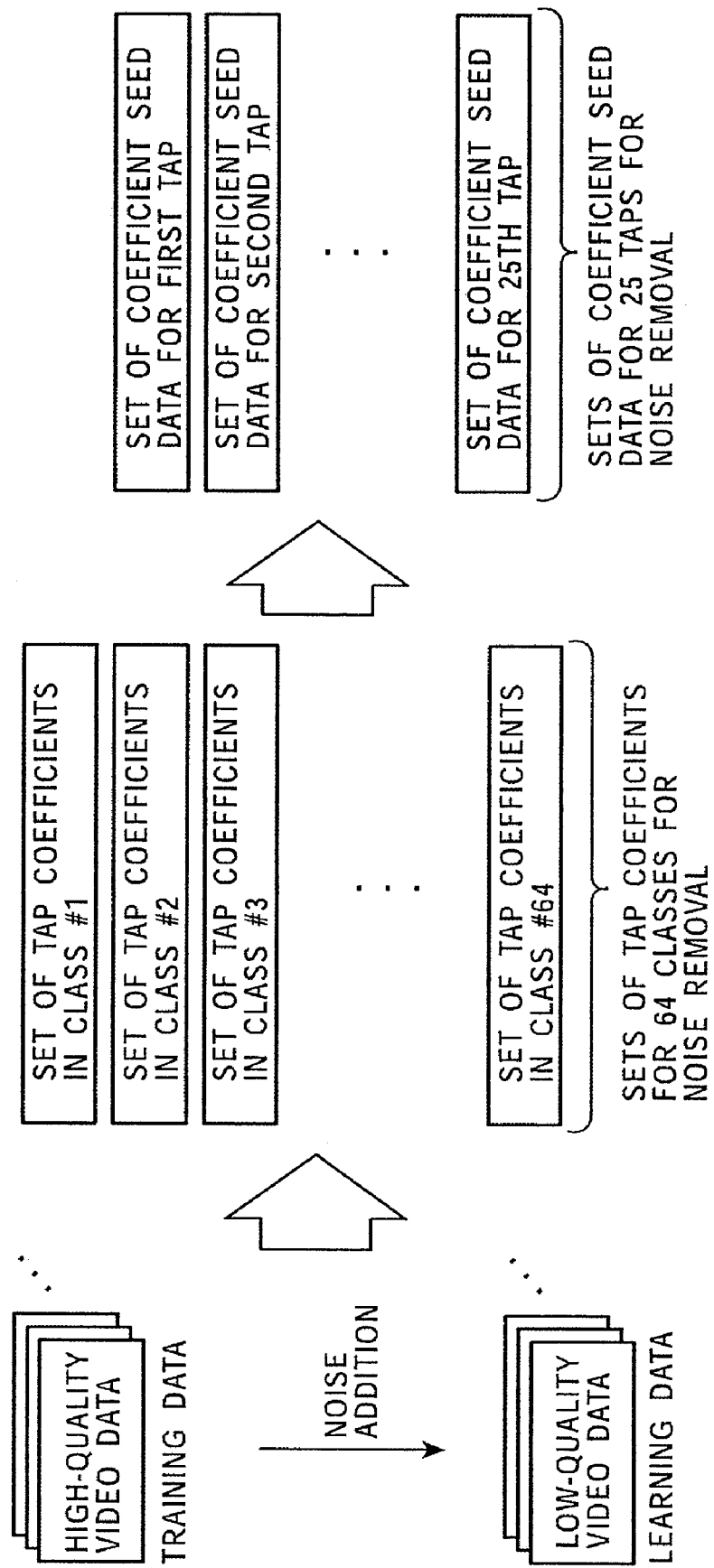
FIG. 16 illustrates the generation method of the coefficient seed data stored in the video processor card 13.

Referring to FIG. 16, the video processor card $13_2$ stores a set of 25 tap coefficient seed data as the tap generation information. The high-quality video data is set to be the training data. The low-quality video data is obtained by adding noise to the high-quality video data. The learning process is performed with the high-quality video data as the training data and with the low-quality video data as the learning data. A set of tap coefficients for 64 classes for resolution enhancement is generated, and then compressed, becoming the set of 25 tap coefficient seed data for noise removal.

Figure 17:
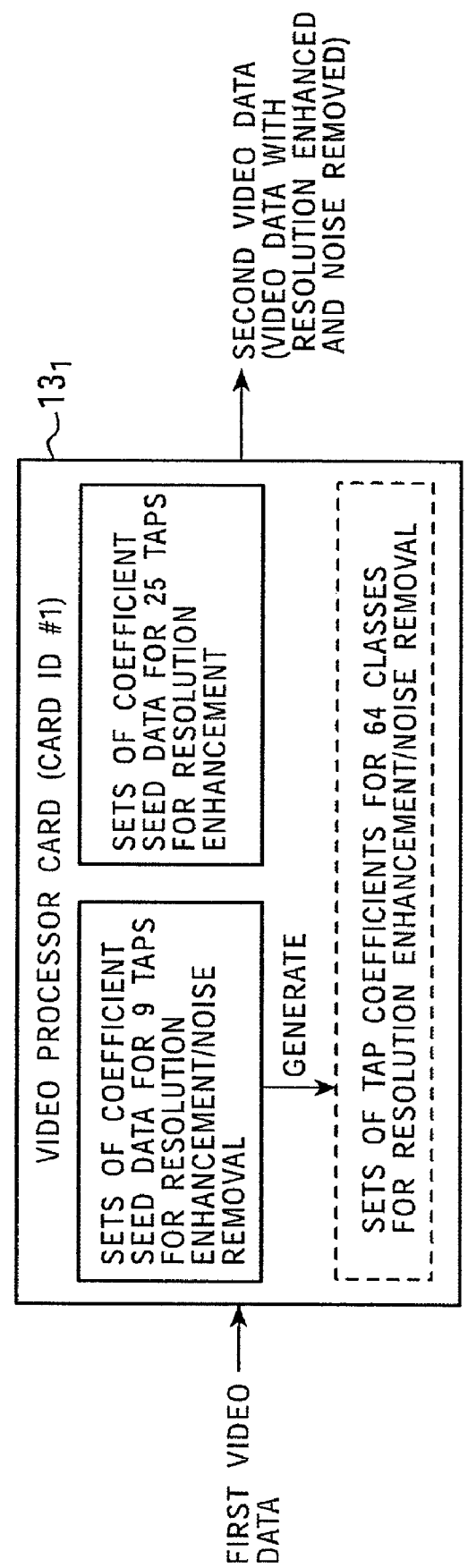
FIG. 17 illustrates the process of a video processor card $13_1$.

If the video processor card $13_1$ only is loaded in the video processing interface 40, the video processor card $13_1$ generates the set of tap coefficients for 64 classes for resolution enhancement/noise removal from the set of 9 tap coefficient seed data for resolution enhancement/noise removal, out of the set of 9 tap coefficient seed data for resolution enhancement/noise removal and the set of 25 tap coefficient seed data for resolution enhancement, as shown in FIG. 17. Using the set of tap coefficients for the 64 classes for resolution enhancement/noise removal, the video processor card $13_1$ performs the data conversion process on the first video data supplied from the frame memory 35 (see FIG. 3), thereby outputting the second video data with the resolution thereof enhanced and the noise thereof removed.

The process information stored in the tap generation storage unit 97 (see FIG. 6) in the video processor card $13_1$ contains information to the effect that the tap coefficient is generated from the set of 9 tap coefficient seed data. The card controller 98 (see FIG. 6) in the video processor card $13_1$ controls the coefficient generator 96 in accordance with the process information, thereby generating the set of tap coefficients for the 64 classes for resolution enhancement/noise removal from the set of 9 tap coefficient seed data for resolution enhancement/noise removal.

Figure 18:
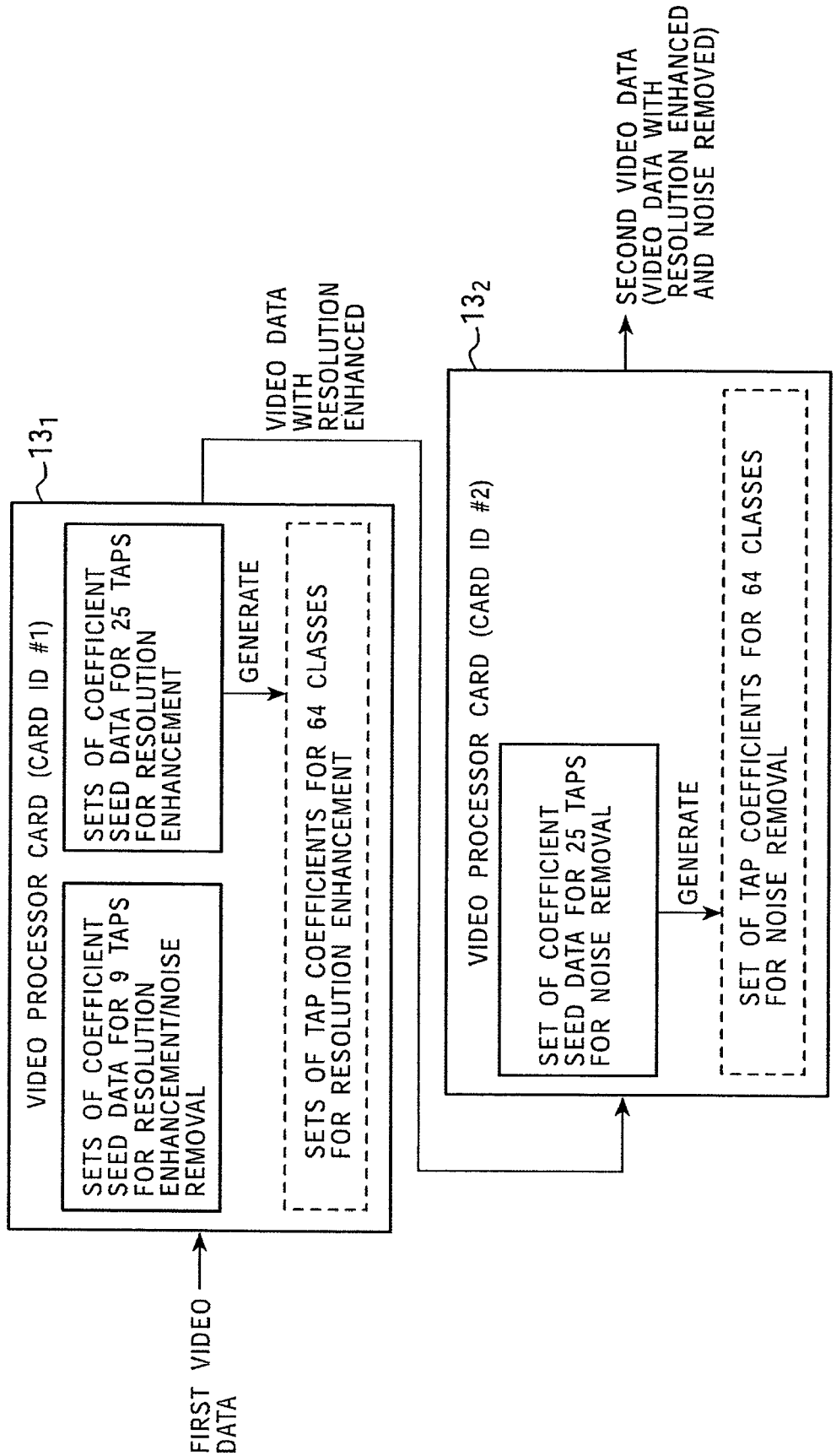
FIG. 18 illustrates the process of video processor cards $13_1$ and $13_2$.

If the video processor cards $13_1$ and $13_2$ are loaded in the video processing interface 40, the video processor card $13_1$ generates the set of tap coefficients for 64 classes for resolution enhancement from the set of 25 tap coefficient seed data for resolution enhancement, out of the set of 9 tap coefficient seed data for resolution enhancement/noise removal and the set of 25 tap coefficient seed data for resolution enhancement as shown in FIG. 18.

Referring to FIG. 18, the video processor card $13_2$ generates the set of tap coefficient for 64 classes for noise removal from the set of 25 tap coefficient seed data for noise removal.

Using the set of tap coefficients for 64 classes for resolution enhancement, the video processor card $13_1$ performs the data conversion process on first video data supplied from the frame memory 35 (see FIG. 3), thereby outputting second video data with the resolution thereof improved.

The second video data is fed to the video processor card $13_2$ as the first video data through the card interface 83 in the video processing interface 40.

Using the set of tap coefficients for 64 classes for noise removal, the video processor card $13_2$ perform the data conversion process on the first video data supplied thereto, thereby outputting second video data with noise thereof removed.

The video data stored in the frame memory 35 is data converted by each of the video processor card $13_1$ and $13_2$, thereby becoming video data with the resolution thereof enhanced and noise removed.

The process information stored in the tap generation storage unit 97 (see FIG. 6) in the video processor card $13_2$ contains information to the effect that the video processor card $13_1$ generates the tap coefficient from the set of 25 tap coefficient seed data for resolution enhancement. The card controller 98 (see FIG. 6) in the video processor card $13_1$ controls the coefficient generator 96 in accordance with the process information of the video processor card $13_2$ (in this case, the process information of the video processor card $13_2$ is the maximum ID process information, and as illustrated in FIG. 8, the video processor card $13_1$ generates the tap coefficient in accordance with the maximum ID process information). The video processor card $13_1$ thus generates the set of tap coefficients for 64 classes for resolution enhancement from the set of 25 tap coefficient seed data for resolution enhancement.

Regardless of whether the video processor card $13_1$ only or both video processor cards $13_1$ and $13_2$ are loaded, the finally obtained video data is enhanced in resolution and with noise removed.

However, when the video processor card $13_1$ only is loaded, the video processor card $13_1$ performs the data conversion process using the set of tap coefficient for the 64 classes for resolution enhancement/noise removal serving dual purposes of enhancing resolution and removing noise. When both the video processor card $13_1$ and $13_2$ are loaded, the video processor card $13_1$ performs the data conversion process using the set of tap coefficient for the 64 classes for resolution enhancement serving the purpose of resolution enhancement only, and furthermore, the video processor card $13_2$ performs the data conversion process using the set of tap coefficients for the 64 classes for noise removal serving the purpose of noise removal only.

Even when the video processor card $13_1$ only is loaded, the obtained video data is enhanced in resolution and with noise removed. When both the video processor card $13_1$ and $13_2$ are loaded, the resulting video data is enhanced more in resolution and with more noise removed.

The main unit 1 (see FIG. 1) of the television receiver becomes even more sophisticated in performance by adding the video processor card $13_2$ subsequent to the loading of the video processor card $13_1$.

The user thus has a motivation to purchase the video processor card $13_2$ even after he or she has purchased the video processor card $13_1$.

When loaded, the video processor card $13_1$ generates the set of tap coefficients for the 64 classes for resolution enhancement/noise removal from the set of 9 tap coefficient seed data for resolution enhancement/noise removal. When both video processor cards $13_1$ and $13_2$ are loaded, the video processor card $13_1$ generates the set of tap coefficients for the 64 classes for resolution enhancement from the set of 25 tap coefficient seed data for resolution enhancement. The number of predictive taps is 9 when the video processor card $13_1$ only is installed, while the number of predictive taps is 25 when both video processor cards $13_1$ and $13_2$ are loaded. Because of the increased number predictive taps, the level of resolution enhancement with both video processor cards $13_1$ and $13_2$ loaded is typically higher than the level of resolution enhancement with the video processor card $13_1$ only loaded.

The main unit 1 of the television receiver enjoys further performance improvements with resolution enhancement and noise removal when the video processor card $13_2$ is added in addition to the already loaded video processor card $13_1$. But the type of performance improvements of the main unit 1 remains unchanged. As for the function of the video processor card $13_1$, the video processor card $13_1$ changes from the function of enhancing resolution and removing noise to the function of enhancing resolution only. The function itself of the video processor card $13_1$ thus changes.

The video processor card $13_3$ stores, as the tap generation information, the coefficient seed data for generating a tap coefficient for expansion for expanding an image. The video processor card $13_1$ stores three types of coefficient seed data including an expansion/noise removal/resolution enhancement tap coefficient for expansion, noise removal, and resolution enhancement, and an expansion/resolution enhancement tap coefficient for image expansion and resolution enhancement.

When the video processor card $13_1$ only is loaded, the video processor card $13_1$ performs the data conversion process using the expansion/noise removal/resolution enhancement tap coefficients. When the video processor card $13_2$ is further loaded, the video processor card $13_1$ performs the data conversion process using the expansion/resolution enhancement tap coefficients, and the video processor card $13_2$ performs the data conversion process using a noise removal tap coefficient. When the video processor cards $13_1$ through $13_3$ are loaded, the video processor cards $13_1$ through $13_3$ respectively perform the data conversion process using the resolution enhancement tap coefficient, the data conversion process using noise removal tap coefficient, and the data conversion process using expansion tap coefficient.

Figure 19:
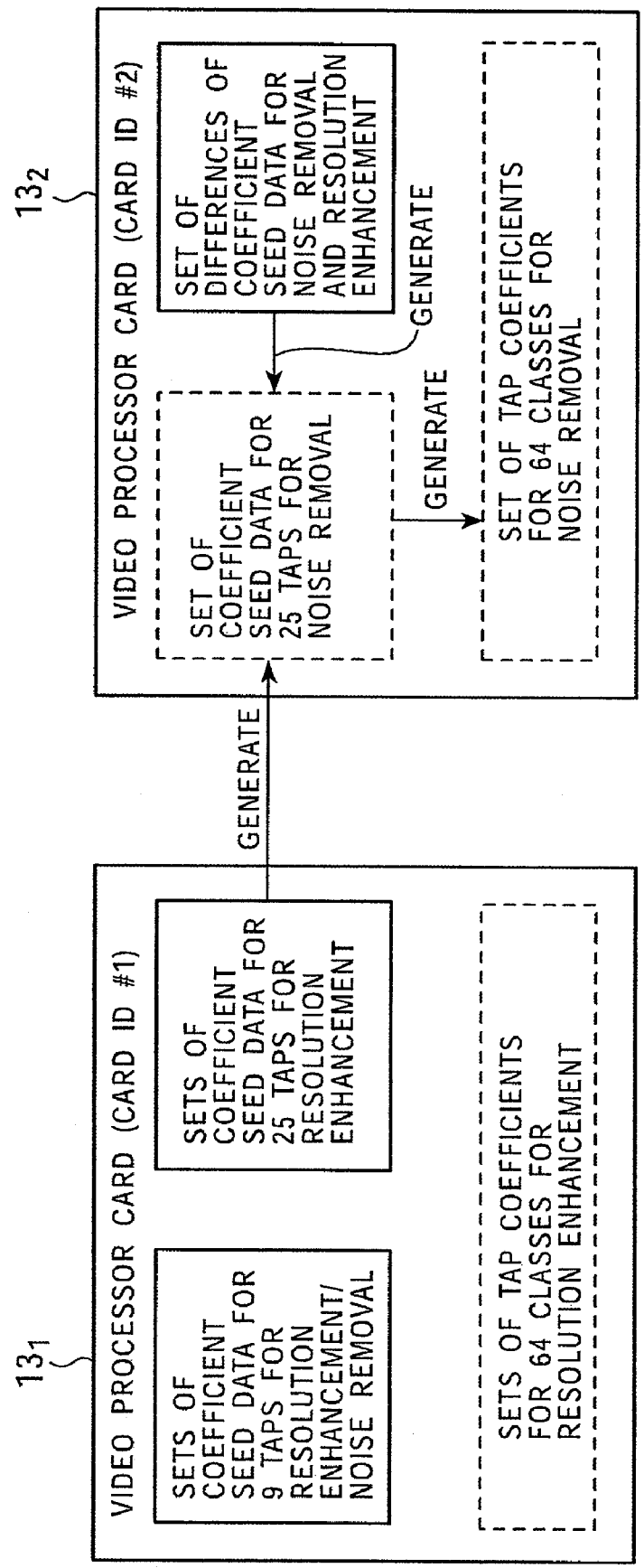
FIG. 19 illustrates the generation method for generating the coefficient seed data from difference data.

In the above discussion, the video processor card $13_2$ stores the set of 25 tap coefficient seed data for noise removal. Referring to FIG. 19, the video processor card $13_2$ may store a set of difference data between the set of 25 tap coefficient seed data for noise removal and the set of 25 tap coefficient seed data for resolution enhancement stored in the video processor card $13_1$.

When both the video processor cards $13_1$ and $13_2$ are mounted in the video processing interface 40, the card controller 98 (see FIG. 6) in the video processor card $13_2$ reads the 25 tap coefficient seed data for resolution enhancement from the video processor card $13_1$ through the card interface 83 (see FIG. 5) in the video processing interface 40, and adds the difference data stored in the video processor card $13_2$ to the read 25 tap coefficient seed data for resolution enhancement. The card controller 98 in the video processor card $13_2$ thus generates the 25 tap coefficient seed data for noise removal. The card controller 98 feeds the 25 tap coefficient seed data for noise removal to the coefficient generator 96 (see FIG. 6), thereby generating the tap coefficients for the 64 classes for noise removal.

The tap generation information stored in the video processor card $13_2$ is such difference data. The method of reconstructing the coefficient seed data from the difference data is described in the process information of the video processor card $13_2$. The card controller 98 in the video processor card $13_2$ references the process information, thereby reconstructing the coefficient seed data from the difference data as the tap generation information.

The set of tap coefficients for the 64 classes for noise removal, used by the video processor card $13_2$ for the data conversion process, is not generated without the 25 tap coefficient seed data for resolution enhancement stored in the video processor card $13_1$. A user, who has no video processor card $13_1$, is prevented from illegally obtaining the set of tap coefficients for the 64 classes for noise removal for use in the data conversion process in the video processor card $13_2$.

Another video processor card $13_i$ may store difference data between coefficient seed data for generating tap coefficients used by the video processor card $13_i$ in the data conversion process thereof and coefficient seed data for generating tap coefficients used by the video processor card $13_{i-1}$, which is one level higher in card ID, in the data conversion process thereof.

Figure 20:
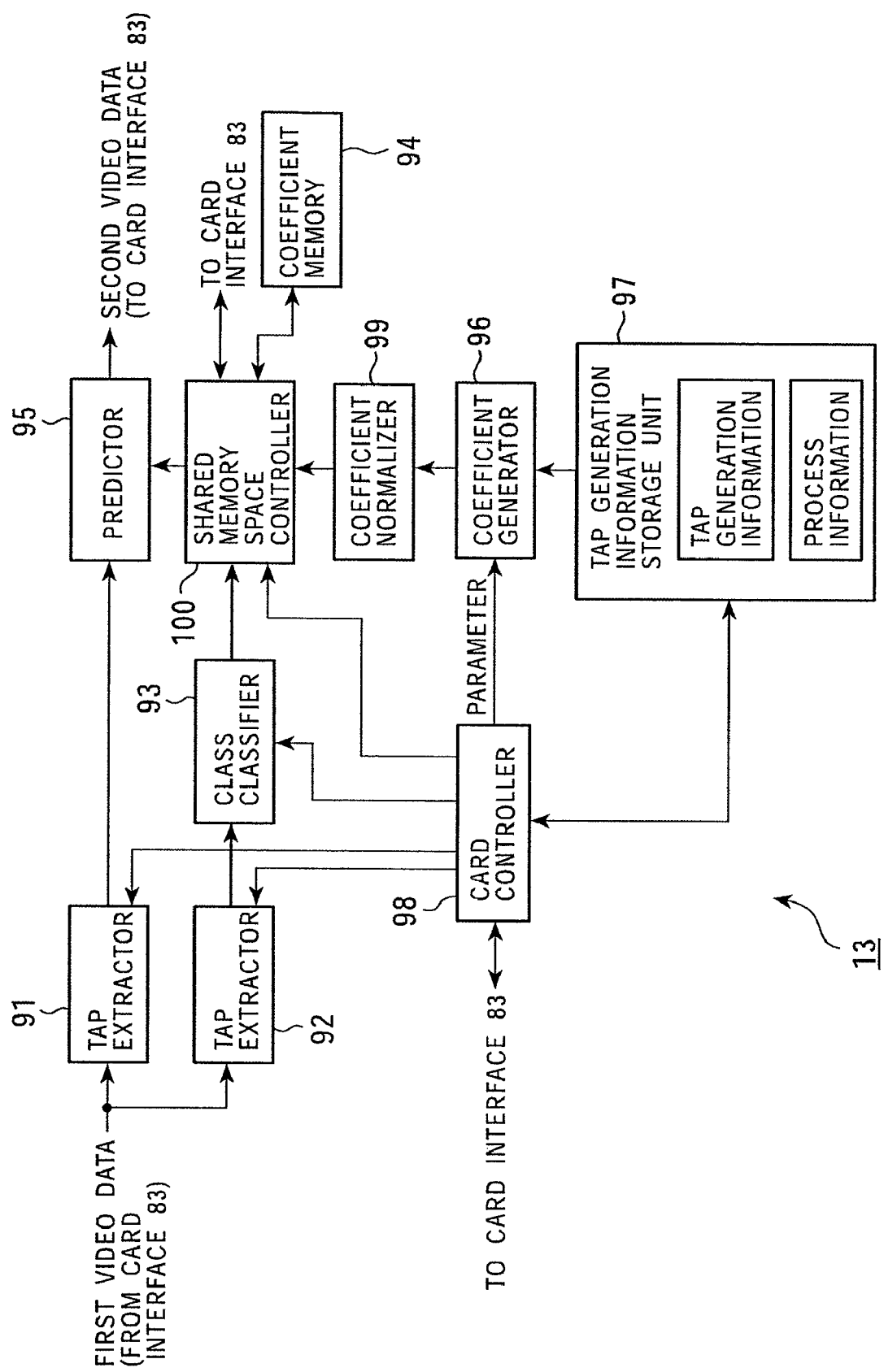
FIG. 20 is a block diagram illustrating a second construction of the video processor card 13.

FIG. 20 illustrates another construction of the video processor card $13_i$. As shown, components identical to those described with reference to FIG. 6 are designated with the same reference numerals, and the discussion thereof is omitted here. The video processor card $13_i$ is basically identical in construction to the video processor card 13 shown in FIG. 6 except that the video processor card $13_i$ includes a shared memory space controller 100 substituted for the block of the coefficient memory 94 with the coefficient memory 94 connected to the shared memory space controller 100.

The shared memory space controller 100 controls memory space shared by the coefficient memory 94 of the video processor card $13_i$ and the coefficient memory 94 of another video processor card $13_{i'}$.

If the coefficient memory 94 only of the video processor card $13_i$ is not sufficient in capacity, the shared memory space controller 100 communicates with a shared memory space controller 100 of another video processor card $13_{i'}$ through the card interface 83 (see FIG. 5) of the video processing interface 40. If the coefficient memory 94 of the other video processor card $13_{i'}$ has remaining capacity, the remaining space and the real memory space of the coefficient memory 94 of the video processor card $13_i$ are used as a virtual memory space of the video processor card $13_i$.

The shared memory space controller 100 stores the set of tap coefficients output from the coefficient normalizer 99 in the virtual memory space (the real memory space of the coefficient memory 94 in the video processor card $13_i$ or the real memory space of the coefficient memory 94 in the other video processor card $13_{i'}$). Upon receiving the class code from the class classifier 93, the shared memory space controller 100 reads the set of tap coefficients of a class corresponding to the class code from the virtual memory space, and feeds the set of the tap coefficients to the predictor 95.

The shared memory space controller 100 looks equivalent to the coefficient memory 94 shown in FIG. 6, if viewed from the coefficient normalizer 99 and class classifier 93.

The required size of the virtual memory space depends on the size of the tap coefficients which is stored in the virtual memory space. The size of the tap coefficients to be stored in the virtual memory space is calculated from the number of predictive taps N and the number of classes Z, if the size of on tap coefficient is known. The card controller 98 references the number of predictive taps N and the number of classes Z described in the process information in the tap generation storage unit 97, thereby calculating an overall size of the tap coefficients generated by the coefficient generator 96. The card controller 98 feeds the overall size information as a required memory capacity to the shared memory space controller 100.

As described above, the shared memory space controller 100 reserves the virtual memory space having a required memory capacity fed from the card controller 98.

If the coefficient memory 94 of the video processor card $13_i$ has remaining capacity, the shared memory space controller 100 permits the video processor card $13_{i'}$ to use that remaining capacity in response to a request from a shared memory space controller 100 of the other video processor card $13_{i'}$. The shared memory space controller 100 sets and uses the memory of the video processor card $13_i$ as the virtual memory space.

The coefficient memories 94 are shared among a plurality of video processor cards 13 for the following reason.

In the embodiment illustrated in FIG. 6, the capacity of the coefficient memory 94 has not been discussed. It is simply assumed that the coefficient memory 94 has memory capacity large enough to store the tap coefficients output from the coefficient normalizer 99.

In the embodiment illustrated in FIG. 17, the video processor card $13_1$ generates the set of tap coefficients for the 64 classes for resolution enhancement/noise removal from the set of 9 tap coefficient seed data for resolution enhancement/noise removal. To store a total of tap coefficients for 64 classes with 9 taps per class, the video processor card $13_1$ needs a memory capacity of 64×9×S, where S is the size of a single tap coefficient.

In the embodiment illustrated in FIG. 18, the video processor card $13_1$ generates the set of tap coefficients for the 64 classes for resolution enhancement from the set of 25 tap coefficient seed data for resolution enhancement. To store a total of tap coefficients for 64 classes with 25 taps per class, the video processor card $13_1$ needs a memory capacity of 64×25×S.

In the embodiment illustrated in FIG. 6, the coefficient memory 94 in the video processor card $13_1$ needs a memory size of 64×25×S.

The whole memory size of the coefficient memory 94, namely 64×25×S, is used only when both the video processor cards $13_1$ and $13_2$ are mounted. When the video processor card $13_1$ only is mounted, only a memory of 64×9×S is used, and two-thirds of the coefficient memory 94 (approximately equal to (25−9)/25) remains unused.

The coefficient memory 94 in the embodiment illustrated in FIG. 20 has a memory capacity enough to store the set of the tap coefficients of a predetermined number of classes Z by the predetermined number of taps N with no unused memory capacity left.

Figure 21:
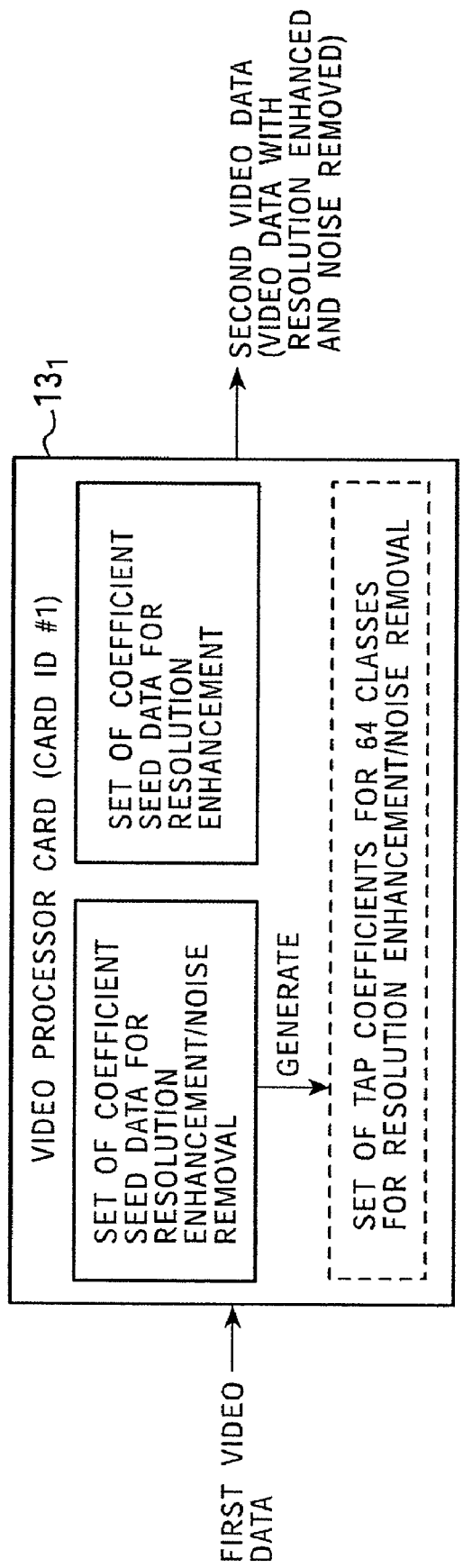
FIG. 21 illustrates the process of the video processor card $13_1$.

The video processor card $13_1$ and $13_2$ are discussed again. The video processor card $13_1$ stores, as the tap generation information, the set of coefficient seed data for resolution enhancement/noise removal and the set of coefficient seed data for resolution enhancement as shown in FIG. 21. If the video processor card $13_1$ only is mounted on the video processing interface 40, the set of tap coefficients for the 64 classes for resolution enhancement/noise removal are generated from the set of coefficient seed data for resolution enhancement/noise removal as shown in FIG. 21. If both the video processor cards $13_1$ and $13_2$ are mounted on the video processing interface 40, the set of tap coefficients for 48 classes for resolution enhancement is generated.

Figure 22:
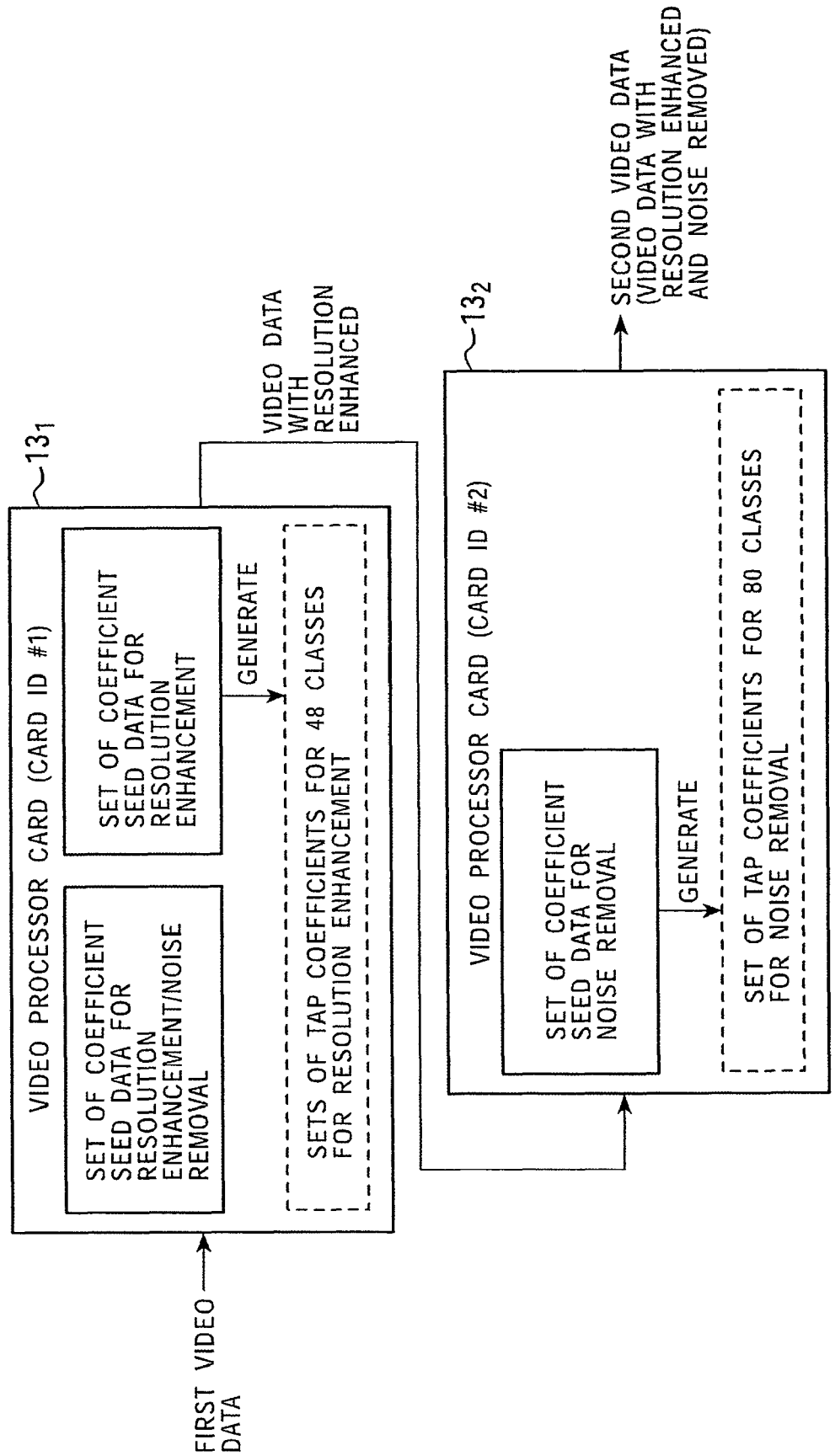
FIG. 22 illustrates the process of the video processor cards $13_1$ and $13_2$.

The video processor card $13_2$ stores, as the tap generation information, the set of coefficient seed data for noise removal as shown in FIG. 22. When both video processor card $13_1$ and $13_2$ are mounted on the video processing interface 40, the video processor card $13_2$ generates set of tap coefficients for 80 classes for noise removal.

For simplicity of explanation, the number of predictive taps, namely, the number of tap coefficients per class is constant value N, and is disregarded.

The coefficient memory 94 in each of the video processor cards $13_1$ and $13_2$ has a memory capacity for a set of tap coefficients for 64 classes.

Figure 23:
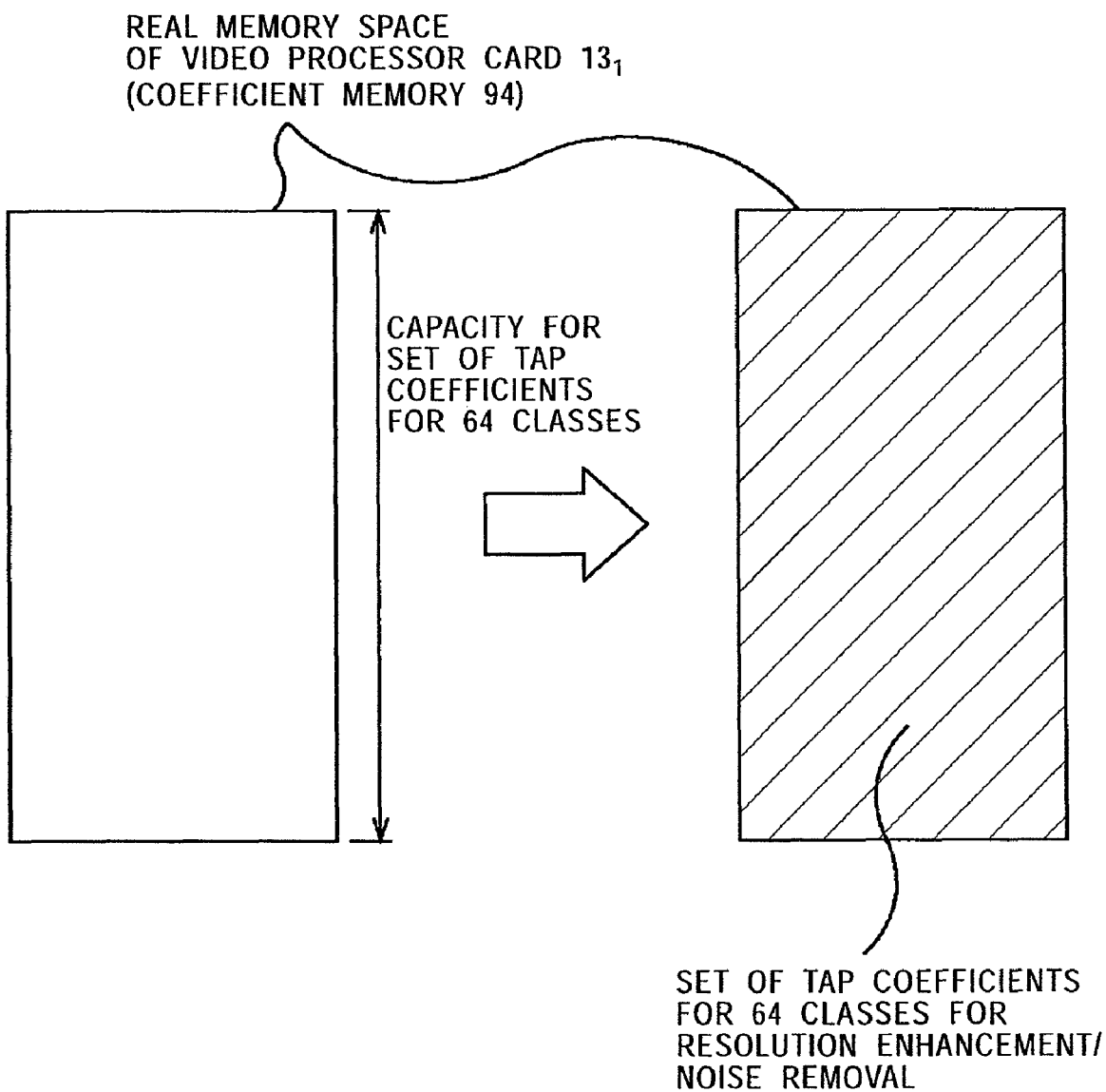
FIG. 23 illustrates real memory space of the video processor card $13_1$.

If the video processor card $13_1$ only is mounted on the video processing interface 40, the coefficient memory 94 in the video processor card $13_1$ stores the set of tap coefficients for 64 classes for resolution enhancement/noise removal generated from the set of coefficient seed data for resolution enhancement/noise removal as shown in FIG. 23. In this case, the memory capacity of the coefficient memory 94 in the video processor card $13_1$ equals the size of the set of tap coefficients for the generated 64 classes, and thus no memory capacity is left unused.

Figure 24:
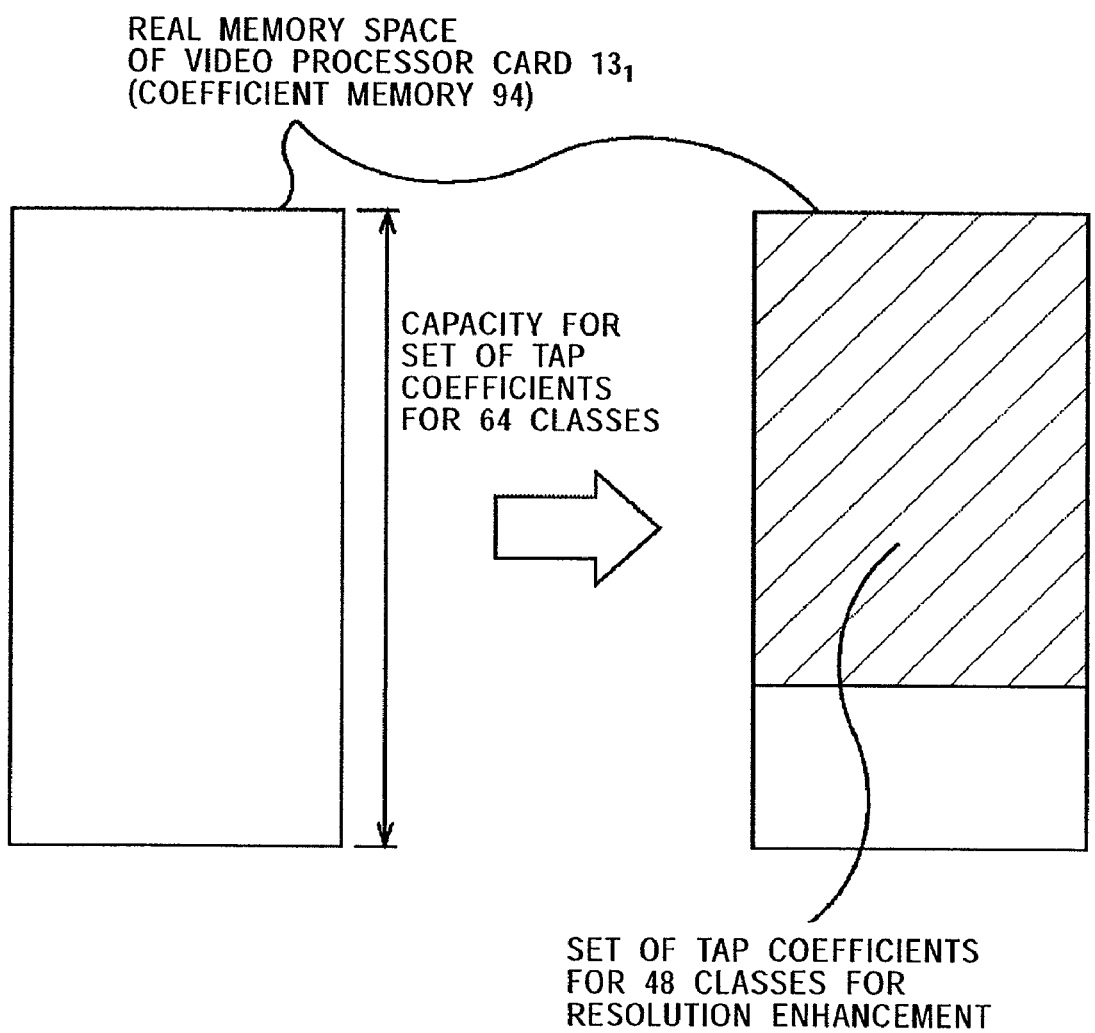
FIG. 24 illustrates the real memory space of the video processor card $13_1$.

If both the video processor cards $13_1$ and $13_2$ are loaded in the video processing interface 40, the coefficient memory 94 in the video processor card $13_1$ stores a set of tap coefficients for 48 classes for resolution enhancement generated from a set of coefficient seed data for resolution enhancement as shown in FIG. 24. The size of the set of tap coefficients for 48 classes is smaller than the memory capacity of the coefficient memory 94 in the video processor card $13_1$ by a set of tap coefficients for 16 classes. A portion of the memory capacity of the coefficient memory 94 equal to the set of tap coefficients for the 16 classes remains unused.

Figure 25:
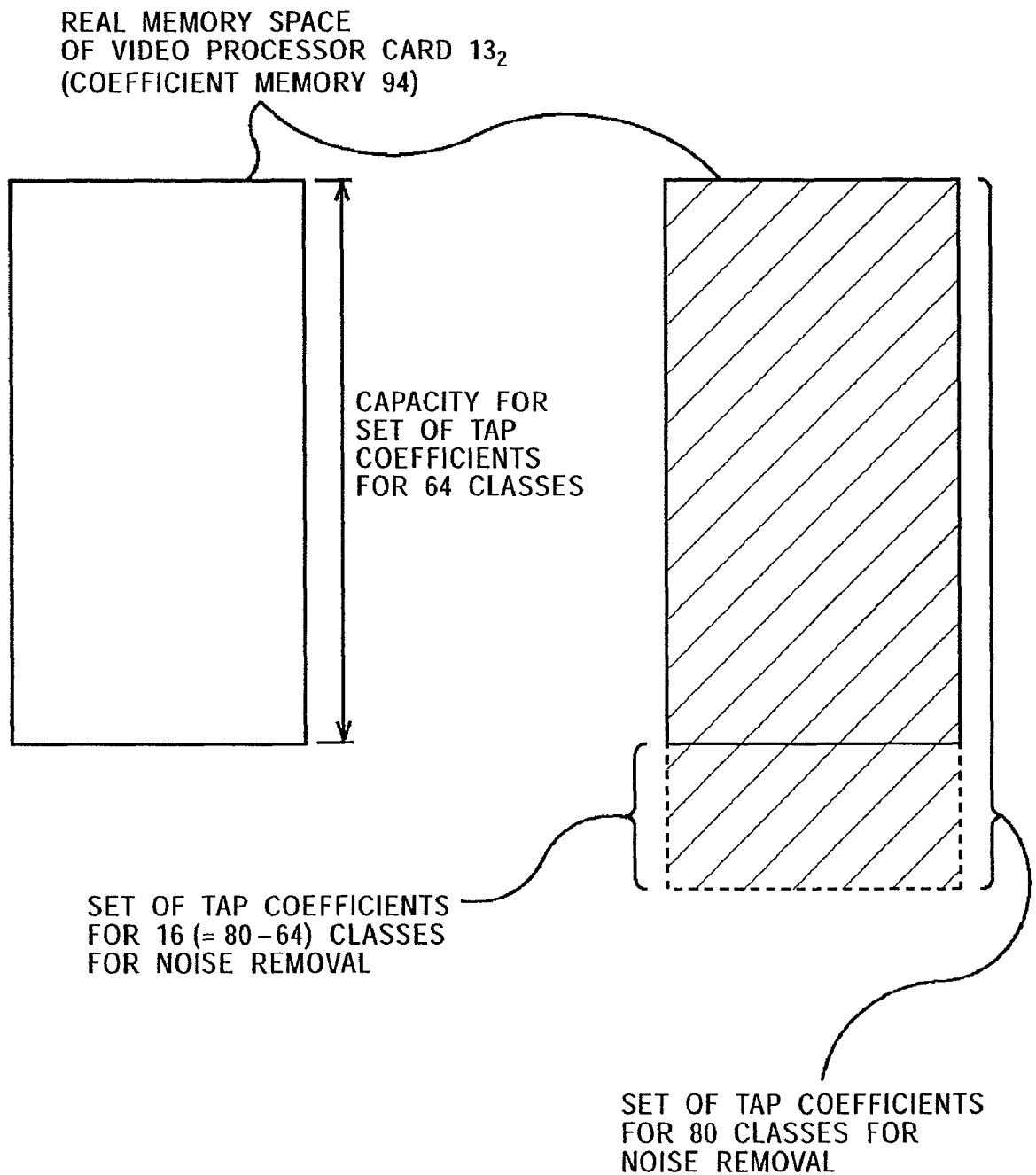
FIG. 25 illustrates real memory space of the video processor card $13_2$.

However, if both the video processor cards $13_1$ and $13_2$ are loaded in the video processing interface 40, the video processor card $13_2$ generates a set of tap coefficients for 80 classes for resolution enhancement from a set of coefficient seed data for resolution enhancement as shown in FIG. 25. The set of tap coefficients for 80 classes cannot be wholly stored in the coefficient memory 94 which has a memory capacity for the storage of the set of tap coefficients for 64 classes only. In the video processor card $13_2$, the size of the set of tap coefficients for the 80 classes is larger than the memory capacity of the coefficient memory 94 by the set of tap coefficients for 16 classes. To store the set of all tap coefficients, the coefficient memory 94 in the video processor card $13_2$ lacks a memory capacity equal to a size of the set of tap coefficients for 16 classes.

In the embodiment illustrated in FIG. 20, the shared memory space controller 100 in the video processor card $13_2$ requests a memory space $R_1'$ having a capacity for the set of tap coefficients for the 16 classes of the real memory space $R_1$ of the coefficient memory 94 from the shared memory space controller 100 in the video processor card $13_1$.

Figure 26:
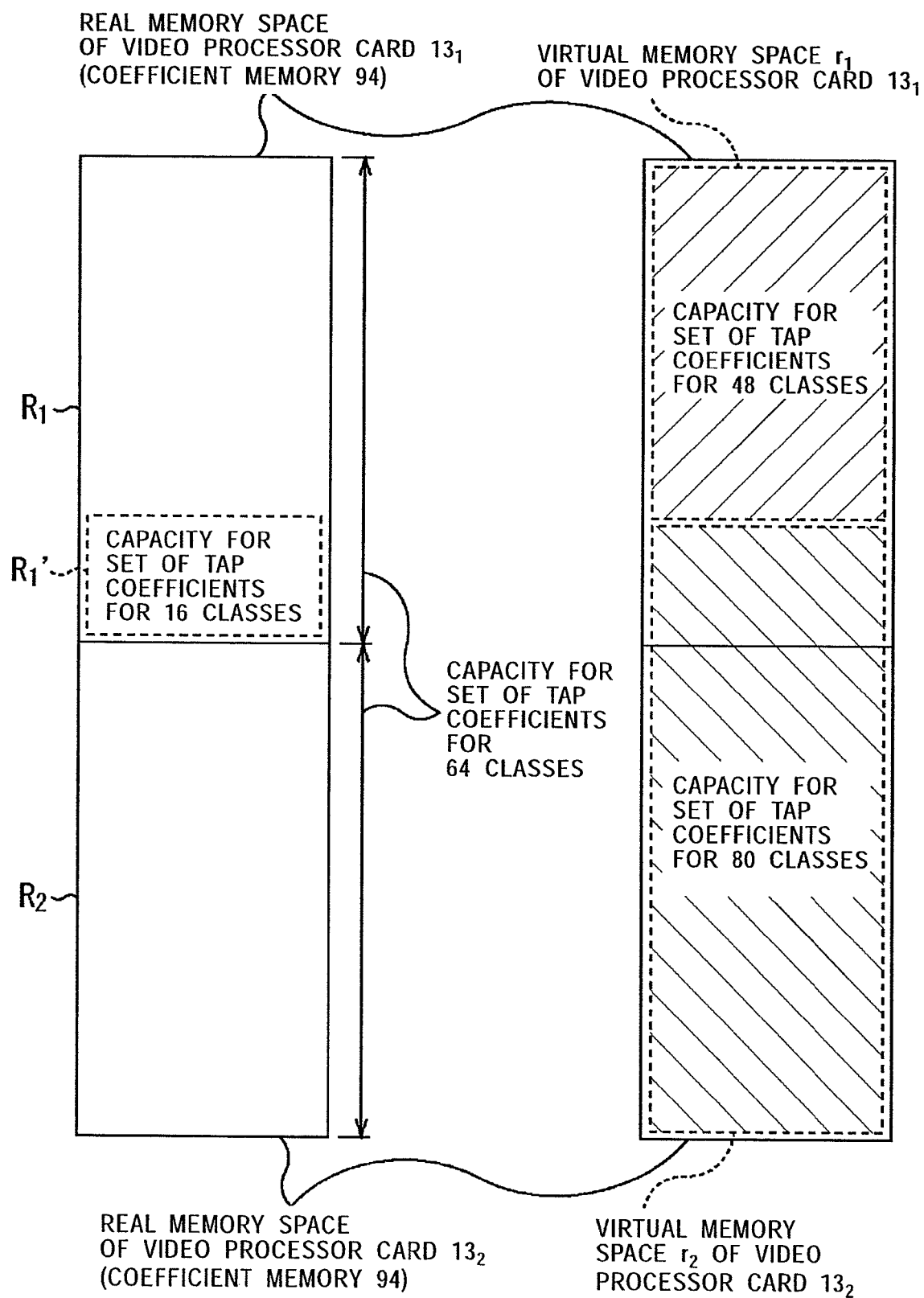
FIG. 26 illustrates the video processor cards $13_1$ and $13_2$ which store a tap coefficient in the virtual memory space thereof.

The shared memory space controller 100 in the video processor card $13_1$ recognizes that the memory space required for itself is the size for storing the tap coefficients for the 48 classes, and also recognizes that a capacity for the set of tap coefficients for the 16 classes, out of the real memory space $R_1$ of the coefficient memory 94, remains unused. Referring to FIG. 26, the shared memory space controller 100 in the video processor card $13_1$ reserves a capacity to store the tap coefficients for the 48 classes as a virtual memory space $r_1$ of its own. Furthermore, the shared memory space controller 100 in the video processor card $13_1$ permits the shared memory space controller 100 in the video processor card $13_2$ to use the memory space $R_1'$ having a capacity to store the set of tap coefficients for the 16 classes.

Referring to FIG. 26, the shared memory space controller 100 in the video processor card $13_2$ reserves a virtual memory space $r_2$ having a capacity to store the set of tap coefficients for the 80 classes, namely, a combination of the real memory space $R_2$ of the coefficient memory 94 in the video processor card $13_2$ and the real memory $R_1'$ permitted to store the set of tap coefficients for the 16 classes in the coefficient memory 94 in the video processor card $13_1$. The shared memory space controller 100 in the video processor card $13_2$ stores there the set of tap coefficients for the 80 classes.

Figure 27:
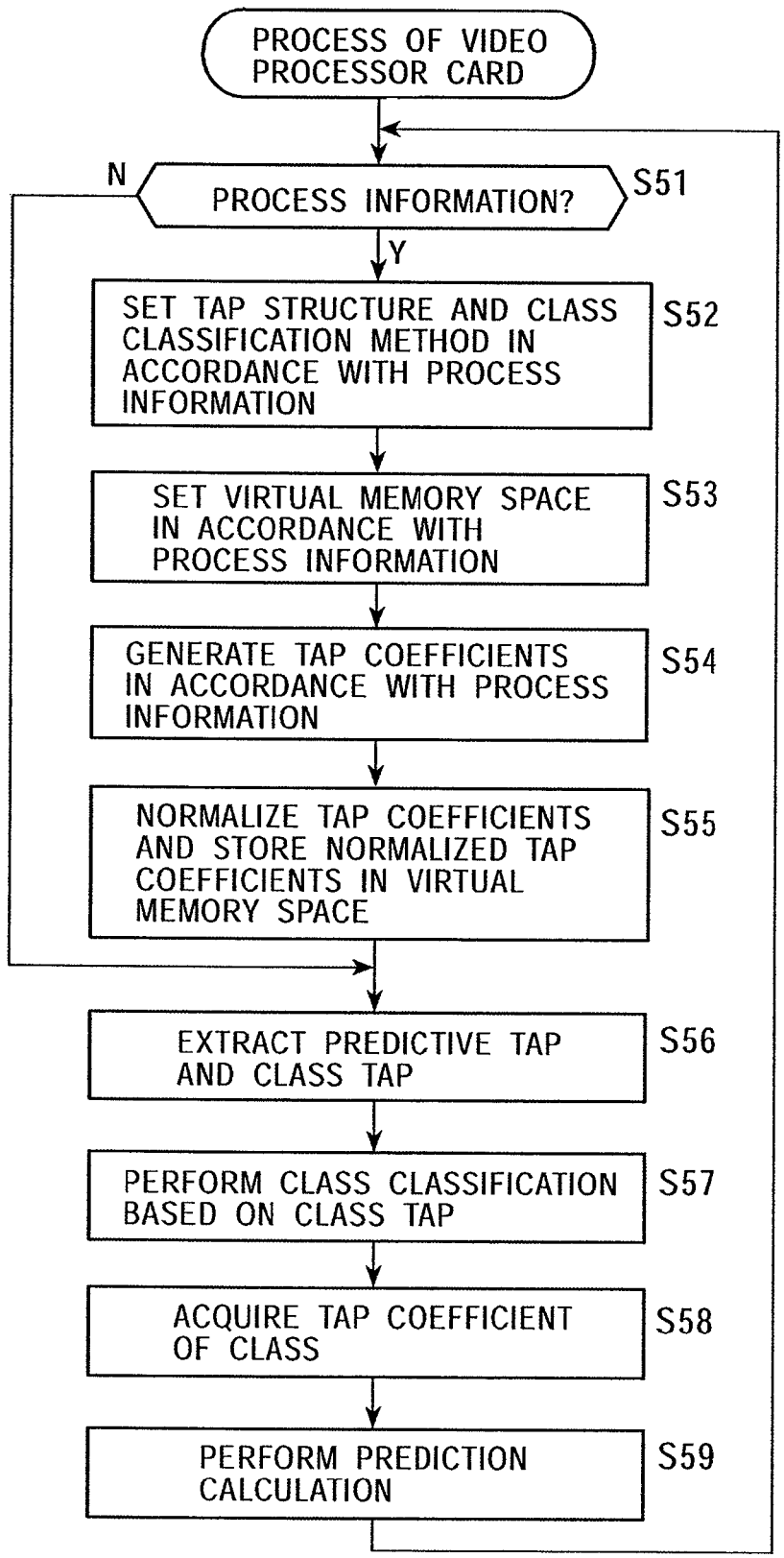
FIG. 27 is a flow diagram illustrating the process of the video processor card 13.

The process of the video processor card 13 illustrated in FIG. 20 will now be discussed with reference to a flow diagram illustrated in FIG. 27.

In step S51, the card controller 98 in the video processor card 13 illustrated in FIG. 20 determines whether the video processor card 13 has received the process information (the maximum ID process information) transmitted from the interface controller 81 (see FIG. 5) in step S5 as already discussed with reference to FIG. 7.

If it is determined in step S51 that the maximum ID process information has not been received, the algorithm proceeds to step S56, skipping steps S52 through S55.

If it is determined in step S51 that the maximum ID process information has been received, the algorithm proceed to step S52. The card controller 98 references the maximum ID process information, thereby recognizing the content of the data conversion process which needs to be performed by the card controller 98 itself like in step S12 illustrated in FIG. 8. In accordance with the result of recognition, the card controller 98 controls the tap extractors 91 and 92, and class classifier 93.

In step S53, the card controller 98 recognizes the size of the set of tap coefficients generated by the coefficient generator 96, by referencing the process information (the maximum ID process information) which is determined as being received from the video processing interface 40. The card controller 98 then notifies the shared memory space controller 100 of the size of the set of tap coefficients generated by the coefficient generator 96. The maximum ID process information contains information about the number of classes Z of the tap coefficients generated from the coefficient seed data and the number of taps N, as the tap generation information. Based on these pieces of information, the card controller 98 recognizes the size of the tap coefficients generated in the coefficient generator 96, and feeds this information to the shared memory space controller 100.

Also in step S53, the shared memory space controller 100 reserves the virtual memory space having the size notified by the card controller 98 as already discussed, and the algorithm then proceeds to step S54.

Figure 8:
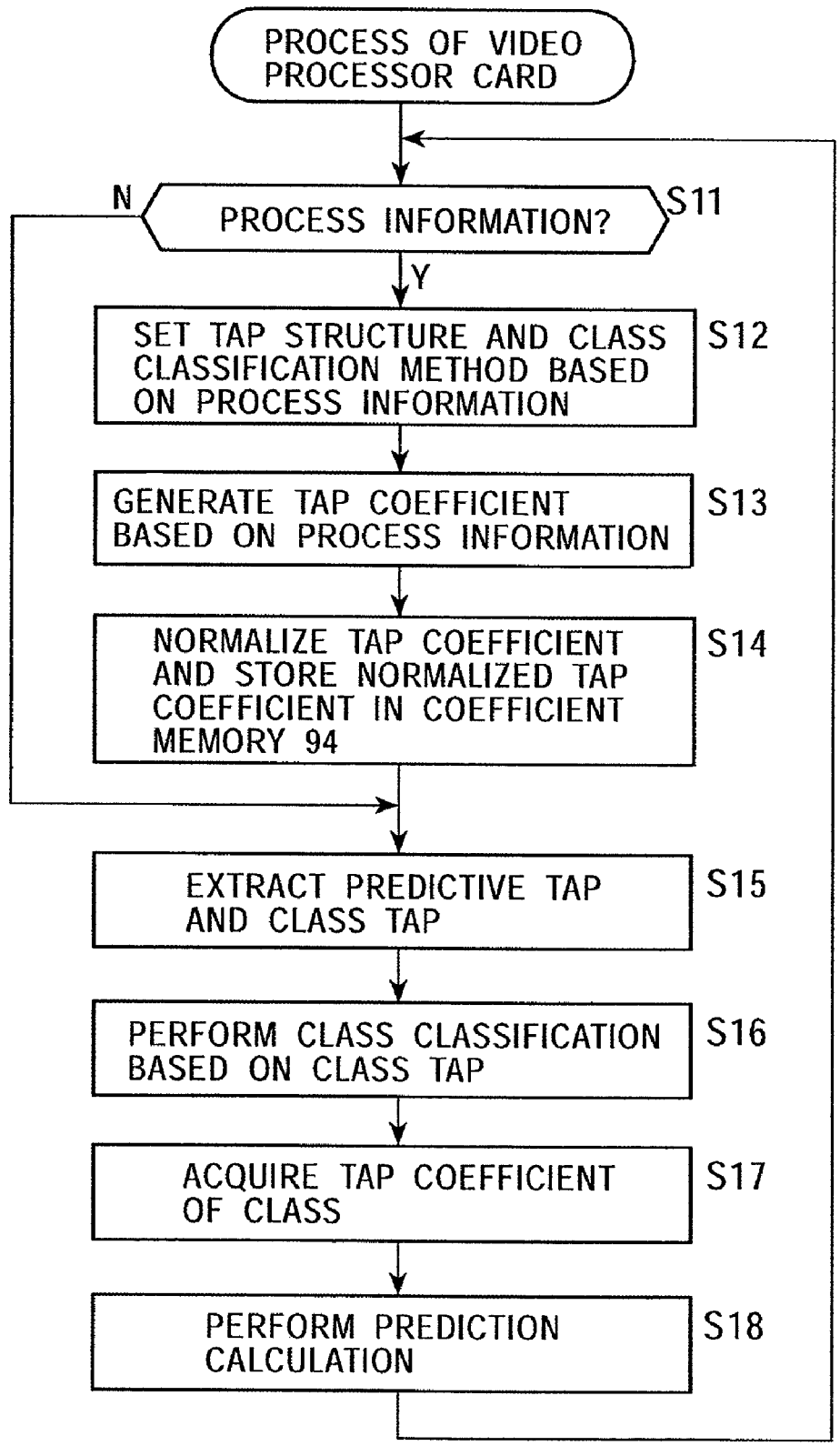
FIG. 8 is a flow diagram illustrating the process of the video processor card 13.

In step S54, the card controller 98 controls the coefficient generator 96 in accordance with the maximum ID process information like in step S13 illustrated in FIG. 8, thereby generating the tap coefficients for each class from the tap generation information. The tap coefficients are fed to the coefficient normalizer 99.

In step S55, the coefficient normalizer 99 normalizes the tap coefficients from the coefficient generator 96, and feeds the tap coefficients for each class to the shared memory space controller 100 subsequent to the normalization. Also in step S55, the shared memory space controller 100 stores the tap coefficients for each class from the coefficient normalizer 99 in the virtual memory space which is made available in step S53. The algorithm then proceeds to step S56.

In step S56, the tap extractors 91 and 92 construct the predictive tap and class tap with respect to a target pixel, respectively, in the same manner as in step S15 illustrated in FIG. 8. The predictive tap is fed from the tap extractor 91 to the predictor 95, and the class tap is fed from the tap extractor 92 to the class classifier 93.

In step S57, the class classifier 93 classifies the target pixel based on the class tap of the target pixel supplied from the tap extractor 92, and feeds the class code representing the class of the target pixel to the shared memory space controller 100. The algorithm proceeds to step S58.

In step S58, the shared memory space controller 100 reads and acquires, from the virtual memory space, the tap coefficient stored at an address corresponding to the class code supplied from the class classifier 93. The tap coefficient is fed to the predictor 95 from the shared memory space controller 100. The algorithm then proceeds to step S59.

In step S59, the predictor 95 performs prediction calculation of equation (1) using the predictive tap output from the tap extractor 91 and the tap coefficient supplied from the shared memory space controller 100. The predictor 95 determines the pixel value of the target pixel, and feeds the pixel value to the card interface 83 (see FIG. 5). The algorithm loops to step S51 to repeat the same process.

A plurality of video processor cards 13 share a portion of the coefficient memory 94, and reserves the virtual memory space of minimum size capable of storing the tap coefficients. The memory capacity of the coefficient memory 94 is thus conserved with no memory space left unused.

Referring to FIGS. 21 through 26, the video processor card $13_2$ stores the set of tap coefficients for the 80 classes generated by the coefficient generator 96 only when the video processor card $13_1$ is also loaded together with the video processor card $13_2$ on the video processing interface 40. The data conversion process cannot be performed with the video processor card $13_2$ only. A user, who has no video processor card $13_1$, is prevented from performing illegally the data conversion process with the video processor card $13_2$ only.

Figure 28:
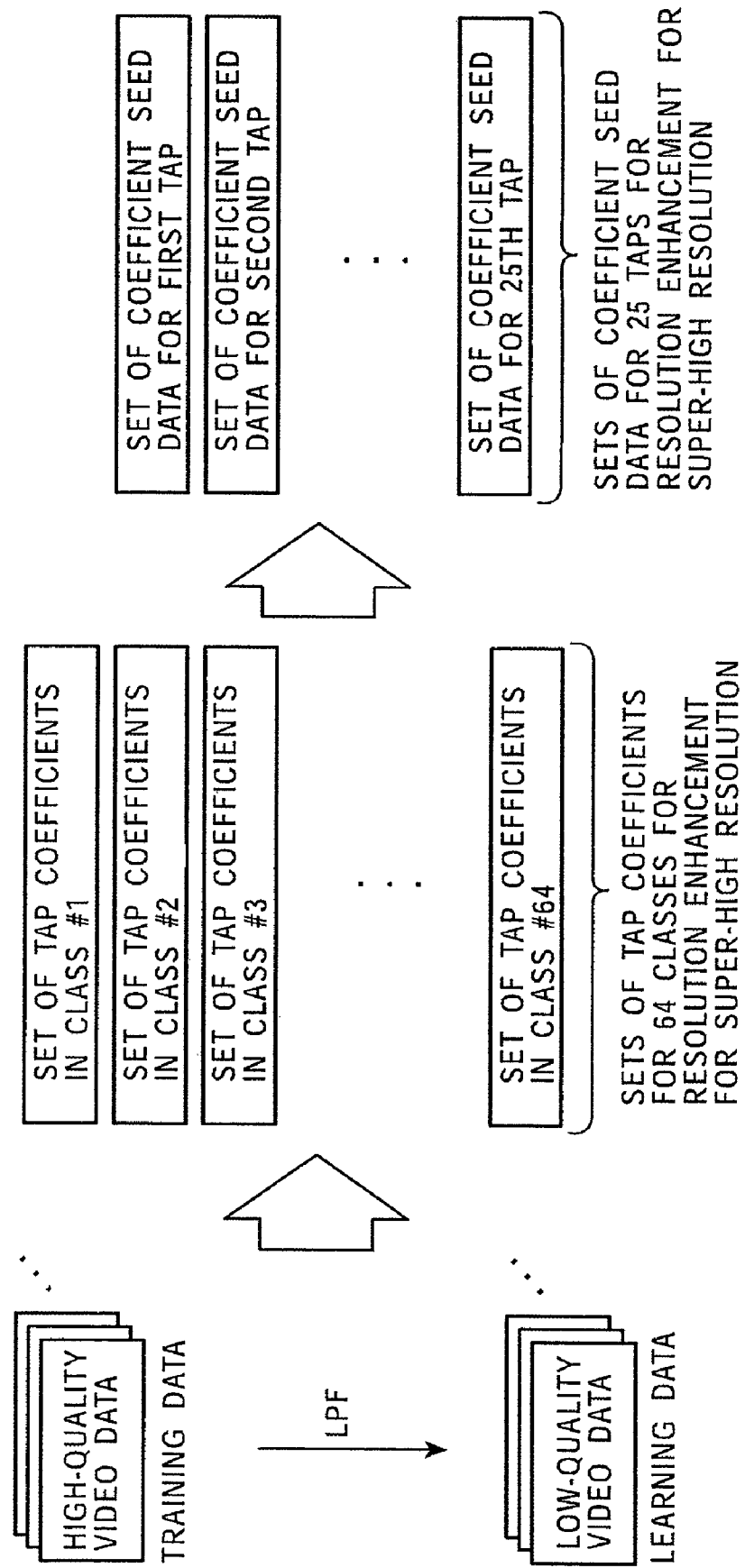
FIG. 28 illustrates the generation method of the coefficient seed data stored in the video processor card 13.

If the spatial resolution of the image is enhanced to improve image quality, the video processor, card $13_1$ stores, as the tap generation information, a set of 25 tap coefficient seed data as illustrated in FIG. 28. A learning process is performed with super-high resolution video data set as training data, and low-resolution data set as learning data. The low-resolution video data is obtained by degrading the super-high resolution data into high-resolution video data with the spatial resolution lowered, and further by degrading the high-resolution video data to the low-resolution video data with the spatial resolution lowered. A set of tap coefficients for 64 classes for super-high resolution is thus generated, and then compressed, and the set of 25 tap coefficient seed data for super-high resolution is then generated. The set of 25 tap coefficient seed data is stored in the video processor card $13_1$ as the tap generation information.

Figure 29:
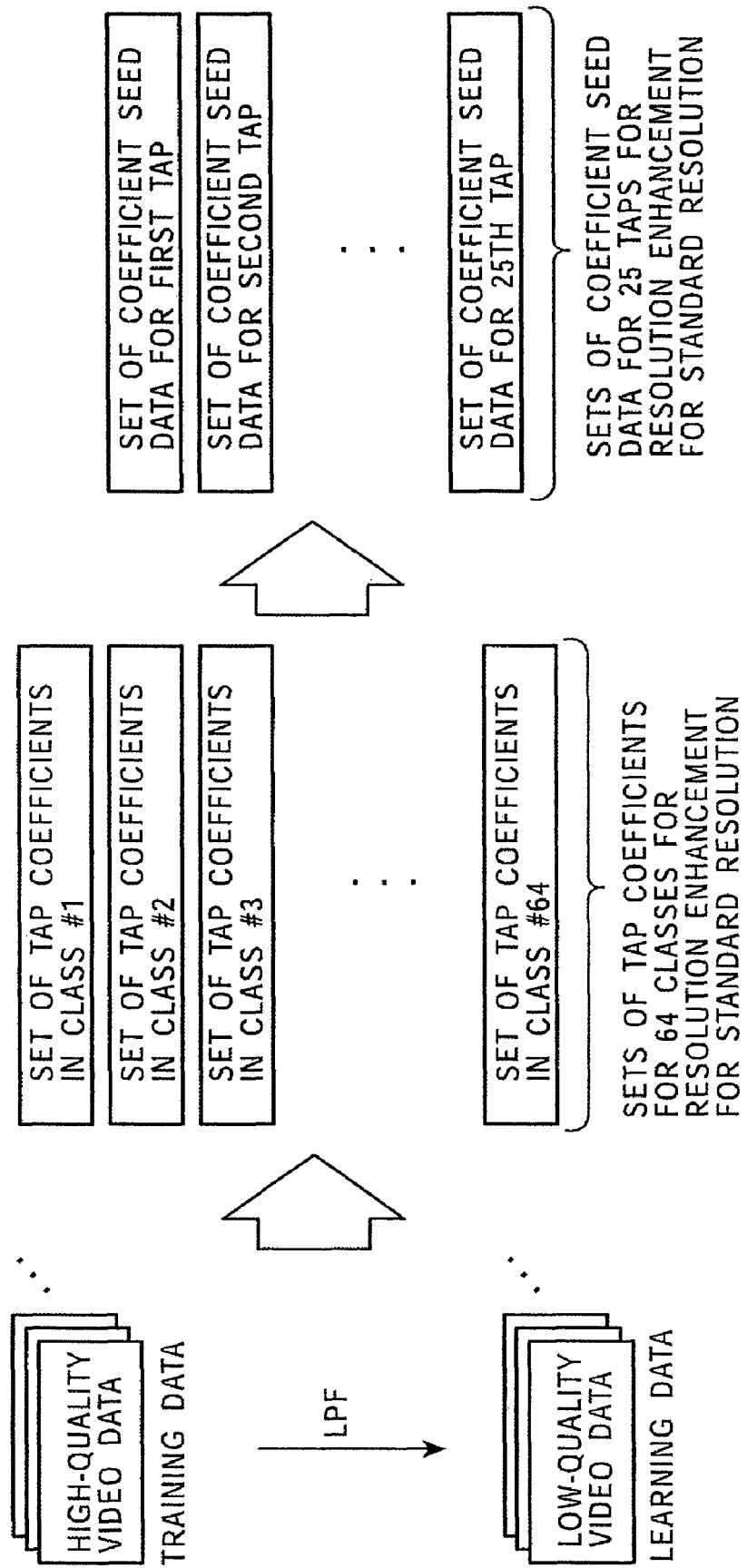
FIG. 29 illustrates the generation method of the coefficient seed data stored in the video processor card 13.

As shown in FIG. 29, the video processor card $13_1$ also stores, as the tap generation information, a set of 25 coefficient seed data in addition to the set of 25 tap coefficient seed data for super-high resolution as illustrated in FIG. 28. A learning process is performed with high-resolution video data set as training data, and low-resolution data set as learning data. The low-resolution video data is obtained by degrading the high-resolution video data to the low-resolution video data with the spatial resolution lowered. A set of tap coefficients for 64 classes for enhancing the resolution to standard resolution is thus generated. The set of tap coefficients for the 64 classes is then compressed, and the set of 25 tap coefficient seed data for standard resolution is then generated. The set of 25 tap coefficient seed data is stored in the video processor card $13_1$ as the tap generation information.

If the video processor card $13_1$ only is loaded in the video processing interface 40, the tap coefficients for 64 classes for standard resolution is generated from the 25 tap coefficient seed data for standard resolution. Using the tap coefficients, the video processor card $13_1$ performs the data conversion process. If both the video processor cards $13_1$ and $13_2$ are loaded in the video processing interface 40, the tap coefficients for 64 classes for super-high resolution is generated from the 25 tap coefficient seed data for super-high resolution. Using the tap coefficients, the video processor card $13_1$ performs the data conversion process.

Regardless of whether the video processor card $13_1$ only or both the video processor cards $13_1$ and $13_2$ are loaded, the data conversion process of the same type of image quality improvement, namely, for resolution enhancement, is performed. However, if the video processor card $13_1$ only is loaded, the tap coefficients for 64 classes for resolution enhancement to standard resolution are used. If both the video processor cards $13_1$ and $13_2$ are loaded, the tap coefficients for 64 classes for resolution enhancement to super-high resolution, different from the tap coefficients for 64 classes for resolution enhancement to standard resolution, are used. The video data resulting from the data conversion process is improved more in resolution.

In this embodiment, the generation of the tap coefficient $w_n$ from the coefficient seed data $\beta_{m,n}$ is carried out in accordance with the tap calculation equation (9).

Figure 30:
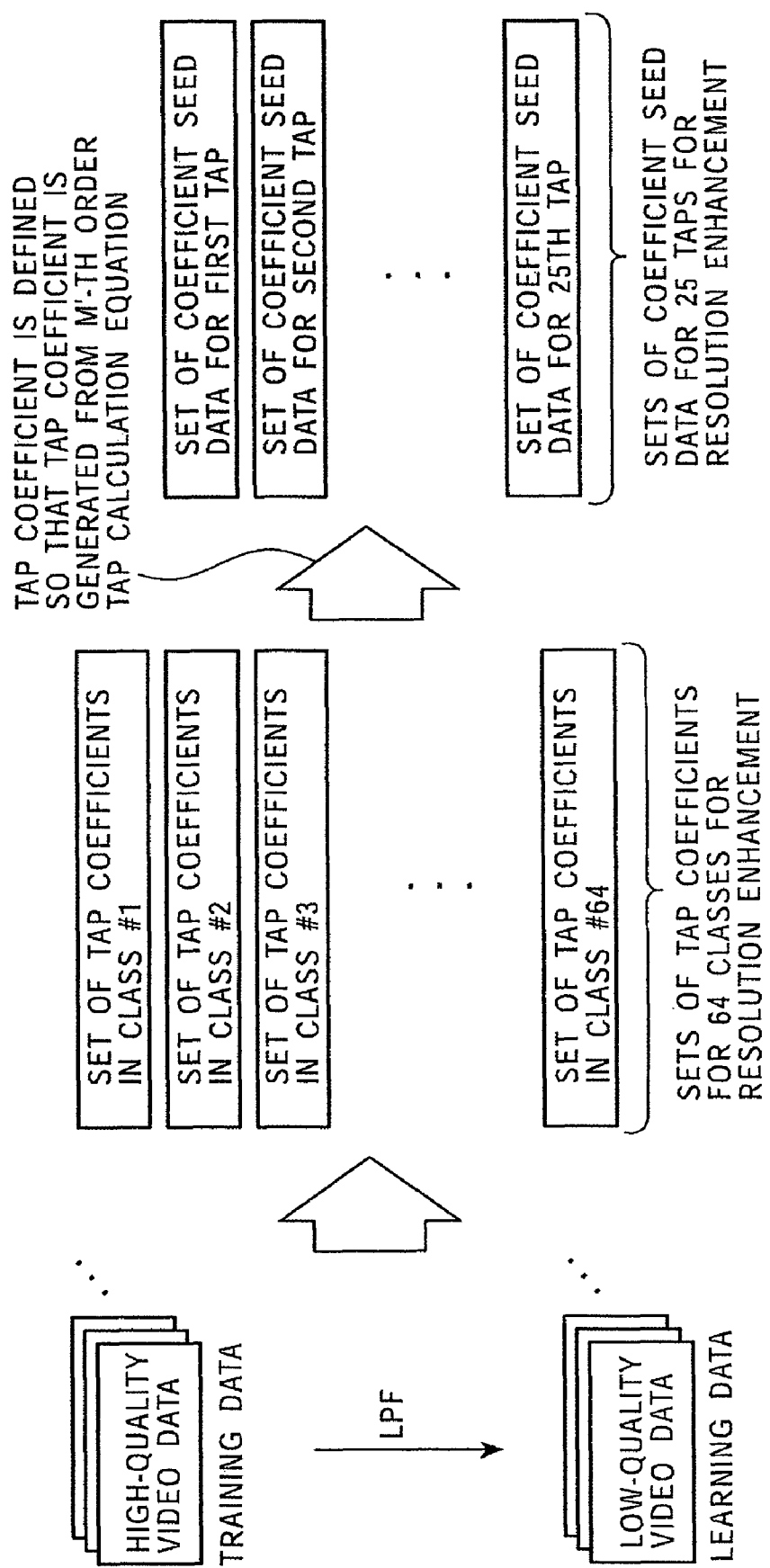
FIG. 30 illustrates the generation method of the coefficient seed data stored in the video processor card 13.

When the spatial resolution of the image is enhanced to improve image quality, the video processor card $13_1$ stores, as the tap generation information, a set of 25 tap coefficient seed data in the same way already discussed with reference to FIGS. 28 and 29. A learning process is performed with high resolution video data set as training data, and low-resolution data, obtained by degrading the spatial resolution of the high-resolution video data and set as learning data as shown in FIG. 30. A set of tap coefficients for 64 classes for super-high resolution is thus generated, and then compressed, and the set of 25 tap coefficient seed data for super-high resolution is then generated. The set of 25 tap coefficient seed data is stored in the video processor card $13_1$ as the tap generation information. The tap calculation equation (9) for compressing the tap coefficients into the coefficient seed data is M' term equation having the number of terms M'. A set of coefficient seed data for one tap includes M' pieces of coefficient seed data.

Figure 31:
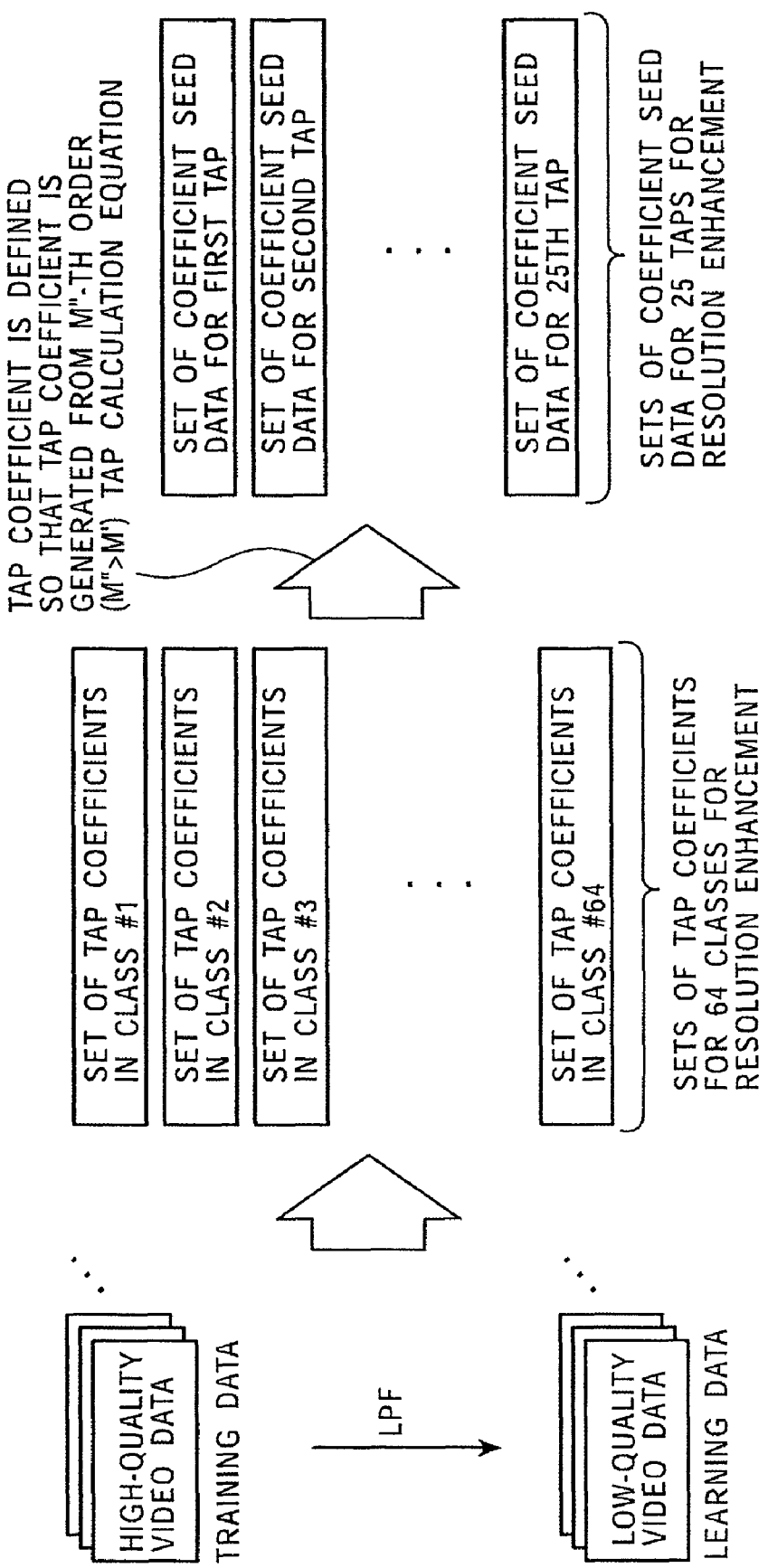
FIG. 31 illustrates the generation method of the coefficient seed data stored in the video processor card 13.

The video processor card $13_1$ stores, as the tap generation information, a set of coefficient seed data in addition to the set of 25 tap coefficient seed data for resolution enhancement shown in FIG. 30. A learning process is performed with high resolution video data set as training data, and low-resolution data, obtained by degrading the spatial resolution of the high-resolution video data and set as learning data as shown in FIG. 31. A set of tap coefficients for 64 classes for resolution enhancement is thus generated, and then compressed. The set of 25 tap coefficients for resolution enhancement is generated. The set of 25 tap coefficient seed data is stored in the video processor card $13_1$ as the tap generation information. The tap calculation equation (9) for compressing the tap coefficients into the coefficient seed data is M'' term equation having the number of terms M'', which is greater than M'. A set of coefficient seed data for one tap includes M'' pieces of coefficient seed data.

If the video processor card $13_1$ only is loaded in the video processing interface 40, the tap coefficients for 64 classes for resolution enhancement are generated from the 25 tap coefficient seed data for resolution enhancement with M' pieces of coefficient seed data per tap. The video processor card $13_1$ performs the data conversion process using the tap coefficients. If both the video processor card $13_1$ and $13_2$ are loaded in the video processing interface 40, the tap coefficients for 64 classes for resolution enhancement are generated from the 25 tap coefficient seed data for resolution enhancement with M'' pieces of coefficient seed data per tap. The video processor card $13_1$ performs the data conversion process using the tap coefficients.

Regardless of whether the video processor card $13_1$ only or both the video processor cards $13_1$ and $13_2$ are loaded, the data conversion process of the same type of image quality improvement, namely, for resolution enhancement, is performed. If the video processor card $13_1$ only is loaded, the tap coefficients for use in the data conversion process are generated from the 25 tap coefficient seed data for resolution enhancement with M' pieces of coefficient seed data per tap in accordance with the tap calculation equation (9) having the number of terms M'. If both video processor cards $13_1$ and $13_2$ are loaded, the tap coefficients for use in the data conversion process are generated from the 25 tap coefficient seed data for resolution enhancement with M'' pieces of coefficient seed data per tap in accordance with the tap calculation equation (9) having the number of terms M'', which is larger than M'. The tap coefficients are reconstructed with a higher accuracy. Like in the cases illustrated in FIGS. 28 and 29, the video processor card $13_1$ improves more the spatial resolution of the video data through the data conversion process when both video processor cards $13_1$ and $13_2$ are loaded than when the video processor card $13_1$ only is loaded.

Figure 32:
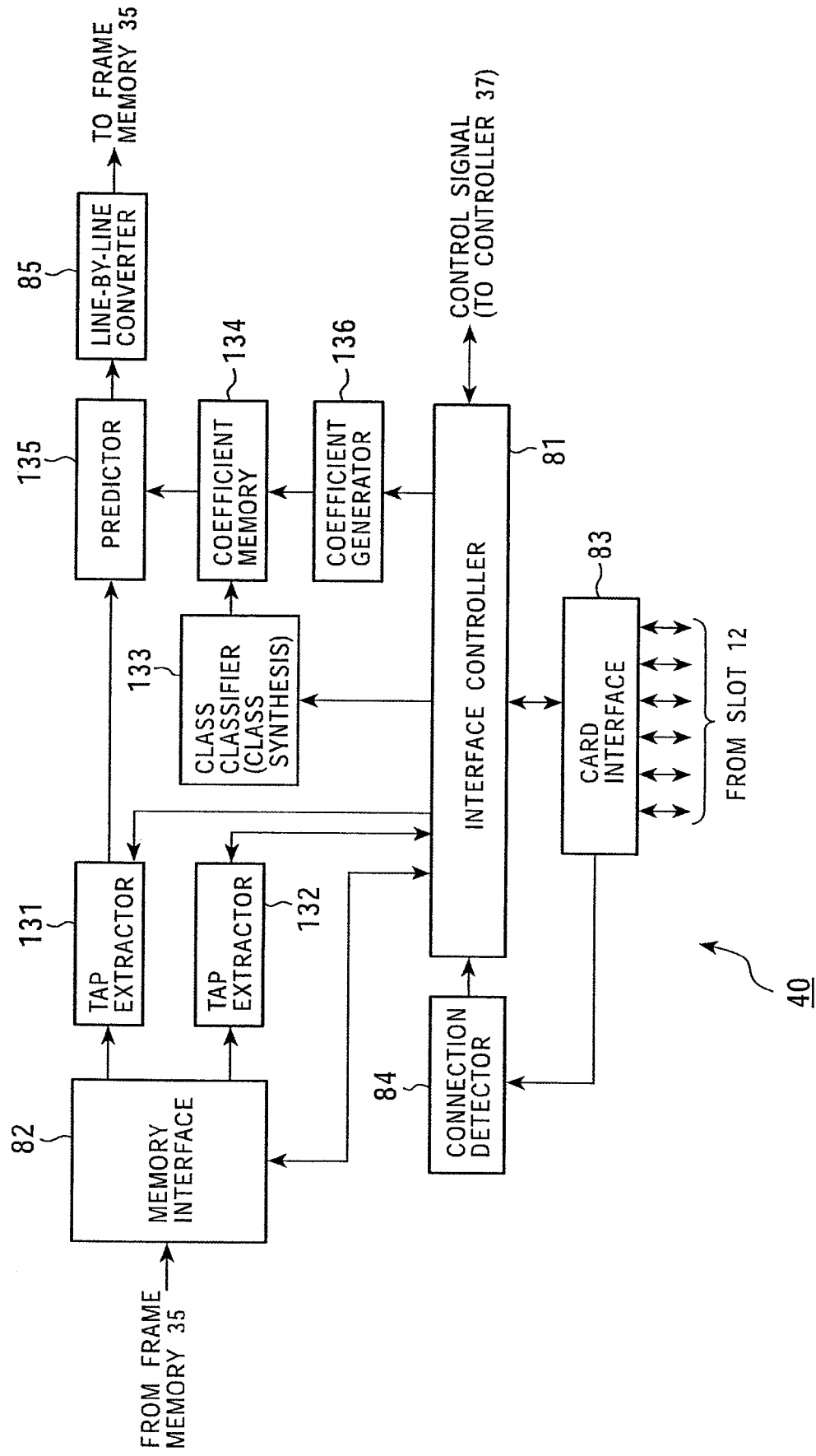
FIG. 32 is a block diagram illustrating a second construction of the video processing interface 40.

FIG. 32 illustrates a second construction of the video processing interface 40 of FIG. 3. As shown, components identical to those discussed with reference to FIG. 5 are designated with the same reference numerals and the discussion thereof is omitted as appropriate.

The video processing interface 40 in the embodiment illustrated in FIG. 32 reads the tap generation information from the video processor card 13 to be discussed with reference to FIG. 33 and mounted therein, and generates the tap coefficients. Using the tap coefficients, the video processing interface 40 performs the data conversion process on the video data stored in the frame memory 35 (see FIG. 3).

Tap extractors 131 and 132 are supplied with first video data which is read from the frame memory 35 through the memory interface 82 and which is to be data converted.

Like the tap extractor 91 shown in FIG. 6, the tap extractor 131 successively sets each pixel constituting second video data as a target pixel, and extracts, as predictive taps, several (pixel values of) pixels constituting the first video data which is used to predict the pixel value of the target pixel.

Like the tap extractor 92 shown in FIG. 6, the tap extractor 132 extracts, as a class tap, several pixels constituting the first video data which is used to classify the target pixel in one of a plurality of classes.

The tap extractors 131 and 132 are supplied with a control signal from the interface controller 81. The tap structure of the predictive tap constructed by the tap extractor 131 and the tap structure of the class tap constructed by the tap extractor 132 are set in accordance with the control signal from the interface controller 81. Specifically, the interface controller 81 reads, through the card interface 83, the process information from the video processor card 13 to be discussed with reference to FIG. 33 loaded in the video processing interface 40. Based on the process information, the interface controller 81 controls the tap structure in each of the tap extractors 131 and 132.

The predictive tap obtained in the tap extractor 131 is fed to a predictor 135, and the class tap obtained in the tap extractor 132 is fed to the interface controller 81.

Based on information supplied from the interface controller 81, the class classifier 133 classifies the target pixel, and feeds a class code of the resulting class to a coefficient memory 134. The interface controller 81 feeds, through the card interface 83, the class tap of the target pixel supplied from the tap extractor 132 to the video processor card 13 to be discussed with reference to FIG. 33 and loaded in the video processing interface 40. The interface controller 81 requests the video processor card 13 to classify the target pixel. The interface controller 81 receives, through the card interface 83, the class code which the video processor card 13 transmits in response to the request subsequent to the class classification. The class code is then fed to the class classifier 133. The class classifier 133 synthesizes class codes, supplied from the interface controller 81, as a result of at least one class classifications performed by the video processor card 13 loaded in the video processing interface 40. The class classifier 133 results in a class code as a final class classification result, and feeds the class code to the coefficient memory 134.

For example, the class classification method of the video processor card 13 is designated based on the process information which the interface controller 81 reads from the video processor card 13 loaded in the video processing interface 40.

The coefficient memory 134 stores the tap coefficients for each class supplied from the coefficient generator 136. The coefficient memory 134 supplies the predictor 135 with tap coefficients, out of the stored tap coefficients, stored as an address corresponding to the class code supplied from the class classifier 133 (the tap coefficients of a class represented by the class code supplied from the class classifier 133).

Like the predictor 95 illustrated in FIG. 6, the predictor 135 acquires the predictive tap output from the tap extractor 131 and the tap coefficient output from the coefficient memory 134, and performs prediction calculation defined by equation (1) for determining a predictive value of the true value of the target pixel, using the predictive tap and the tap coefficient. The predictor 135 determines and outputs (the predictive value of) the pixel value of the target pixel, namely, the pixel value of the pixel constituting the second video data.

The coefficient generator 136 receives the tap generation information which the interface controller 81 reads, through the card interface 83, from the video processor card 13 loaded in the video processing interface 40. Based on the tap generation information, the coefficient generator 136 generates the tap coefficients for each class. The tap coefficients for each class are fed to the coefficient memory 134 for storage.

Figure 33:
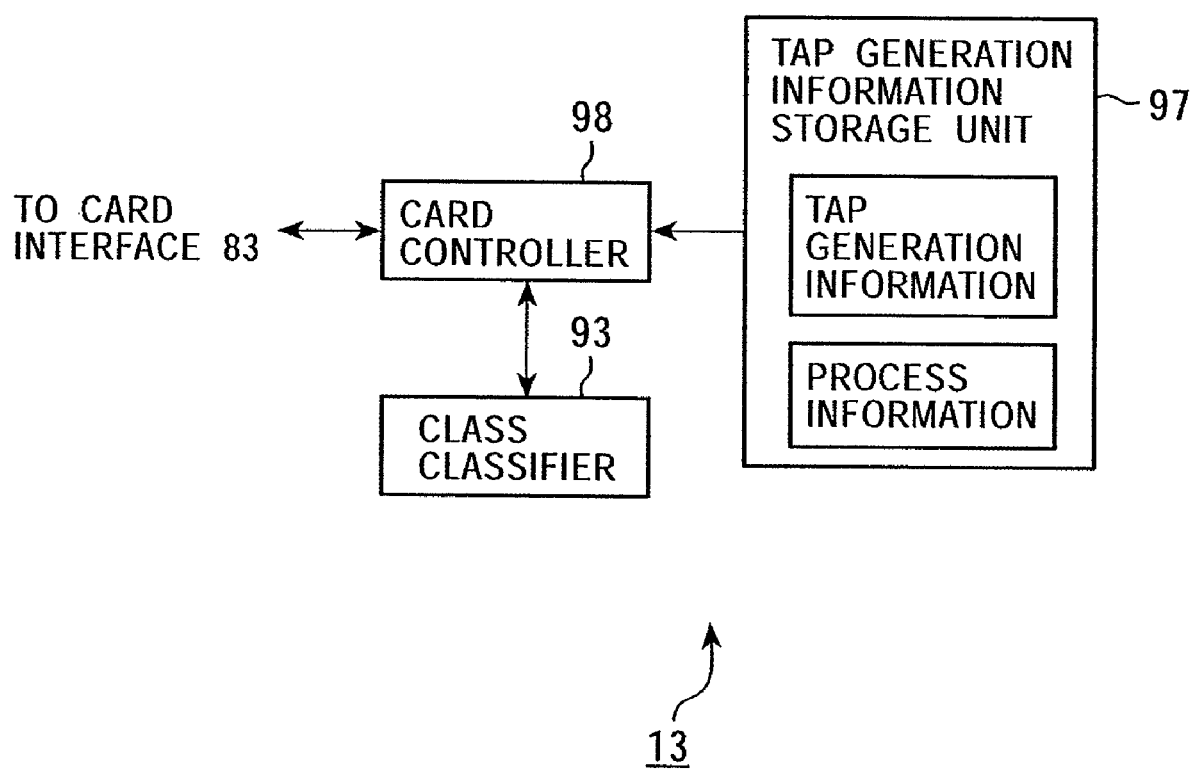
FIG. 33 is a block diagram illustrating a third construction of the video processor card 13.

FIG. 33 illustrates the construction of the video processor card 13 wherein the video processing interface 40 is constructed as illustrated in FIG. 32. As shown, components identical to those described with reference to FIG. 6 are designated with the same reference numerals, and the discussion thereof is omitted as appropriate. The video processor card 13 shown in FIG. 33 includes the class classifier 93, tap generation storage unit 97, and card controller 98 shown in FIG. 6.

Figure 34:
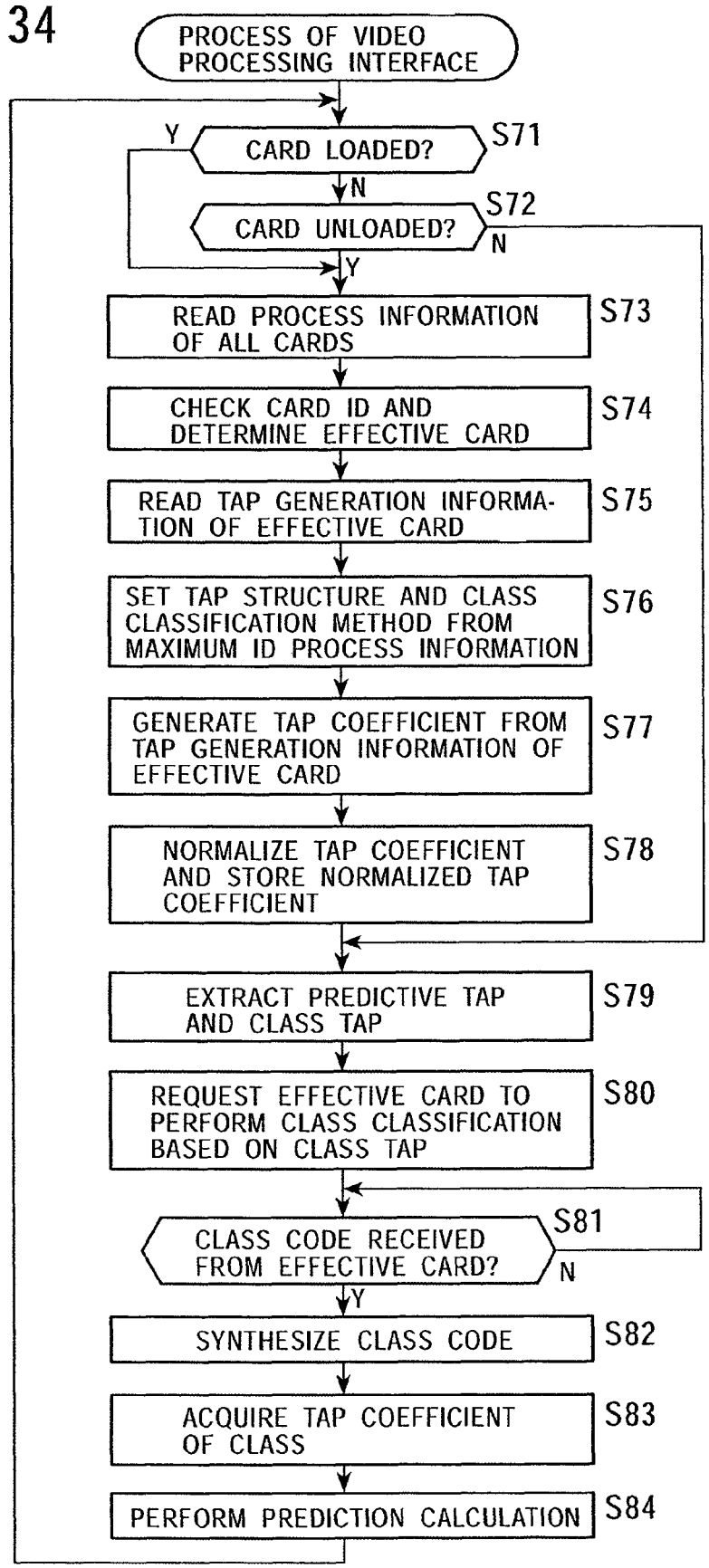
FIG. 34 is a flow diagram illustrating the process of the video processing interface 40.

The operation of the video processing interface 40 shown in FIG. 32 is discussed below with reference to a flow diagram illustrated in FIG. 34.

The video processing interface 40 performs process steps in steps S71 through S74, which are the same process steps as in steps S1 through S4 as illustrated in FIG. 7.

In step S74, the interface controller 81 determines a video processor card $13_i$ to be an effective card. In step S75, the interface controller 81 reads the tap generation information from all video processor cards $13_i$ as effective cards through the card interface 83. Specifically, the interface controller 81 requests the tap generation information through the card interface 83 from the card controller 98 (see FIG. 33) in the video processor card $13_i$ as an effective card. The card controller 98 reads the tap generation information from the tap generation storage unit 97 and feeds the tap generation information to the interface controller 81 through the card interface 83. In this way, the interface controller 81 acquires all tap generation information from the video processor card $13_i$ as an effective card.

For example, if the video processor cards $13_1$ through $13_3$ are loaded in the video processing interface 40, all video processor cards $13_1$ through $13_3$ become effective cards. The interface controller 81 thus receives the tap generation information from all video processor cards $13_1$ through $13_3$. If the video processor cards $13_1$, $13_2$, and $13_4$ are loaded in the video processing interface 40, the video processor cards $13_1$ and $13_2$ become effective cards. The interface controller 81 receives the tap generation information from each of the video processor cards $13_1$ and $13_2$.

In step S76, the interface controller 81 recognizes the content of the data conversion process to be performed, based on the process information read from the video processor card $13_{i(max)}$ having the maximum card ID (the maximum ID process information) out of the process information read from each video processor card $13_i$ as an effective card. Based on the recognition result, the interface controller 81 controls the tap extractors 131 and 132, class classifier 133, and video processor card $13_i$ as the effective card.

The interface controller 81 sets the operation mode of the tap extractor 131 or 132 to construct the tap structure of the predictive tap or the class tap described in the maximum ID process information.

The interface controller 81 sets the operation mode of the class classifier 133 to synthesize the class code of an effective card based on a synthesis method described in the maximum ID process information. Specifically, the process information of the video processor card $13_i$ contains a description of the synthesis method of the class code (for example, information for generating a final class code by attaching a class code, obtained in the video processor card $13_2$, as the least significant bits to a class code obtained in the video processor card $13_1$). The interface controller 81 sets the operation mode of the class classifier 133 to synthesize the class codes in accordance with that information.

The interface controller 81 sets the operation mode of each video processor card $13_i$ as an effective card so that a class classification is performed in accordance with the class classification method described in the maximum ID process information. Specifically, the process information of the video processor card $13_i$ contains a description of the class classification method of the class classification to be carried out by the class classifier 93 in each of the video processor cards $13_1$ through $13_i$. The interface controller 81 sets the operation mode of the class classifier 93 (see FIG. 33) of the video processor card $13_i$ as an effective card.

In step S77, the interface controller 81 feeds the tap generation information read from the video processor card $13_i$ as an effective card to the coefficient generator 136, thereby generating the tap coefficients for each class from the tap generation information.

When the coefficient generator 136 generates the tap coefficients for each class, the algorithm proceeds to step S78. The coefficient generator 136 performs a normalization process on the tap coefficients for each class for level adjustment, and then feeds the normalized tap coefficients to the coefficient memory 134 for storage.

In step S79, the tap extractor 131 sets the video data, stored in the frame memory 35 (see FIG. 3) and supplied from the memory interface 82, as first video data which is to be data converted. Each pixel constituting second video data (the video data subsequent to the data conversion process) corresponding to the first video data is successively set as a target pixel. The tap extractor 131 extracts the pixel of the first video data having the predictive tap with the tap structure set in step S76 with respect to the target pixel. Also in step S79, the tap extractor 132 extracts a pixel of the first video data having the class tap with the tap structure set in step S76 with respect to the target pixel. The predictive tap is fed from the tap extractor 131 to the predictor 135, and the class tap is fed from the tap extractor 132 to the interface controller 81.

Upon receiving the class tap from the tap extractor 132, the interface controller 81 controls the card interface 83 in step S80, thereby supplying the effective video processor card $13_i$ with the class tap from the tap extractor 132, and thereby requesting the effective video processor card $13_i$ to perform class classification.

Figure 35:
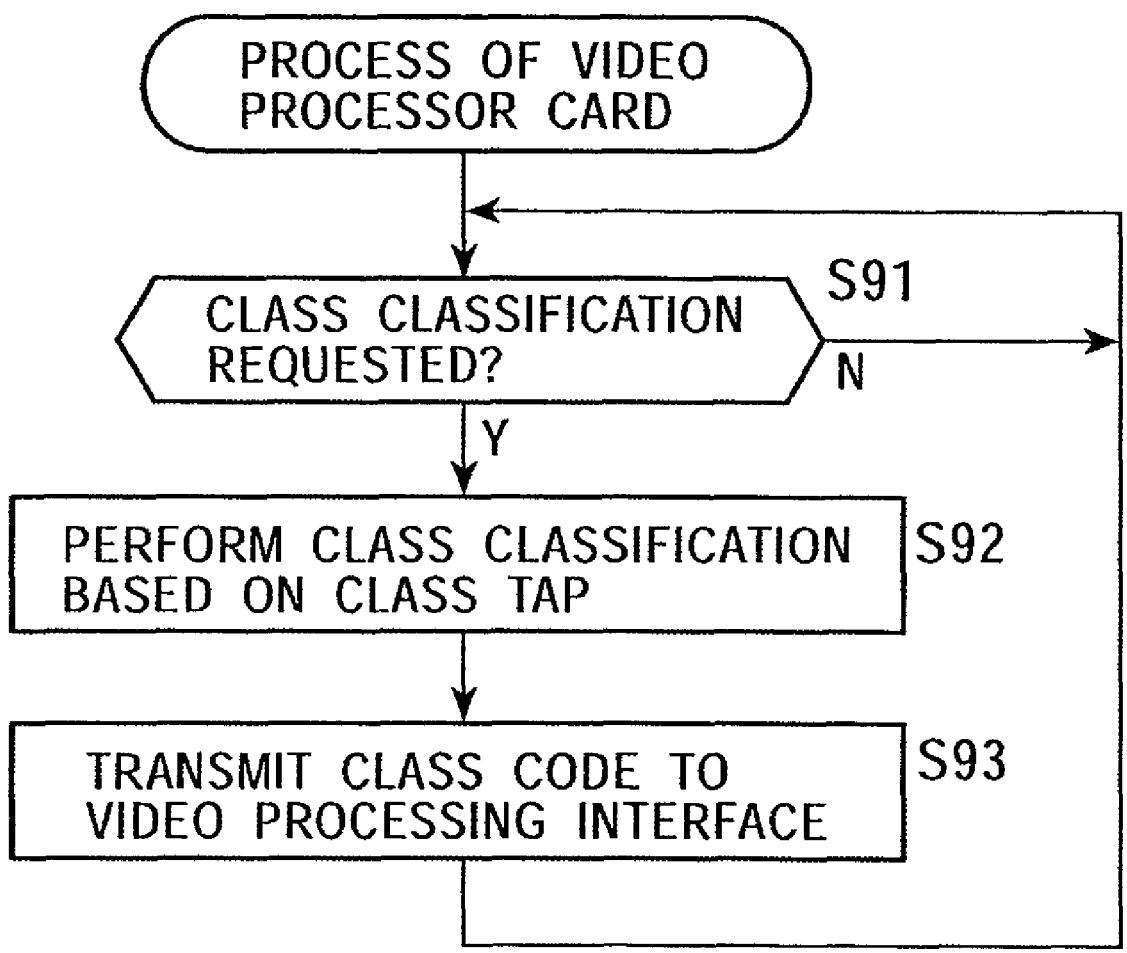
FIG. 35 is a flow diagram illustrating the process of the video processor card 13.

As will be discussed later with reference to FIG. 35, the video processor card $13_i$, which is currently effective, classifies the target pixel based on the class tap from the interface controller 81 in response to the request from the interface controller 81. The class code as a result of class classification is then fed to the interface controller 81 through the card interface 83.

In step S81, the interface controller 81 determines whether the class codes have been received from all currently effective video processor cards $13_i$ as a result of class classification.

If it is determined in step S81 that the class codes have not been received from all currently effective video processor cards $13_i$ as a result of class classification, step S81 is repeated.

If it is determined in step S81 that the class codes have been received from all currently effective video processor cards $13_i$ as a result of class classification, all class codes are fed to the class classifier 133. The algorithm proceeds to step S82.

In step S82, the class classifier 133 synthesizes the class codes supplied from the effective video processor cards $13_i$ through the interface controller 81, thereby resulting in a class code as a result of final class classification of the target pixel. The class code is then fed to the coefficient memory 134. The algorithm proceeds to step S83.

In step S83, the coefficient memory 134 reads and outputs the tap coefficient stored at an address corresponding to the class code supplied from the class classifier 133, namely, the tap coefficient of the class corresponding to the class code. In step S83, the predictor 135 receives the tap coefficient output from the coefficient memory 134. The algorithm proceeds to step S84.

In step S84, the predictor 135 performs prediction calculation expressed by equation (1) using the predictive tap output from the tap extractor 131, and the tap coefficient obtained from the coefficient memory 134. In this way, the predictor 135 determines the pixel value of the target pixel, and then feeds the pixel value to the line-by-line converter 85. The algorithm loops to step S71 to repeat the above process.

The process of the video processor card $13_1$, which becomes an effective card, is discussed with reference to a flow diagram illustrated in FIG. 35.

In step S91, the card controller 98 in the effective video processor card $13_i$ determines whether the video processor card $13_i$ has received a class classification request together with the class tap from (the interface controller 81 of) the video processing interface 40. If it is determined that the class classification request has not been received, step S91 is repeated.

If it is determined in step S91 that the video processor card $13_i$ has received the class classification request, the algorithm proceeds to step S92. The card controller 98 receives the class classification request together with the class tap from the video processing interface 40. The card controller 98 requests the class classifier 93 to perform class classification in response to the class tap. The class classifier 93 classifies the target pixel in accordance with the class tap using the class classification method set in step S76 as illustrated in FIG. 34. The resulting class code is fed to the card controller 98.

In step S93, the card controller 98 transmits the class code from the class classifier 93 to the video processing interface 40. The algorithm loops to step S91 to repeat the same process.

Discussed next are the class classification of the class classifier 93 (see FIG. 33) of the effective video processor card $13_i$ and the process of the class classifier 133 (see FIG. 32) of the video processing interface 40 which synthesizes the class code as a result of class classification.

For example, the tap extractor 132 constructs a class tap formed of nine pixels, namely 3×3 pixels, as target pixels.

It is now assumed that the video processor cards $13_1$ through $13_3$ are loaded in the video processing interface 40, and are set to be effective. The class classifier 93 (see FIG. 33) in the video processor card $13_i$ classifies the class tap using 1-bit ADRC process, thereby outputting a 9 bit class code.

The class classifier 93 (see FIG. 33) in the video processor card $13_2$ detects a motion vector of the pixel at the center of the class tap (center pixel), and compares the magnitude of the motion vector with a predetermined threshold. The class classifier 93 thus determines whether or not the center pixel has moved, thereby outputting a 1 bit class code representing the presence or absence of motion of the center pixel. The class classifier 93 in the video processor card $13_2$ stores one frame old video data that is supplied as a class tap one frame earlier, and performs block matching with the one frame old video data using the class tap, thereby detecting the motion vector. The class classifier 93 in the video processor card $13_2$ determines that the center pixel has moved if the magnitude of the motion vector is above the predetermined threshold; otherwise, the class classifier 93 in the video processor card $13_2$ determines that the center pixel remains stationary.

The class classifier 93 (see FIG. 33) in the video processor card $13_3$ calculates a difference between the center pixel of the class tap and each pixel adjacent to the center pixel, and compares the absolute values of the differences with a predetermined threshold. The class classifier 93 determines the presence or absence of an edge in the center pixel, thereby outputting a 1 bit class code representing the presence or absence of the edge. For example, the class classifier 93 determines that there is an edge if any of the absolute values of the differences of the pixels with respect to the center pixel is above the predetermined threshold; otherwise, the class classifier 93 determines that there is no edge.

Hereinafter, the class classification performed by the class classifier 93 in the video processor card $13_i$ is referred to as an i-th class classification, and a class code obtained as a result of the i-th class classification is referred to as an i-th class code.

The class classifier 133 (see FIG. 32) in the video processing interface 40 attaches a second class code obtained through a second class classification of the class classifier 93 in the video processor card $13_2$ as the least significant bit to a first class code of a first class classification of the class classifier 93 in the video processor card $13_1$, and further attaches a third class code obtained through a third class classification of the class classifier 93 in the video processor card $13_3$ as the least significant bit to the least significant bit of the first class code.

If the video processor card $13_1$ only is loaded in the video processing interface 40, the class classifier 133 (see FIG. 32) in the video processing interface 40 outputs the first 9 bit class code obtained through the first class classification of the class classifier 93 of the video processor card $13_1$ as a class code which is final (hereinafter referred to as a final class code).

If both video processor cards $13_1$ and $13_2$ are loaded in the video processing interface 40, the class classifier 133 (see FIG. 32) attaches the 1 bit second class code obtained through the second class classification of the class classifier 93 in the video processor card $13_2$ as the least significant bit to the 9 bit first class code obtained through the first class classification of the class classifier 93 in the video processor card $13_1$, and outputs the resulting 10 bit code as a final class code.

If the video processor cards $13_1$ through $13_3$ are loaded in the video processing interface 40, the class classifier 133 (see FIG. 32) in the video processing interface 40 attaches the 1 bit second class code obtained through the second class classification of the class classifier 93 in the video processor card $13_2$ as the least significant bit to the 9 bit first class code obtained through the first class classification of the class classifier 93 in the video processor card $13_1$, and further attaches a 1 bit third class code obtained through the third class classification of the class classifier 93 in the video processor card $13_3$, and outputs the resulting 11 bits as a final class code.

When the video processor card $13_1$ through $13_i$ are loaded in the video processing interface 40, the class code output from the class classifier 133 is incremented by 1 from the class code with the video processor card $13_1$ through $13_{i-1}$ loaded, the class number changes depending on the number of video processor cards $13_i$ loaded in the video processing interface 40 as effective cards as illustrated in FIG. 36.

If the video processor card $13_1$ only is loaded in the video processing interface 40, the final class code becomes 9 bits, and the class number becomes 512 ($=2^9$) (see the leftmost column in FIG. 36). If the video processor card $13_1$ and $13_2$ are loaded in the video processing interface 40, the final class code is 10 bits, and the number of classes becomes 1024 ($2^{10}$) classes (see the second column from the left in FIG. 36). If the video processor card $13_1$ through $13_3$ are loaded in the video processing interface 40, the final class code is 11 bits, and the number of classes becomes 2048 ($2^{11}$) classes (see the rightmost column in FIG. 36).

The learning device illustrated in FIG. 11 performs a learning process using the class classification, which outputs the first class code obtained through the first class classification, as the class classification method of the class classifier 117. The learning device then generates a set of tap coefficients for 512 classes using the first class classification, and compresses the set of tap coefficients for the 512 classes into a set of coefficient seed data according to the first class classification. The video processor card $13_1$ stores the set of coefficient seed data according to the first class classification as the tap generation information.

The learning device illustrated in FIG. 11 performs a learning process using the class classification, which outputs a class code which is obtained by attaching a second class code obtained using a second class classification as the least significant bit to the first class code obtained using the first class classification, as the class classification method of the class classifier 117. The learning device generates a set of tap coefficients for 1024 classes according to the first and second class classifications, and compresses the set of tap coefficients for the 1024 classes into a set of coefficient seed data according to the first and second class classification. The video processor card $13_2$ thus stores the set of coefficient seed data according to the first and second class classifications.

Figure 37:
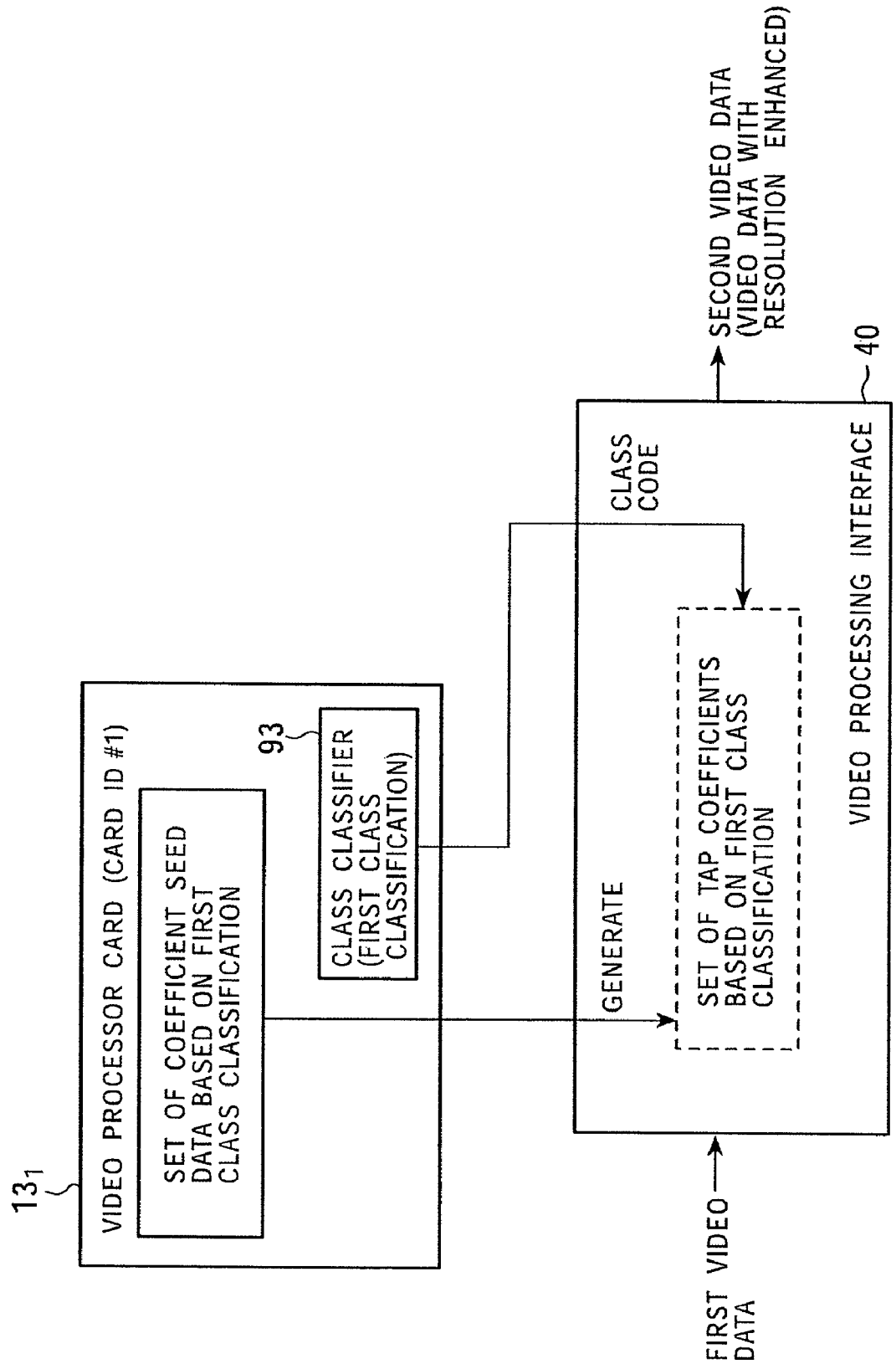
FIG. 37 illustrates the process of the video processor card $13_1$ and the video processing interface 40.
Figure 38:
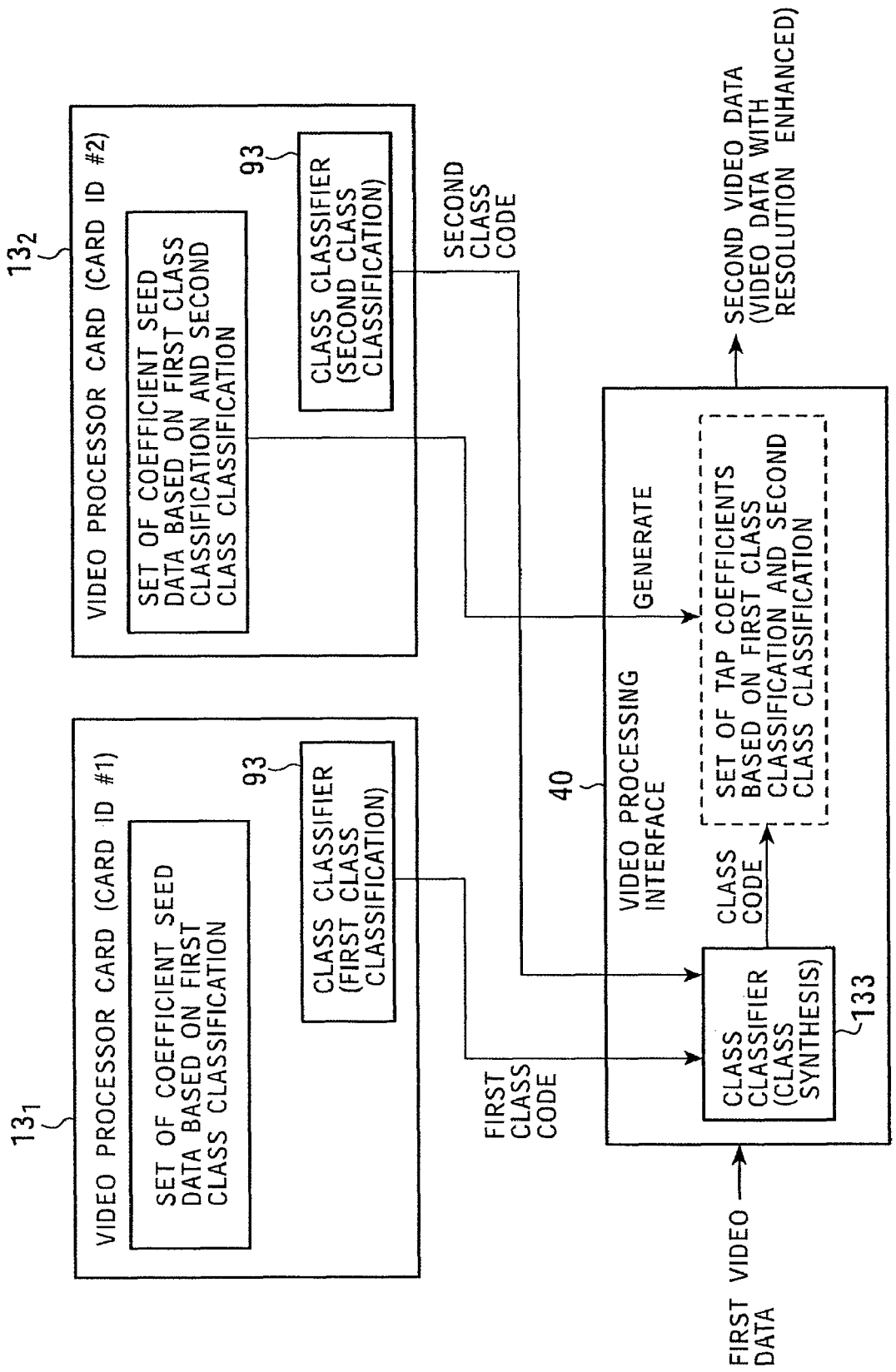
FIG. 38 illustrates the process of the video processor card $13_1$ and $13_2$, and the video processing interface 40.

If the video processor card $13_1$ only is loaded in the video processing interface 40, the video processing interface 40 reads the coefficient seed data according to the first classification stored as the tap generation information in the highest order video processor card $13_1$ among effective cards as shown in FIG. 37. The coefficient generator 136 generates a set of tap coefficients for the 512 classes according to the first class classification from the coefficient seed data. The class classifier 93 in the video processor card $13_1$ performs the first class classification, thereby outputting a 9 bit first class code. The class classifier 133 in the video processing interface 40 outputs the first class code as a final class code. The video processor card $13_1$ performs the data conversion process (the calculation defined by equation (1) and performed by the predictor 135 (see FIG. 32)) using the set of tap coefficients corresponding to the 9 bit first class code, among the set of tap coefficients for the 512 classes according to the first class classification.

If the video processor card $13_1$ and $13_2$ are loaded in the video processing interface 40, the video processing interface 40 reads a set of coefficient seed data according to the first and second class classification stored as the tap generation information in the lowest order video processor card $13_2$ of the effective cards as shown in FIG. 28. The coefficient generator 136 generates, from the set of coefficient seed data, a set of tap coefficients for 1024 classes according to the first and second class classifications. The class classifier 93 in the video processor card $13_1$ performs the first class classification, thereby outputting a 9 bit first class code, and the class classifier 93 in the video processor card $13_2$ performs the second class classification, thereby outputting a 1 bit second class code. The class classifier 133 in the video processing interface 40 attaches the second class code as the least significant bit to the first class code, thereby generating and outputting a final 10 bit class code. Furthermore, the video processing interface 40 uses, in the data conversion process, the set of tap coefficients corresponding to the final 10 bit class code, out of the set of tap coefficients for the 1024 classes according to the first and second class classifications.

As the number of video processor cards $13_i$ loaded in the video processing interface 40 and set as effective cards increases, the data conversion process is performed using the tap coefficients with the larger number of classes. The image quality of the video data is thus further improved.

For example, if the learning process for learning the set of tap coefficients based on the first and second class classifications and the learning process for learning the set of tap coefficients based on the first class classification are performed using the same education pair, the set of tap coefficients based on the first and second class classification has the number of classes larger than the set of tap coefficients based on the first class classification. The data conversion process which is performed using the set of tap coefficients based on the first and second class classification results in the advantage of image quality improvements over the data conversion process which is performed using the set of tap coefficients based on the first class classification.

The video processor cards $13_1$ and $13_2$ may store the coefficient seed data for performing the same image quality improvements. The video processor card $13_1$ and $13_2$ may also store the coefficient seed data for performing different image quality improvements. For example, the video processor card $13_1$ stores the coefficient seed data for performing noise removal, and the video processor card $13_2$ stores the coefficient seed data for performing resolution enhancement. The video processing interface 40 illustrated in FIG. 32 performs the data conversion process on the video data stored in the frame memory 35 (see FIG. 3) using the tap coefficients generated from the coefficient seed data stored in the video processor card $13_1$, and further performs the data conversion process on the resulting video data using the tap coefficients generated from the coefficient seed data stored in the video processor card $13_2$.

The video processor card $13_2$ may store the coefficient seed data for achieving another type of image quality improvements in addition to the coefficient seed data for image quality improvements stored in the video processor card $13_1$. Specifically, the video processor card $13_1$ stores the coefficient seed data for noise removal, and the video processor card $13_2$ stores the coefficient seed data for noise removal and resolution enhancement. In this embodiment, the number of classes of tap coefficients generated from the coefficient seed data of the video processor card $13_2$ is twice the number of classes of tap coefficients generated from the coefficient seed data of the video processor card $13_1$. The degree of noise removal achieved by the tap coefficients generated from the coefficient seed data of the video processor card $13_2$ remains almost the same as the degree of noise removal achieved by the coefficient seed data generated from the coefficient seed data of the video processor card $13_1$. When the video processor cards $13_1$ and $13_2$ are loaded, noise removal is performed at the same degree as when the video processor card $13_1$ only is loaded, and further the resolution is improved.

The video processor card $13_i$ other than the video processor cards $13_1$ and $13_2$ may store similar tap coefficients. As lower video processor cards $13_i$ are successively loaded in succession to the highest order video processor card $13_1$, the number of types of image quality improvements increases. Since the functions of the main unit 1 of the television receiver additionally increase, the user has a motivation to purchase the video processor card 13.

The video processor card $13_i$ other than the highest order video processor card $13_1$ may store the difference data rather than the coefficient seed data itself as already discussed with reference to FIG. 19.

In the above discussion, the video processor card $13_i$ illustrated in FIG. 33 stores, as the tap generation information, the coefficient seed data or the data of difference between the coefficient seed data of the video processor card $13_i$ and the coefficient seed data of the video processor card $13_{i-1}$, which is one order higher. The video processor card $13_i$, except the highest order video processor card $13_1$, stores, as the tap generation information, information for generating new tap coefficients (information other than the difference data) from the tap coefficients used in the video processor card $13_{i-1}$ which is one order higher.

Figure 39:
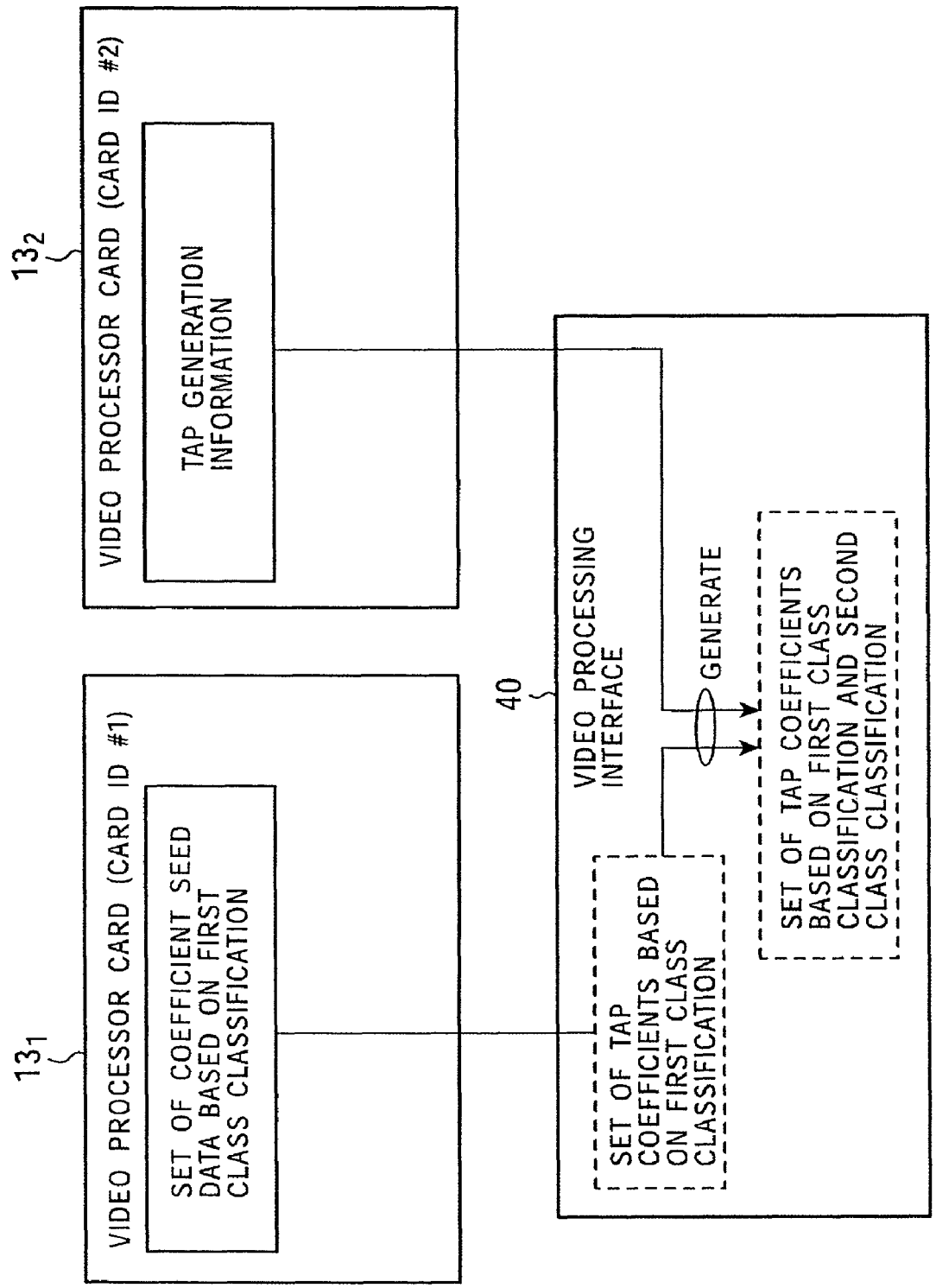
FIG. 39 illustrates the process of the video processor card $13_1$ and $13_2$, and the video processing interface 40.

If the video processor card $13_1$ and $13_2$ are loaded in the video processing interface 40, the coefficient generator 136 (see FIG. 32) in the video processing interface 40 generates the set of tap coefficients based on the first class classification from the set of coefficient seed data based on the first class classification stored in the video processor card $13_1$ as shown in FIG. 39. Furthermore, the coefficient generator 136 in the video processing interface 40 generates the set of tap coefficients based on the first and second class classification from the set of tap coefficients based on the first class classification and the tap generation information stored in the video processor card $13_2$.

Discussed next is the tap generation information for generating the set of tap coefficients, based on the first and second class classification, together with the set of tap coefficients based on the first class classification.

The first class code from the first class classification may be a final class code. The final class code is then referred to as a first synthesis class code. A final class code, which is obtained by attaching a second class code based on the second class classification as the least significant bit to the first class code, is referred to as a second synthesis class code. A final class code, which is obtained by attaching the second class code as the least significant bit to the first class code, and then attaching a third class code to the second synthesis class code, is referred to as a third synthesis class code.

In this case, the second synthesis class code is the first synthesis class code with the 1 bit second class code attached thereto as the least significant bit, and the third synthesis class code is the second synthesis class code with the 1 bit third class code attached thereto.

A first synthesis class code #c may be correspondingly associated with two second synthesis class codes, namely, a second synthesis class code #c0 which is obtained by attaching zero of 1 bit as the least significant bit to the first synthesis class code #c and a second synthesis class code #c1 which is obtained by attaching 1 of 1 bit as the least significant bit to the first synthesis class code #c. Similarly, a second synthesis class code #c' may be correspondingly associated with two third synthesis class codes, namely, a third synthesis class code #c'0 which is obtained by attaching zero of 1 bit as the least significant bit to the second synthesis class code #c' and a third synthesis class code #c'1 which is obtained by attaching 1 of 1 bit as the least significant bit to the second synthesis class code #c'.

Figure 40:
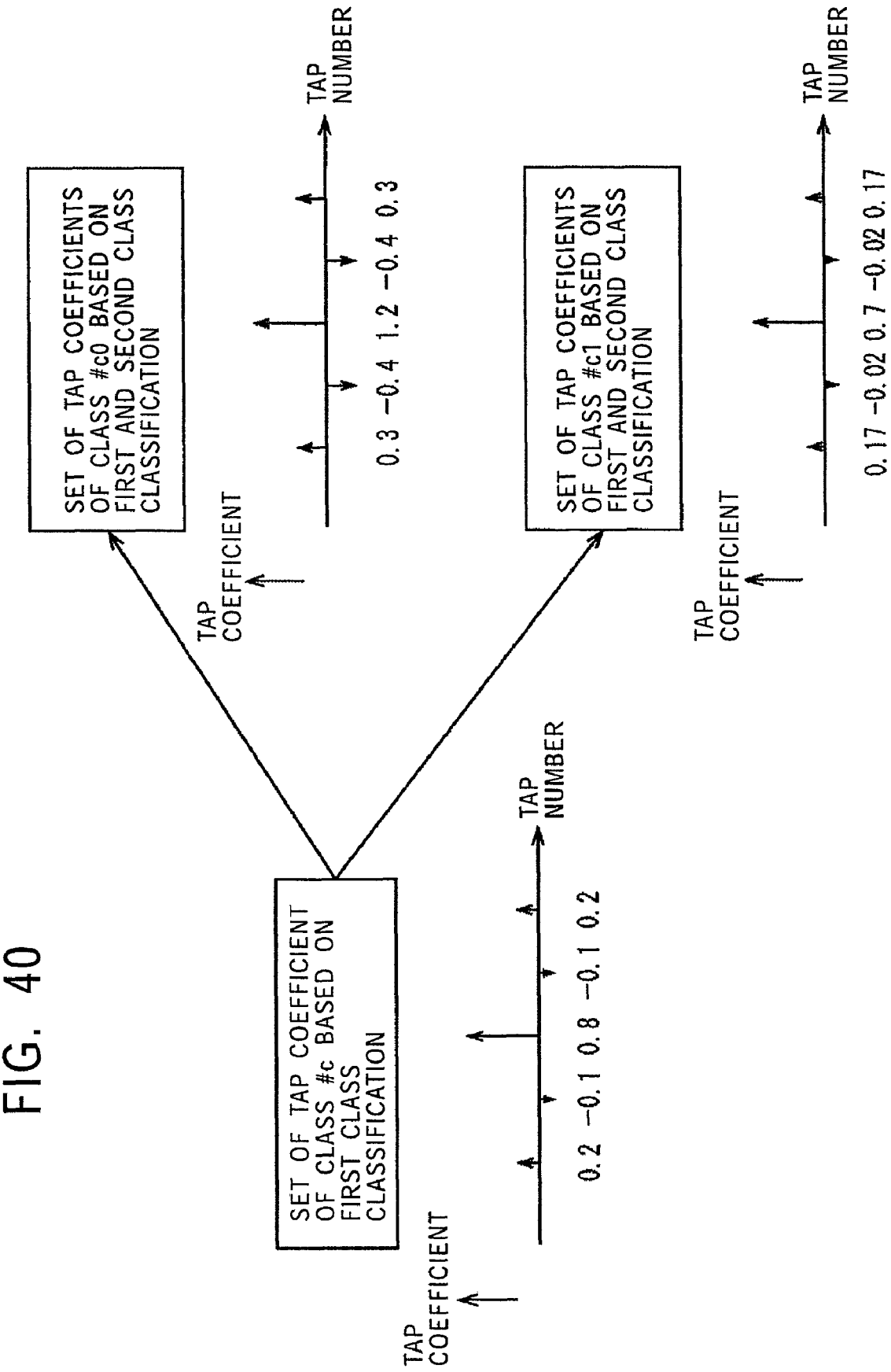
FIG. 40 illustrates the relationship between the number of taps of a first synthesis class code and a second synthesis class code.

There is one set of tap coefficients for one class code. If the first synthesis class code #c corresponds to the two second synthesis class codes #c0 and #c1 as described above, a set of tap coefficients of the first synthesis class code #c based on the first class classification corresponds to sets of tap coefficients of the second synthesis class codes #c0 and #c1 based on the first and second class classifications as shown in FIG. 40.

The tap generation information may be used to generate the sets of tap coefficients of the second synthesis class codes #c0 and #c1 based on the first and second class classifications together with the set of tap coefficients of the first synthesis class code #c based on the first class classification.

Figure 41:
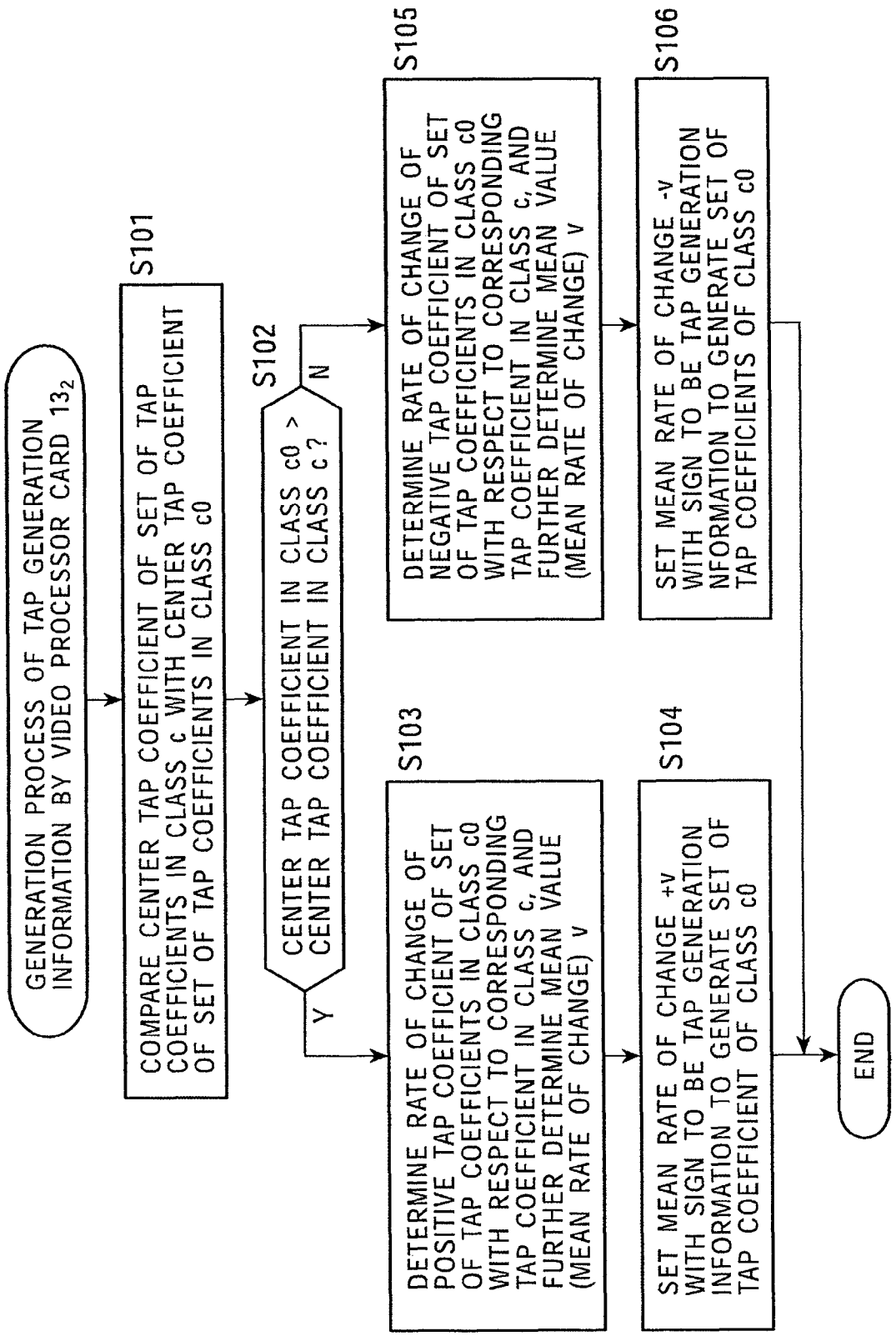
FIG. 41 is a flow diagram illustrating the method of generating tap generation information.

With reference to a flow diagram illustrated in FIG. 41, the method of generating the tap generation information is discussed. The set of tap coefficients of the second synthesis class code #c0 based on the first and second class classification is generated here.

In step S101, the center tap coefficient of the set of tap coefficients of the first synthesis class code #c is compared with the center tap coefficient of the set of tap coefficients of the second synthesis class code #c0 correspondingly associated with the first synthesis class code #c.

The center tap coefficient of the set of tap coefficients at a given class refers to a tap coefficient which is centered when the tap coefficients are arranged in the order of tap numbers at the class. Referring to FIG. 40, for example, if the arrangement of the tap coefficients of the first synthesis class code #c in the order of tap numbers is (0.2, −0.1, 0.8, −0.1, 0.2), the center tap coefficient is 0.8. If the arrangement of the tap coefficients of the second synthesis class code #c0 in the order of tap numbers is (0.3, −0.4, 1.2, −0.4, 0.3), the center tap coefficient is 1.2.

After comparing the center tap coefficients in step S101, the algorithm proceeds to step S102. It is then determined in step S102 whether the center tap coefficient of the second synthesis class code #c0 is (equal to or) larger than the center tap coefficient of the first synthesis class code #c.

If it is then determined in step S102 that the center tap coefficient of the second synthesis class code #c0 is larger than the center tap coefficient of the first synthesis class code #c, the algorithm proceeds to step S103. Determined in step S103 is the rate of change (ratio) of each positive tap coefficient of the set of tap coefficients of the second synthesis class code #c0 with respect to the corresponding tap coefficient of the first synthesis class code #c. Also in step S103, the mean value of the rate of change is determined, and is then referred to as mean rate of change v.

In the example of tap coefficients shown in FIG. 40, the center tap coefficient of the second synthesis class code #c0 is 1.2 and is larger than the center tap coefficient of the first synthesis class code #c0, which is 0.8. Determined in step S103 is the rate of change (ratio) of each of the positive tap coefficients of the tap coefficients in the second synthesis class code #c0, namely, the first tap coefficient 0.3, the third tap coefficient (the center tap coefficient) 1.2, and the fifth tap coefficient 0.3, with respect to the corresponding tap coefficients of the first synthesis class code #c.

Since the first, third, and fifth tap coefficients of the first synthesis class code #c are respectively 0.2, 0.8, and 0.2, the respective rates of change of the first, third, and fifth tap coefficients are 0.3/0.2, 1.2/0.8, and 0.3/0.2.

The means value of the rates of change v is 1.5.

The algorithm proceeds from step S103 to S104. A positive sign (+) is attached to the mean rate of change v, and the mean rate of change v becomes +v. The +v is set as the tap generation information (for the second synthesis class code) #c0 for generating, from the set of tap coefficients of the first synthesis class code #c, the set of tap coefficients of the second synthesis class code #c0 corresponding to the set of tap coefficients of the first synthesis class code #c. The process ends.

In this example, +1.5 is the tap generation information for generating the set of tap coefficients of the second synthesis class code #c0 from the set of tap coefficients of the first synthesis class code #c.

If it is then determined in step S102 that the center tap coefficient of the second synthesis class code #c0 is not larger than the center tap coefficient of the first synthesis class code #c, the algorithm proceeds to step S105. Determined in step S105 is the rate of change (ratio) of each negative tap coefficient of the set of tap coefficients of the second synthesis class code #c0 with respect to the corresponding tap coefficient of the first synthesis class code #c. Also in step S105, the mean value of the rate of change is determined, and is then referred to as mean rate of change v.

The algorithm proceeds from step S105 to S106. A negative sign (−) sign is attached to the mean rate of change v, and the mean rate of change v becomes −v. The −v is set as the tap generation information for generating, from the set of tap coefficients of the first synthesis class code #c, the set of tap coefficients of the second synthesis class code #c0 corresponding to the set of tap coefficients of the first synthesis class code #c. The process ends.

Generated next is the tap generation information for generating the set of tap coefficients of the second synthesis class code #c1 based on the first and second class classifications as shown in FIG. 40. The set of tap coefficients of the second synthesis class code #c1 is (0.17, −0.02, 0.7, −0.02, 0.17). The center tap coefficient is 0.7, which is smaller than the center tap coefficient of the tap coefficients of the first synthesis class code #c, namely, 0.8.

Determined in step S105 is the rate of change (ratio) of each negative tap coefficient of the set of tap coefficients of the second synthesis class code #c1, namely, the second tap coefficient −0.02, and the fourth tap coefficient −0.02, with respect to the corresponding tap coefficient of the first synthesis class code #c.

Since the second and fourth tap coefficients of the first synthesis class code #c are respectively −0.1 and −0.1, the rates of change of the second and fourth tap coefficients are respectively 0.02/0.1 and 0.02/0.1.

The mean rate of change v is thus 0.2 (step S105).

The mean rate of change v with a negative sign (−) sign attached thereto, namely, −0.2 is the tap generation information (for the second synthesis class code #c1) for generating, from the set of tap coefficients of the first synthesis class code #c, the set of tap coefficients of the second synthesis class code #c1 corresponding to the set of tap coefficients of the first synthesis class code #c (step S106).

The process of the coefficient generator 136 illustrated in FIG. 32 is discussed below with reference to a flow diagram illustrated in FIG. 42. In this process, the set of tap coefficients of the second synthesis class code #c0 based on the first and second class classification is generated from the set of tap coefficients of the first synthesis class code #c based on the first class classification in accordance with the tap generation information generated in the process illustrated in FIG. 41.

The coefficient generator 136 determines in step S111 the sign of the tap generation information about the second synthesis class code #c0. If it is determined that the sign is positive (+), the algorithm proceeds to step S112. If it is determined that the sign is negative (−), the algorithm proceeds to step S114.

In step S112, the coefficient generator 136 multiplies the positive tap coefficients, out of the tap coefficients of the first synthesis class code #c correspondingly associated with the second synthesis class code #c0, by the mean rate of change v of the tap generation information, and regards the resulting set of tap coefficients as the set of tap coefficients of the second synthesis class code #c0. The algorithm proceeds to step S113.

In step S113, the coefficient generator 136 performs a normalization process on the set of tap coefficients of the second synthesis class code #c0 determined in step S112 for gain adjustment, and ends the process. Specifically, in step S113, the coefficient generator 136 adjusts the negative tap coefficients out of the set of tap coefficients of the second synthesis class code #c0 determined in step S112 so that the sum of the tap coefficients becomes 1.

In step S114, the coefficient generator 136 multiplies the negative tap coefficients, out of the set of tap coefficients of the first synthesis class code #c correspondingly associated with the second synthesis class code #c0, by the mean rate of change v of the tap generation information, and regards the resulting products as the set of tap coefficients of the second synthesis class code #c0. The algorithm proceeds to step S115.

In step S115, the coefficient generator 136 performs a normalization process on the set of tap coefficients of the second synthesis class code #c0 determined in step S114 for gain adjustment, and ends the process. Specifically, in step S115, the coefficient generator 136 adjusts the positive tap coefficients out of the set of tap coefficients of the second synthesis class code #c0 determined in step S112 so that the sum of the tap coefficients becomes 1.

Figure 42:
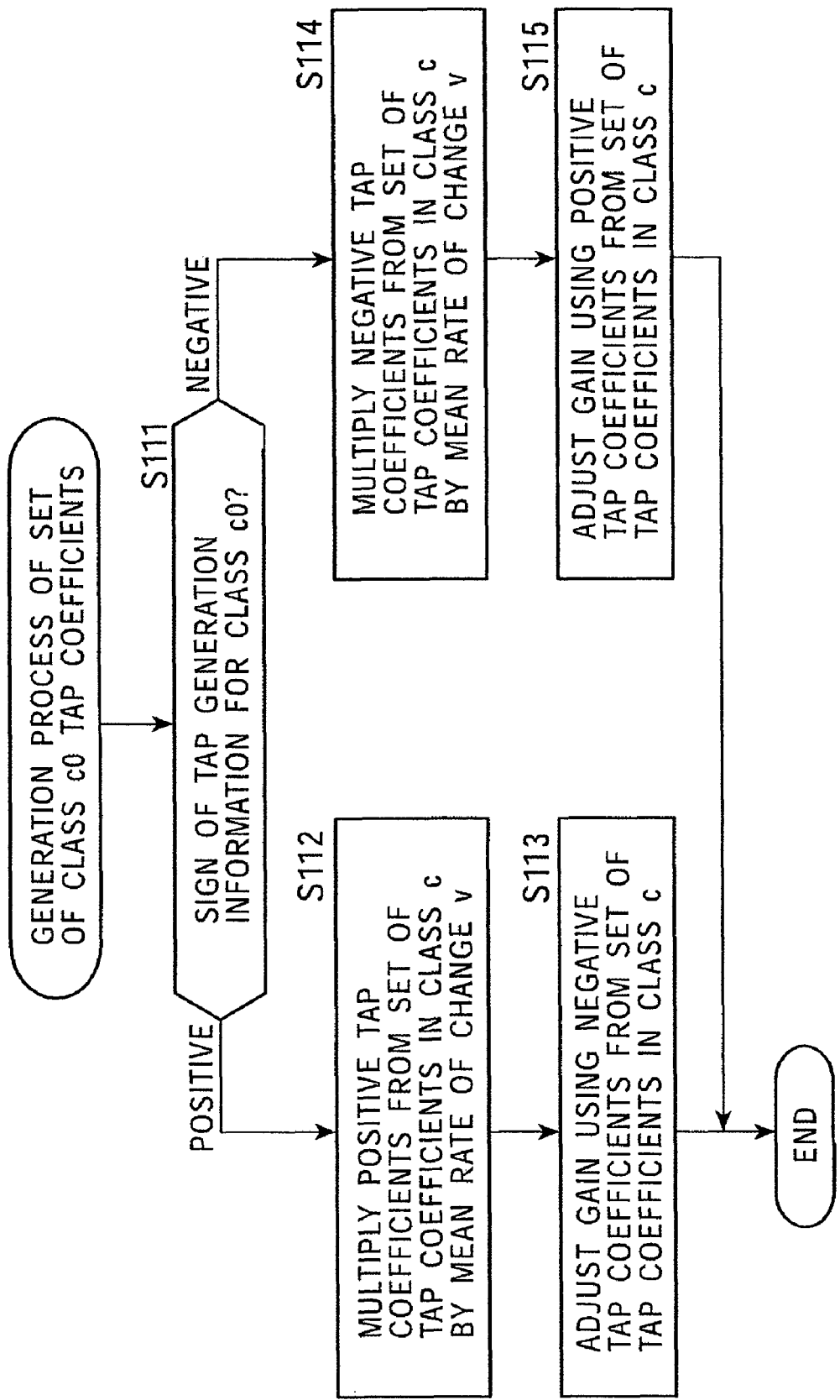
FIG. 42 is a flow diagram illustrating the process of the video processing interface 40 and coefficient generator 136.

In accordance with the process illustrated in FIG. 42, the set of tap coefficients of the first synthesis class code #c is (0.2, −0.1, 0.8, −0.1, 0.2) as illustrated in FIG. 40, and the tap generation information of the second synthesis class code #c is +1.5 as illustrated in FIG. 41. The sign of the tap generation information is positive (+), and the positive tap coefficients out of the set of tap coefficients of the first synthesis class code #c (0.2, −0.1, 0.8, −0.1, 0.2) are multiplied by 1.5, and the resulting products (0.3, −0.1, 1.2, −0.1, 0.3) are handled as the set of tap coefficients of the tap coefficients of the second synthesis class code #c0 (step S112). The negative tap coefficients out of the set of the tap coefficients of the second synthesis class code #c0 (0.3, −0.1, 1.2, −0.1, 0.3) is adjusted so that the sum of the tap coefficients becomes 1. Specifically, the sum of (0.3, −0.1, 1.2, −0.1, 0.3) is 1.6, and each of the second and fourth negative tap coefficients is adjusted from −0.1 to −0.4 by the same amount. The set of the tap coefficients of the second synthesis class code #c0 thus becomes (0.3, −0.4, 1.2, −0.4, 0.3) which causes the sum to be 1.

The set of the tap coefficients of the second synthesis class code #c0 (0.3, −0.4, 1.2, −0.4, 0.3) coincides with the original set of tap coefficients illustrated in FIG. 40. The set of the tap coefficients of the second synthesis class code #c0 (0.3, −0.4, 1.2, −0.4, 0.3) correspondingly associated with the first synthesis class code #c is generated from the set of tap coefficients of the first synthesis class code #c (0.2, −0.1, 0.8, −0.1, 0.2) and the tap generation information of +1.5. Similarly, the set of tap coefficients of the second synthesis class, code #c1 is generated from the set of tap coefficients of the first synthesis class code #c correspondingly associated therewith and the tap generation information −1.2 which is generated as illustrated in FIG. 41.

As described above, each of the video processor cards $13_3$ through $13_6$ stores the tap coefficients generated from the tap generation information of the video processor card $13_i$ which is one order higher, together with tap generation information for generating new tap coefficients.

In the embodiment illustrated in FIG. 41, a positive sign (+) or a negative sign (−) is simply attached to the mean rate of change, thereby becoming the tap generation information of the second synthesis class code #c0. Alternatively, the mean rate of change is corrected by at least one of the second synthesis class code #c0, the first synthesis class code #c correspondingly associated therewith, and the first class code and the second class code used to generate the second synthesis class code #c0, and a positive sign (+) or a negative sign (−) is attached to the corrected mean rate of change. The resulting mean rate of change is used as the tap generation information for the second synthesis class code #c0.

In the embodiment illustrated in FIG. 41, if the center tap coefficient of the second synthesis class code #c0 is larger than the center tap coefficient of the first synthesis class code #c, the mean rate of change v of the positive tap coefficients of the second synthesis class code #c0 is determined, and if the center tap coefficient of the second synthesis class code #c0 is not larger than the center tap coefficient of the first synthesis class code #c, the mean rate of change v of the negative tap coefficients of the second synthesis class code #c0 is determined. A positive sign or negative sign is attached to the resulting mean rate of change to obtain the tap generation information (hereinafter referred to as first tap generation information). Conversely, if the center tap coefficient of the second synthesis class code #c0 is not larger than the center tap coefficient of the first synthesis class code #c, the mean rate of change v of the positive tap coefficients of the second synthesis class code #c0 is determined, and if the center tap coefficient of the second synthesis class code #c1 is larger than the center tap coefficient of the first synthesis class code #c, the mean rate of change v of the negative tap coefficients of the second synthesis class code #c0 is determined. A positive sign or negative sign is attached to the resulting mean rate of change to obtain the tap generation information (hereinafter referred to as second tap generation information).

When the set of tap coefficients of the second synthesis class code #c0 is determined using the tap generation information of the second synthesis class code #c0 in the process illustrated in FIG. 42, the resulting tap coefficients may deviate from the original ones. The first tap generation information or the second tap generation information, whichever provides a smaller amount of deviation (error) between the set of tap coefficients of the second synthesis class code #c0 determined therefrom and the original values, may be adopted as final tap generation information. Whether to adopt the first tap generation information or the second tap generation information may be determined at each of the second synthesis class code, the first synthesis class code correspondingly associated therewith, and the first class code and the second class code used to generate the second synthesis class code.

The tap generation information for generating, from the set of tap coefficients of the first synthesis class code #c, the set of tap coefficients of the second synthesis class code #c0 correspondingly associated with the set of tap coefficients of the first synthesis class code #c may be the one generated using the process illustrated in FIG. 41. Alternatively, the learning device illustrated in FIG. 9 performs a learning process using the set of tap coefficients of the first synthesis class code #c as the learning data, and the set of tap coefficients of the second synthesis class code #c1 as the training data, and the resulting set of tap coefficients is used as the tap generation information.

Figure 43:
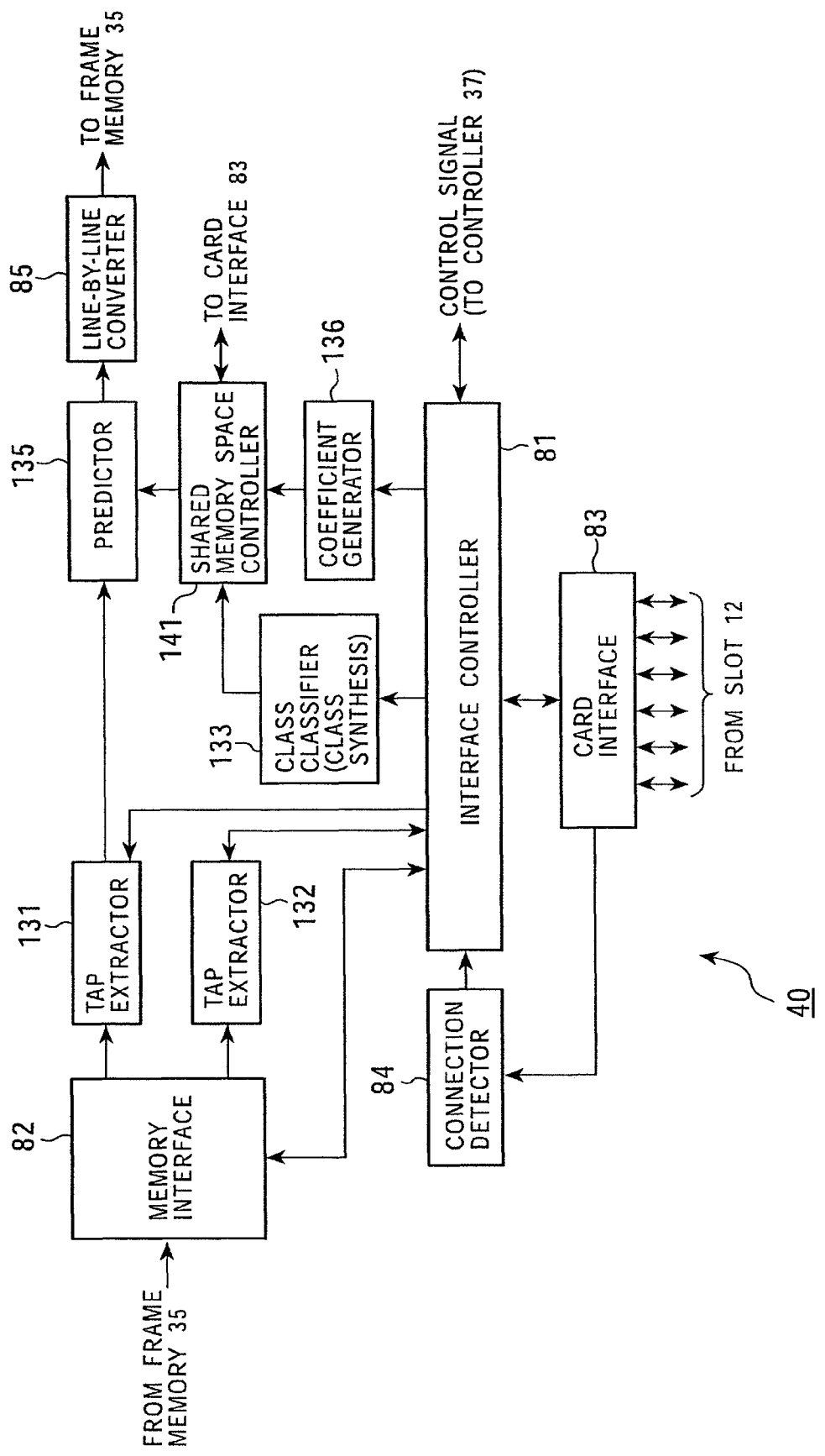
FIG. 43 is a block diagram illustrating a third construction of the video processing interface 40.

FIG. 43 illustrates a third construction of the video processing interface 40 illustrated in FIG. 3. Components identical to those discussed with reference to FIG. 32 are designated with the same reference numerals, and the discussion thereof is omitted as appropriate here. The video processing interface 40 illustrated in FIG. 43 is identical in construction to the one illustrated in FIG. 32, except that a shared memory space controller 141 is substituted for the coefficient memory 134.

Figure 44:
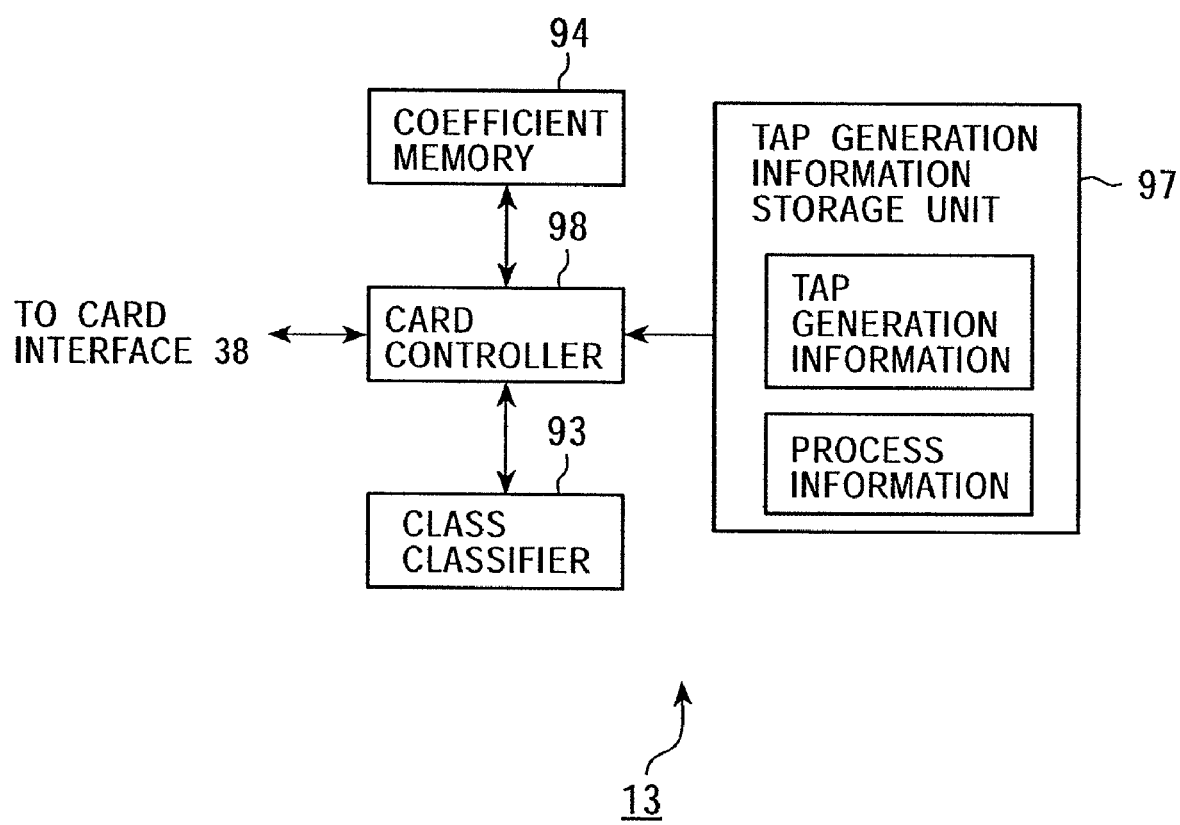
FIG. 44 is a block diagram illustrating a fourth construction of the video processor card 13.

Like the shared memory space controller 100 illustrated in FIG. 20, the shared memory space controller 141 reserves a virtual memory space, for storing a set of tap coefficients generated by the coefficient generator 136, in the coefficient memory 94 of a video processor card 13 loaded in the video processing interface 40 as illustrated in FIG. 44. The shared memory space controller 141 stores the set of tap coefficients in the virtual memory space. Furthermore, the shared memory space controller 141 reads, from the virtual memory space, a set of tap coefficients of a class code output from the class classifier 133, and feeds the set of tap coefficients to the predictor 135.

FIG. 44 illustrates the construction of the video processor card 13 compatible with the video processing interface 40 constructed as illustrated in FIG. 43. As shown, components identical to those described with reference to FIG. 33 are designated with the same reference numerals, and the discussion thereof is omitted here as appropriate. The video processor card 13 illustrated in FIG. 44 includes the video processor card 13 illustrated in FIG. 33 with the coefficient memory 94 illustrated in FIG. 20 added thereto.

As discussed with reference to FIG. 36, as the number of video processor card $13_1$ through $13_i$ loaded in the video processing interface 40 as effective cards increases, the number of classes of tap coefficients generated by the coefficient generator 136 in the video processing interface 40 increases, and the set of tap coefficients becomes larger in size.

When the video processor card $13_1$ through $13_i$ are loaded in the video processing interface 40 in the embodiment illustrated in FIG. 44, the memory capacity of the coefficient memory 94 of each of the video processor card $13_1$ through $13_i$ is designed to match the size of the set of tap coefficients generated by the coefficient generator 136 of the video processing interface 40. Even if the storage content of the video processor card $13_1$ through $13_i$ is illegally read to generate the set of tap coefficients, the set of tap coefficients cannot be stored unless the video processor card $13_1$ through $13_i$ are loaded in the video processing interface 40. In this way, the user prevents the storage content of the video processor card $13_1$ through $13_i$ from being illegally read, thereby precluding an unauthorized use of the generated set of tap coefficients.

When the shared memory space controller 141 illustrated in FIG. 43 is viewed from the class classifier 133, coefficient generator 136, and predictor 135, the shared memory space controller 141 reserves a virtual memory space so that the real memory spaces of i units of coefficient memories 94 of respective video processor card $13_1$ through $13_i$ as effective cards loaded in the video processing interface 40 look like a single consecutive memory space.

In this case, the capacity of the coefficient memory 94 is designed so that the total sum of capacities of the coefficient memories 94 of the video processor card $13_1$ through $13_i$ loaded in the video processing interface 40 matches the size of the generated tap coefficients. The capacity of the coefficient memory 94 may be designed so that the size of tap coefficients generated with the video processor card $13_1$ through $13_i$ loaded in the video processing interface 40 is larger than the capacity of (i−1) coefficient memories 94 but equal to or smaller than the capacity of i coefficient memories 94.

In the embodiments illustrated in FIGS. 33 and 44, the class classifier 93 is mounted on the video processor card $13_i$. Alternatively, the class classifier 93 may be mounted on the video processing interface 40 illustrated in FIGS. 32 and 44.

The above series of process steps is performed using hardware. Alternatively, these process steps may be performed using software programs. When the process steps are performed using a software program, the software program may be installed in a general-purpose computer.

Figure 45:
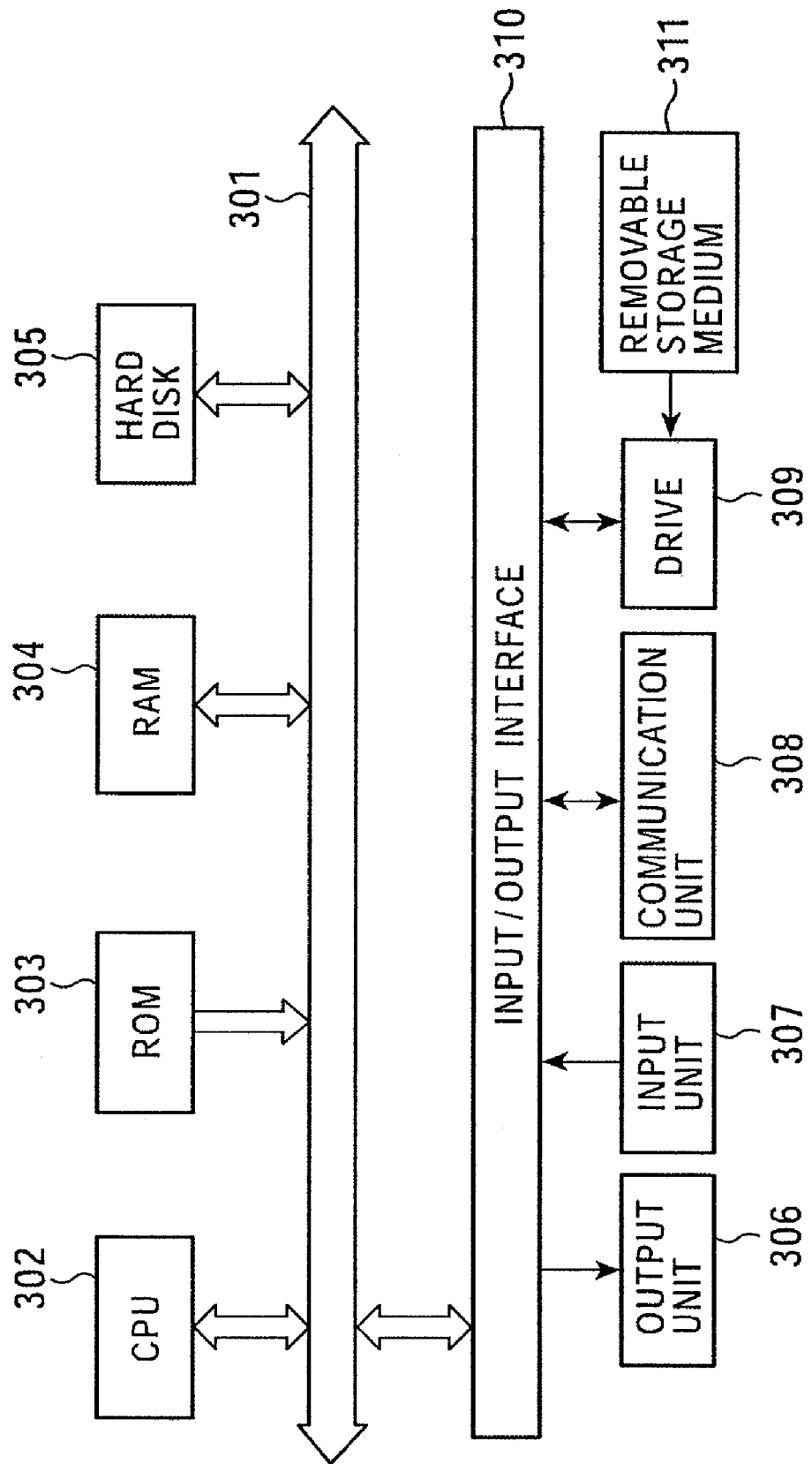
FIG. 45 is a block diagram illustrating the construction of one embodiment of a computer implementing the present invention.

FIG. 45 illustrates one embodiment of a computer in which the program for performing a series of process steps is installed.

The program may be stored beforehand in a hard disk 305 or a ROM 303 as a storage medium built in the computer.

Alternatively, the program may be temporarily or permanently stored (recorded) in a removable storage medium 311, such as a flexible disk, CD-ROM (Compact Disk Read-Only Memory), MO (Magneto-optical) disk, DVD (Digital Versatile Disk), magnetic disk, or semiconductor memory. The removable storage medium 311 may be supplied in a so-called packaged software.

The program may be installed in the computer using the removable storage medium 311. Alternatively, the program may be radio transmitted to the computer from a down-load site via an artificial satellite for digital broadcasting, or may be transferred to the computer in a wired fashion using a network such as a LAN (Local Area Network) or the Internet. The computer receives the program at a communication unit 308, and installs the program in the built-in hard disk 305.

The computer contains a CPU (Central Processing Unit) 302. An input/output interface 310 is connected to the CPU 302 through a bus 301. The CPU 302 carries out the program stored in the ROM (Read-Only Memory) 303 when the CPU 302 receives a command from a user through the input/output interface 310 when the user operates an input unit 307 such as a keyboard, mouse, or microphone. The CPU 302 carries out the program by loading on a RAM (Random Access Memory) 304, the program stored in the hard disk 305, the program transmitted via a satellite or a network, received by the communication unit 308, and installed onto the hard disk 305, or the program read from the removable storage medium 311 loaded into a drive 309 and installed onto the hard disk 305. The CPU 302 carries out the process in accordance with each of the above-referenced flow diagrams, or the process carried out by the arrangement illustrated in the above-referenced block diagrams. The CPU 302 outputs the results of the process from an output unit 306 such as a LCD (Liquid-Crystal Display) or a loudspeaker through the input/output interface 310, or transmits the results of the process through the communication unit 308, or stores the results of the process onto the hard disk 305.

It is not a requirement that the process steps describing the program for causing the computer to carry out a variety of processes be carried out in a sequential order in time scale described in the flow diagrams. The process steps may be performed in parallel or separately (for example, parallel processing or processing using an object).

The program may be executed by a single computer, or by a plurality of computers in distributed processing. The program may be transferred to and executed by a computer at a remote place.

In the above-referenced embodiments, the present invention is applied to the image quality improvements of video data. The present invention may be applied to sound quality improvements of sound (audio) data.

In the above embodiments, the present invention is applied to analog television receivers. Alternatively, the present invention may be applied to digital television receivers, or VCRs (Video Cassette Recorders) for processing video data and audio data.

In the above-referenced embodiments, the tap generation information for generating the tap coefficients for improving spatial resolution is stored in the video processor card 13. The tap generation information stored in the video processor card 13 is not limited to that information. The video processor card 13 may store a tap coefficient for improving time resolution, a tap coefficient for improving tonal gradations of pixels (the number of bits of a pixel value), a tap coefficient for edge enhancement, a tap coefficient for converting the number of pixels forming an image or for converting the size of an image, or a tap coefficient for another type of image improvements, for example.

The tap generation information stored in the video processor cards $13_1$ through $13_i$ may perform the same type of image quality improvements at different levels of improvements, or may perform different types of image quality improvements.

In the above-referenced embodiments, the video processor card 13 stores beforehand the tap generation information. The video processor card $13_i$ may be sold with no particular tap generation information stored therein. In this case, tap generation information may be downloaded from a tap generation information server, and is then stored in the video processor card $13_i$. When the video processor card $13_i$ is loaded in the video processing interface 40, the controller 37 in FIG. 3 controls the communication interface 38, thereby accessing the tap generation information server. After the controller 37 and the tap generation information server authenticate each other, the tap generation information is downloaded. The bill for the downloaded tap generation information is debited from the bank account of the user, or may be included in the retail price of the video processor card $13_1$.

As lower order video processor card 13 is loaded, the function and/or performance of the main unit 1 becomes sophisticated. The retail price of the video processor card $13_i$ or the charge for downloading the tap generation information may increase as the video processor card $13_i$ rises in order.

In the above-referenced embodiments, the television receiver has the highest order video processor card $13_1$ already mounted therewithin. The highest order video processor card $13_1$ may be an optional item. A user, who has purchased the television receiver with the highest order video processor card $13_1$ mounted therewithin, may enjoy a more price discount when he or she purchases a lower order video processor card $13_i$ than a user who purchases a television receiver without the highest order video processor card $13_1$.

In principle, the main unit 1 of the television receiver shown in FIG. 3 is produced by adding the video processing interface 40 to a typically available analog television receiver, and modifying a program which is executed by the controller 37. The main unit 1 of the television receiver shown in FIG. 3 is manufactured using a typical analog television receiver with relative ease. The cost performance of the video processor card 13 is high considering the above-referenced functions.

In accordance with the present invention, a television receiver is provided with sophisticated functions in an add-on fashion.

What is claimed is:

1. A data processing method of a storage device detachably loaded in a data processing apparatus, the storage device having tap generation information storage means for storing tap generation information for generating a tap coefficient for each predetermined class for a data conversion process of converting first data into second data higher in quality level than the first data, the data processing method comprising:
   a tap coefficient generation step of generating the tap coefficient from the tap generation information under the control of the data processing apparatus;
   a predictive tap extraction step of extracting, from the first data supplied from the data processing apparatus, a predictive tap for use in the prediction of target data which is of interest in the second data;
   a class tap extraction step of extracting, from the first data supplied from the data processing apparatus, a class tap for use in the class classification that classifies the target data into one of a plurality of classes;
   a class classification step of classifying the target data into classes based on the class tap; and
   a prediction step of predicting the target data from the tap coefficient and the predictive tap of the class of the target data, and supplying the target data to the data processing apparatus.

2. A non-transitory computer-readable medium storing an executable program of a data processing method of a storage device detachably loaded in a data processing apparatus, the storage device having tap generation information storage means for storing tap generation information for generating a tap coefficient for each predetermined class for a data conversion process of converting first data into second data higher in quality level than the first data, the computer program comprising:
   a tap coefficient generation step of generating the tap coefficient from the tap generation information under the control of the data processing apparatus;
   a predictive tap extraction step of extracting, from the first data supplied from the data processing apparatus, a predictive tap for use in the prediction of target data which is of interest in the second data;
   a class tap extraction step of extracting, from the first data supplied from the data processing apparatus, a class tap for use in the class classification that classifies the target data into one of a plurality of classes;
   a class classification step of classifying the target data into classes based on the class tap; and
   a prediction step of predicting the target data from the tap coefficient and the predictive tap of the class of the target data, and supplying the target data to the data processing apparatus.

3. A data processing apparatus that allows first through N-th storage devices to be detachably loaded therein, each of the storage devices storing tap generation information for generating a tap coefficient for each predetermined class for a data conversion process of converting first data into second data higher in quality level than the first data, the data processing apparatus comprising:
   loading and unloading means on which each of the first through N-th storage devices is mounted;
   tap coefficient generation control means which controls the generation of the tap coefficient from the tap generation information in the first through N'-th storage devices ($N' \leq N$) mounted on the loading and unloading means;
   input and output route setting means which sets an input and output route of data for each of the first through N'-th storage devices; and
   data supply control means which controls the supply of data from one storage device to another among the first through N'-th storage devices in accordance with the input and output route set by the input and output route setting means.

4. A data processing apparatus according to claim 3, wherein the one storage device stores, as the tap generation information, coefficient seed data which functions as a seed for the tap coefficient,
   wherein the other storage device stores, as the tap generation information, information for generating coefficient seed data of the other storage device using the coefficient seed data stored in the one storage device,
   wherein the tap coefficient generation control means controls the other storage device to generate the coefficient seed data of the other storage device using the coefficient seed data stored in the one storage device and the tap generation information stored in the other storage device, and to generate the tap coefficient from the generated coefficient seed data.

5. A data processing apparatus according to claim 4, wherein the other storage device stores, as the tap generation information, a difference between the coefficient seed data of the other storage device and the coefficient seed data of the one storage device, and
   wherein the tap coefficient generation control means controls the other storage device to generate the coefficient seed data of the other storage device by summing the coefficient seed data stored in the one storage device and the tap generation information stored in the other storage device, and to generate the tap coefficient from the generated coefficient seed data.

6. A data processing apparatus according to claim 3, wherein the tap coefficient generation control means controls the other storage device to generate the tap coefficient based on the tap generation information stored in the one storage device and the tap generation information stored in the other storage device.

7. A data processing method of a data processing apparatus that allows first through N-th storage devices to be detachably loaded therein, each of the storage devices storing tap generation information for generating a tap coefficient for each predetermined class for a data conversion process of converting first image data into second image data higher in quality level than the first data, the data processing apparatus comprising loading and unloading means on which each of the first through N-th storage devices is mounted, the data processing method comprising:
   a tap coefficient generation control step of controlling the generation of the tap coefficient for converting the first image data into the second image data from the tap generation information in the first through N'-th storage devices ($N' \leq N$) mounted on the loading and unloading means;
   an input and output route setting step of setting an input and output route of data for each of the first through N'-th storage devices; and
   a data supply control step of controlling the supply of data from one storage device to another among the first through N'-th storage devices in accordance with the input and output route set in the input and output route setting step.

8. A non-transitory computer-readable medium storing an executable program for a data processing method of a data processing apparatus that allows first through N-th storage devices to be detachably loaded therein, each of the storage devices storing tap generation information for generating a tap coefficient for each predetermined class for a data conversion process of converting first image data into second image data higher in quality level than the first data, the data processing apparatus comprising loading and unloading means on which each of the first through N-th storage devices is mounted, the executable program comprising:

a tap coefficient generation control step of controlling the generation of the tap coefficient for converting the first image data into the second image data from the tap generation information in the first through N'-th storage devices (N'≦N) mounted on the loading and unloading means;

an input and output route setting step of setting an input and output route of data for each of the first through N'-th storage devices; and a data supply control step of controlling the supply of data from one storage device to another among the first through N'-th storage devices in accordance with the input and output route set in the input and output route setting step.

9. A data processing system comprising:

first through N-th storage devices which store tap generation information for generating a tap coefficient for each predetermined class for a data conversion process of converting first data into second data higher in quality level than the first data, and a data processing apparatus that allows the first through N-th storage devices to be detachably loaded therein;

wherein each of the first through N-th storage device comprises:

tap generation information storage means which stores the tap generation information for generating the tap coefficient, tap coefficient generator means which generates the tap coefficient from the tap generation information under the control of the data processing apparatus, tap extractor means which extracts, from the first data supplied from the data processing apparatus, a predictive tap which is used to predict target data which is of interest in the second data, class tap extractor means which extracts, from the first data supplied from the data processing apparatus, a class tap which is used to classify the target data into one of a plurality of classes, class classifier means which classifies the target data according to the class tap, and predictor means which predicts the target data from the tap coefficient of and the predictive tap of the class of the target data, and supplies the data processing apparatus with the target data; and wherein the data processing apparatus comprises:

loading and unloading means on which each of the first through N-th storage devices is mounted, tap coefficient generation control means which controls the generation of the tap coefficient from the tap generation information in the first through N'-th storage devices (N'≦N) mounted on the loading and unloading means, input and output route setting means which sets an input and output route of data for each of the first through N'-th storage devices, and data supply control means which controls the supply of data from one storage device to another among the first through N'-th storage devices in accordance with the input and output route set by the input and output route setting means.

10. A storage device detachably loaded in a data processing apparatus, comprising:

tap generation information storage means which stores tap generation information for generating a tap coefficient for each predetermined class for a data conversion process of converting first data into second data higher in quality level than the first data, the tap coefficient being generated from the tap generation information stored in the storage device and the tap generation information stored in another storage device;

tap coefficient storage means which stores a tap coefficient generated in the data processing apparatus and supplies the data processing, apparatus with a tap coefficient of a class corresponding to a request from the data processing apparatus in response to the request when the data processing apparatus generates the tap coefficient from the tap generation information and tap generation information supply means which supplies the data processing apparatus with the tap generation information.

11. A storage device according to claim 10, wherein the tap generation information storage means stores, as the tap generation information, information for generating coefficient seed data serving as a seed of the tap coefficient from the tap generation information stored in the other storage device.

12. A storage device according to claim 11, wherein the tap generation information storage means stores, as the tap generation information, a difference between the coefficient seed data of the storage device and the other coefficient seed data stored in the other storage device.

13. A storage device according to claim 10, wherein the tap coefficient generated from the tap generation information stored in the tap generation information storage means is larger in size than the tap coefficient generated from the tap generation information stored in the other storage device.

14. A storage device according to claim 10, wherein the tap coefficient is determined by performing calculation according to a predetermined calculation equation that is defined by the tap generation information stored in the tap generation information storage means.

15. A storage device according to claim 14, wherein the predetermined calculation equation defined by the tap generation information stored in the tap generation information storage means has more terms than a predetermined calculation equation defined by the tap generation information stored in the other storage device.

16. A storage device according to claim 10, wherein the tap coefficient generated from the tap generation information stored in the tap generation information storage means has more classes than the tap coefficient generated from the tap generation information stored in the other storage device.

17. A storage device according to claim 10, wherein the tap coefficient generated from the tap generation information stored in the tap generation information storage means is for use in the data conversion process for quality improvements different from quality improvements provided by the tap coefficient generated from the tap generation information stored in the other storage device.

18. A storage device according to claim 10, further comprising class classifier means which classifies target data used on a class tap which is first-data to be used to classify the target data, which is of interest in the second data, in response to a request from the data processing apparatus, and supplies the data processing apparatus with information representing the class of the target data.

19. A data processing system comprising:

first through N-th storage devices storing tap generation information for generating a tap coefficient for each predetermined class for a data conversion process of converting first data into second data higher in quality level than the first data, and a data processing apparatus on which the first through N-th storage devices are detachably loaded;

wherein each of the first through N-th storage devices comprises tap generation information storage means which stores tap generation information for generating the tap coefficient, the tap coefficient being generated from the tap generation information and tap generation information stored in another storage device; and tap generation information supply means which supplies the data processing apparatus with the tap generation information; and the data processing apparatus comprises:

loading and unloading means on which each of the first through N-th storage devices is mounted;

tap coefficient generator means which generates the tap coefficient from the tap generation information in the first through N'-th storage devices (N'≦N) mounted on the loading and unloading means;

predictive tap extractor means which extracts the first data having a predictive tap which is used to predict target data which is of interest in the second data;

class tap extractor means which extracts the first data having a class tap which is used to classify the target data into one of a plurality of classes;

class classifier means which classifies the target data based on the class tap; and predictor means which predicts the target data based on the tap coefficient and the predictive tap of the class of the target data.

* * * * *